(12) United States Patent
Nakamura

(10) Patent No.: US 6,774,172 B1
(45) Date of Patent: Aug. 10, 2004

(54) ADHESIVE COMPOSITION, RESIN MATERIAL, RUBBER ARTICLE AND PNEUMATIC TIRE

(75) Inventor: Masaaki Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/623,140

(22) PCT Filed: Dec. 28, 1999

(86) PCT No.: PCT/JP99/07421

§ 371 (c)(1),
(2), (4) Date: Aug. 28, 2000

(87) PCT Pub. No.: WO00/39237

PCT Pub. Date: Jul. 6, 2000

(30) Foreign Application Priority Data

| Dec. 28, 1998 | (JP) | 10-373724 |
| Jul. 6, 1999 | (JP) | 11-191842 |
| Sep. 30, 1999 | (JP) | 11-278078 |

(51) Int. Cl.⁷ .................................................. C08K 3/00
(52) U.S. Cl. ........................ 524/507; 428/361; 428/375
(58) Field of Search .................. 524/507; 428/361, 428/375

(56) References Cited

U.S. PATENT DOCUMENTS

| 4,532,273 A | * | 7/1985 | Kadosaki | 523/402 |
| 5,318,835 A | * | 6/1994 | Sawamoto | 428/317.7 |
| 5,821,297 A | * | 10/1998 | Arnold | 524/591 |
| 6,093,509 A | * | 7/2000 | Isono | 430/18 |

FOREIGN PATENT DOCUMENTS

| EP | 0 110 374 A1 | 6/1984 |
| EP | 0 168 066 A1 | 1/1986 |
| GB | 1 056 798 A | 1/1967 |
| JP | 58-49770 A | 3/1983 |
| JP | 5-229304 A | 9/1993 |
| JP | 6-123078 A | 5/1994 |
| JP | 6-173172 A | 6/1994 |
| JP | 9-111050 A | 4/1997 |
| JP | 10 046475 | 2/1998 |
| JP | 10-139839 A | 5/1998 |
| JP | 10-310755 A | 11/1998 |
| JP | 11-3418 A | 1/1999 |
| JP | 11-35702 A | 2/1999 |
| WO | 002185061 | 5/1994 |

* cited by examiner

Primary Examiner—Edward J. Cain
(74) Attorney, Agent, or Firm—Sughrue Mion, PLLC

(57) ABSTRACT

An adhesive composition according to the invention comprises a thermoplastic high molecular weight polymer (A) containing a crosslinkable functional group as a pendant group and substantially free of carbon-carbon double bond with a hydrogen radical at its allyl position in the main chain, a water-soluble high polymer (B) and a compound (C) having a structure with methylene linked aromatics having polar functional groups, or comprises the thermoplastic high molecular weight polymer (A) and a specified aqueous urethane compound (I), or comprises the water-soluble high polymer (B) and the aqueous urethane compound (I). And also, a resin material is coated with the adhesive composition and a rubber article is reinforced therewith, which is utilized as a rubber member of a pneumatic tire.

43 Claims, 1 Drawing Sheet

US 6,774,172 B1

ADHESIVE COMPOSITION, RESIN MATERIAL, RUBBER ARTICLE AND PNEUMATIC TIRE

TECHNICAL FIELD

This invention relates to an adhesive composition, a resin material treated therewith, a rubber article reinforced by the resin material, and a pneumatic tire applied with the rubber article.

BACKGROUND ART

Since polyester fibers such as polyethylene terephthalate fiber and polyethylene naphthalate fiber and the like, and aromatic polyamide fibers possess a higher initial modulus and an excellent dimensional stability under heat, they are very useful in forms of filament, cord, cable, cord fabric, canvas and the like as a reinforcement for rubber articles such as a tire, a belt, an air spring, a rubber hose and the like.

However, these reinforcements are compact in their molecular structure and less in the number of functional groups on their resin surface, so that they hardly adhere to rubber with an adhesive composition comprising resorcin, formaldehyde and a rubber latex (hereinafter referred to as RFL) capable of well adhering a reinforcement such as nylon fiber and rayon fiber to rubber.

For this end, there have variously been proposed not only adhesive compositions but also adhering methods, treated fibers and the like in order to adhere synthetic fibers to rubber well.

DISCLOSURE OF THE INVENTION

As the adhering method, there are a one-bath treating adhering method and a two-bath treating adhering method. As the one-bath treating adhering method, there is a method wherein an adhesive composition obtained by mixing the RFL with a compound containing a chain structure made from methylene diphenyls in its molecule (adhesion improver) such as a condensate of phenol-formaldehyde obtained through novolak reaction (see WO 97/13818) is applied onto the cord.

This one-bath treating adhering method is less in the amount of the adhesive composition used and excellent in the raw material cost and production cost because the adhesive composition is applied onto the cord surface only once. And also, the adhesive composition is flexible, so that stress concentration and heat generation accompanied therewith are small, and the fatigue property of the cord is excellent. Therefore, it is effective in the application to general-purpose tires.

However, the adhesive composition includes a rubber latex, so that it reacts with sulfur migrated from adherend rubber to cause sulfur cross-linking, which renders the modulus of the adhesive layer high, while it shrinks to create strain stress at an interface between the fiber and the adhesive layer, leading to lower an adhesion force (see the aforementioned WO 97/13818).

As the temperature is raised, the sulfur crosslinking in the latex rubber changes from a polysulfide bond to a monosulfide bond, so that the crosslinking portion are shortened and the number of crosslinkings is increased accompanied therewith, and hence the shrinkage of the adhesive layer becomes large and the adhesion force considerably lowers. Thus, in non-general-purpose tires wherein the environmental temperature of the tire in the running at a high-temperature reaches, for example, 180° C. or higher, there is a possibility that the adhesion force in the high-temperature running of the tire becomes insufficient.

On the other hand, as the two-bath treating adhering method, there are a method wherein the surface of a fiber cord is firstly coated with an adhesive composition containing an epoxy compound and a blocked isocyanate and then coated with an adhesive composition containing the RFL, and the like.

The fiber cord treated by the two-bath treating adhering method becomes hard and the handling thereof is difficult in view of the production (see JP-A-06-173172). A rubber article reinforced therewith initially exhibits a high adhesion force even at a high temperature, but after it is used under a high temperature and a high strain, the degradation of adhesion and cord fatigue are violently caused and there is an inconvenience that the service life of the article is considerably reduced.

Since a high adhesion force is obtained just for a short time, however, if the above adhesion degradation and cord fatigue could be improved, such a method may be able to be applied to tires running at the high temperature and the like.

Recently, tire performances are improved, while strain or heat input to the cord through the rotation of the tire becomes severer. For example, it has been conventionally sufficient to ensure an adhesion performance up to about 190° C. during the running even in case of a racing tire (see "Tire Engineering for Driver", p.182, line 3: Grand Prix Press Co. Ltd.; 1989).

Lately, run flat tires capable of running at a puncture state are noticed. In this tire, the heat generation due to the running at the puncture state is large, and particularly, the temperature becomes higher in local portions causing the concentration of strain stress, so that the temperature of the tire reinforcing cord easily causing the concentration of strain stress in view of its structure may reach a temperature thermally deforming the tire reinforcing cord made of polyester or nylon.

The thermal deformation condition of a resin material such as a polyester, a nylon or the like depends not only on the temperature but also on the strain. Namely, as the strain becomes large, creep deformation may be caused even at a temperature lower than its melting point.

Under such circumstances, the heat-resistant performance required in an adhesive for tire cords lies in a point that the adhesion state is kept up to a condition where the tire cord is thermally deformed by heat and strain. Although this condition differs depending upon the cord material, it is preferable that the adhesive layer is not peeled at least up to a temperature near 200° C.

In some cases, a rubber hardened by increasing a sulfur content is used as a reinforcing rubber for a tire. In the vicinity of such a reinforcing rubber, the amount of sulfur migrating from the reinforcing rubber into the adhesive layer is increased and strain deterioration produced by the sulfur crosslinking of the adhesive layer under a high heat may be increased.

From a viewpoint of the adhesion durability and fatigue property of cord under high strain in such a condition, the adhesion durability is insufficient in both of the adhesive compositions based on the above one-bath treating adhering method and two-bath treating adhering method.

Therefore, under a situation that the tire carcass material and the like of the run flat tire reach a high temperature during the running of the tire, there is no example of practically using polyester fiber, aromatic polyamide fiber, acrylic fiber or the like as a tire reinforcing fiber.

Moreover, the vulcanization is demanded to be carried out at a high temperature, for example, above 190° C. in order to improve the tire performances and also to shorten the process time even at the vulcanization step in the manufacture of rubber articles such as tires and so on, so that it is required to develop an adhesive composition endurable to thermal deterioration.

From the above view points, there is strongly demanded an adhesive composition having a good durability under high temperature and high strain.

The adhesive composition satisfying these demands is required to be high in the initial adhesion force and excellent in the following three performances. That is, (i) the adhesion property at a high temperature is high, (ii) the thermal deterioration of adhesion force at a high temperature is less, and (iii) the fatigue resistance of the cord under a high strain is good.

(i) Firstly, an adhesive composition having a high adhesion property at a high temperature is required to be high in the resistance to cohesive failure at the high temperature. The resistance to cohesive failure of the adhesive composition at the high temperature can be explained from a change of physical state of molecules reversibly changing through a temperature such as cohesive state of molecule and motion of molecular chain in the adhesive composition (see "Development and Application of Functional Adhesive" (the latter volume), p174; 1997; CMC).

In order to increase the resistance to cohesive failure drag at the high temperature, there are, for example, a method of using a high Tg material in the adhesive composition, a method of crosslinking molecules of the adhesive with a crosslinking agent or the like. When the high Tg material is used in the adhesive composition, thermal motion of the molecule at the high temperature lowers to increase the resistance to cohesive failure of the adhesive layer, while when molecules of the adhesive composition are properly crosslinked with the crosslinking agent or the like, the fluidization of the molecular chains by the high temperature is controlled and the adhesive layer hardly causes thermal deformation (creep) at the high temperature.

In order that the adhesive layer is not broken during the running of the tire at the high temperature or in a peeling test at the high temperature, it is required that the resistance to cohesive failure of the adhesive layer at the high temperature is made higher than that of rubber or fiber as an adherend.

(ii) In order to reduce the thermal deterioration of the adhesion force at a high temperature, it is required to make small a change of a chemical structure caused depending on temperature and time (see the aforementioned "Development and Application of Function Adhesive" (the latter volume), p174).

As factors of the chemical structure change decreasing the adhesion force, mention may be made of (ii-1) generation of strain accompanied with the structure change in the inside of the adhesive composition through the crosslinking reaction, (ii-2) degradation of the resin material as an adherend by thermal decomposition promoted by components of the adhesive composition or the like.

There will be firstly explained (ii-1) strain accompanied with the structural change in the inside of the adhesive composition through the crosslinking reaction.

Particularly, in case of a resin material having a relatively weak interaction at an adhesive-resin interface such as polyester or the like, it is needless to say that it is important to control the chemical structure change in shrinking-curing through intermolecular crosslinking of the adhesive composition applied onto the surface of the resin material so as not to become excessively large.

As the crosslinking reaction in the inside of the adhesive compositions, mention may be made of a crosslinking reaction of an epoxy resin (see Koichi Ochi, Kazuhiro Odera, "Japan Adhering Society Magazine", 28, 272 (1992)), a crosslinking reaction of a rubber latex containing carbon-carbon double bond or the like with sulfur (see the aforementioned WO 97/13818).

The internal stress created by the crosslinking reaction of epoxy differs in accordance with the kind and amount of the epoxy resin and the type of a curing agent. For example, so-called flexible epoxy resins such as glycidyl ester of a long chain aliphatic acid, glycidyl ether of a polyvalent alcohol and the like (see "Increasing Performance of Epoxy Resin and Market View" p162; 1990; CMC) are small in the strain at the adhesion accompanied with the curing reaction, so that they are used in an adhesive composition between rubber and fiber from the old time. However, it can not be said that the sufficient and chemical heat resistance is obtained in the adhesive composition using only the flexible epoxy resin.

Since a polymer having a sulfur-reactive carbon-carbon double bond with a hydrogen group in its allyl position such as rubber latex or the like reacts with sulfur migrating from rubber as an adherend, it is effective to reduce the number of carbon-carbon double bonds reacting with sulfur.

Moreover, as the temperature is raised, the crosslinking through sulfur changes from polysulfide bonding to monosulfide bonding, and hence the number of crosslinked points increases and the length of the crosslinked portion becomes extremely short, and also the lowering of the adhesion force becomes rapidly large. Therefore, it is not said that the above polymer is suitable in the adhesive composition for the coating of the resin material having a relatively weak interaction at the adhesive-resin interface. And also, in non-general-purpose tires requiring the heat resistance, the adhesive composition "directly" coating the resin material is preferable to have a property being less in the sulfur-reactivity.

In order that the breakage is not caused between the adhesive layer and the synthetic resin during the running of the tire at the high temperature or in the peeling test after the heat aging, it is necessary to reduce strain in the inside of the adhesive layer generated by the crosslinking reaction in the adhesive layer directly coating the resin material.

Next, there will be explained (ii-2) the deterioration of the resin material adhered through thermal decomposition promoted by the components of the adhesive composition and the like.

In general, it is known that in the resin material such as polyester or the like, hydrolysis reaction is promoted by an alkali component under heating. In the past, it has been known that in the rubber articles such as tire and the like, as an amine component derived from a component of a vulcanization accelerator included in the adhered rubber, the heat deterioration of polyester becomes remarkable. This is due to the fact that the hydrolysis reaction of the ester under a high temperature is promoted by the alkali component, whereby the molecule of the polyester resin material is changed into a brittle state in view of its chemical structure to lower the strength of the resin material. For this end, the improvements have been made by largely decreasing an amount of a vulcanization accelerator component contained in the adhered rubber.

Namely, it is needless to say that even in the adhesive composition coating the resin material such as polyester or the like, it is preferable to remove the alkali component promoting the hydrolysis reaction of the ester bond as much as possible.

As the alkali component easily promoting such a hydrolysis reaction of ester bond, mention may be made of non-volatile amines having relatively low to medium molecular weights, and a base of a monovalent metal such as an alkali metal or the like. These alkali components easily diffuse in the adhesive composition at a high temperature and migrates into the resin material such as polyester or the like.

Among the alkali components contained in the adhesive composition, high molecular weight amines, a base of a polyvalent metal and volatile amine are mentioned, for example, as an alkali component having a relatively small effect of promoting the hydrolysis reaction of the ester bond in the resin material. This is due to the fact that in the deterioration of the adhered resin material through thermal decomposition, the effect of promoting the deterioration by the alkali contained in the adhesive composition becomes smaller as the amount of alkali diffused and migrated from the adhesive composition into the resin material under heat.

Among the above alkali components, the high molecular weight amine hardly diffuses owing to the large molecule and hence the amount of alkali mitigating into the resin material becomes less. In general, most of the bases of polyvalent metals hardly dissociate ionic bond as compared with the monovalent metal, so that as ion is hardly dissociated, they are not dissolved in a solvent for the adhesive composition such as water or the like and easily dispersed thereinto as particles. Such particles are dissolved in the adhesive composition and hardly diffuse thereinto, so that the amount of alkali migrating into the resin material becomes less. Further, the volatile amine volatilize together with a solvent such as water when the adhesive composition is applied to the resin material and subjected to a heat treatment, so that the amount of such an amine is decreased from the adhesive composition and hence the amount of alkali migrating into the resin material becomes less.

As described above, in the non-general-purpose tires requiring the heat resistance, it can be said that it is preferable to decrease the nonvolatile amines having relatively low to medium molecular weight or the base of the monovalent metal such as alkali metal or the like, which promotes the deterioration of the resin material through hydrolysis reaction, from the adhesive composition directly applied onto the resin material.

(iii) Finally, in order to obtain an adhesive composition providing a good fatigue resistance of cord under a high strain, it is required that the fatigue resistance under a rotating strain is high.

When the adhesive composition is hard and brittle, cracks are created in the adhesive layer by continuous strain during the running of tire, and hence strain stress is apt to concentrate at cord filaments in a crack progressing direction. Particularly, as the adhesive composition becomes harder and more brittle, the cords are locally bent without uniformly flexing and stress concentrates in the bent portion and also heat build up becomes locally larger, and the cords are broken due to thermal deformation as the case may be.

For example, a high stiffness cord obtained by treating a cord of polyethylene terephthalate material with a hard adhesive composition fuses and cuts in a fatigue time of 10–20 minutes according to a tube fatigue test. On the other hand, when the same cord is treated with a soft adhesive composition, heat generation of the tube is small even in the tube fatigue time of more than one day and there is not caused a phenomenon of fusing and cutting the cord or the like.

Therefore, the higher flexibility of the adhesive composition is important to improve the fatigue resistance of cord under continuous high strain caused by rotation.

As described above, there has been obtained such a knowledge that the adhesive composition used under high temperature and high strain is important to maintain the adhesion property at the high temperature, adhesion force after heat deterioration and flexibility under the high strain, respectively.

In the adhesive composition being tough in a high temperature region and having a resistance to cohesive failure, the above properties can be improved by a method wherein a greater amount of a heat-resistant material is compounded to raise Tg of the adhesive composition. However, the flexibility at room temperature region or in a tire running temperature region is apt to become less, resulting in such a contradiction that the durability of the adhesive composition under continuous strain lowers.

And also, the above properties can be improved by a method wherein the number of intermolecular crosslinkings in the adhesive composition is increased. However, there is such a contradiction that when the crosslinking shrinkage of the adhesive composition becomes too large, the adhesion force after heat deterioration lowers.

Therefore, there is examined a method of blending a thermoplastic resin or the like as a modifier with an adhesive composition matrix comprising an epoxide compound and a blocked isocyanate. In this case, it is considered that the resin compounded as a modifier acts to decrease internal stress created in the adhesive composition or to suppress the thermal deformation. Further, as a method for modifying an adhesive composition in an aqueous solvent useful for the environment, mention may be made of a method of blending a water-soluble polymer as a modifier, and a method of blending a water-dispersible polymer such as latex, emulsion or the like.

As the method for adding a water-dispersible thermoplastic high polymer as a modifier to the adhesive composition matrix, there is mentioned, for example, a method of blending a rubber latex (see the aforementioned JP-A-60-24226). This is considered to have such an effect that flexible latex particles are dispersed into the adhesive composition matrix being tough and having the resistance to cohesive failure at a high temperature region but being brittle to thereby improve a property capable of absorbing strain inside the adhesive layer accompanied with the crosslinking of the epoxy resin or the like and strain in the running. And also, JP-A-11-03418 discloses, for example, a method wherein the adhesion property at an interface to the adhesive matrix or the like can be more improved by compounding an epoxy-modified styrene-butadiene copolymer rubber latex to introduce crosslinkable functional group into the latex.

However, there is such a deficiency that the rubber latex component contained in the adhesive composition causes heat deterioration through vulcanization reaction between rubber latex and sulfur migrating from the adhered rubber under a high temperature of about 200° C. to lower the adhesion force.

And also, the adhesion for tire cord is exemplarily of a method of adding a water-dispersible polymer such as an emulsion of a thermoplastic polymer containing in its main chain structure substantially free of carbon-carbon double bond with a hydrogen radical at its allyl position or the like other than the rubber latex, and JP-B-3-26690 discloses an oxazoline group-containing latex as a thermoplastic polymer containing in its main chain structure a pendant group provided with at least one functional group having a crosslinking property and substantially free of carbon-carbon double bond with a hydrogen radical at its allyl position. Furthermore, JP-A-5-339552 discloses a fibrous adhesive composition obtained by dissolving the oxazoline group-containing water-soluble polymer into an aqueous solvent, and JP-A-6-123078 discloses a method of treating with a first treating solution containing a polyepoxide compound, a blocked polyisocyanate compound and a rubber latex, and then treating with a second treating solution obtained by adding and compounding a compound having an oxazoline group with RFL.

As the thermoplastic polymer containing in its main chain structure a pendant group provided with at least one functional group having the crosslinking property and substantially free of carbon-carbon double bond with a hydrogen radical at its allyl position, there is known an urethane resin having a hydrazino group (hydrazine residue) such as a polyurethane resin for a gravure lamination ink or the like, in which the hydrazino group is crosslinked with a carbonyl group at the surface of the synthetic resin such as polyethylene terephthalate (formation of covalent bonding) to obtain an effect of strengthening the adhesion force between an ink coating and an adhered resin (see Kenji Miyamoto, "Japan Adhesion Academy Magazine" VOL. 32, No. 8 (1996), p.316, JP-A-10-139839 and the like).

However, there has not yet been found out an adhesive composition comprised of the thermoplastic polymer containing in its main chain structure a pendant group provided with at least one crosslinking functional group and substantially free of carbon-carbon double bond with a hydrogen radical at its allyl position, and having sufficient heat-resistant adhesion force, particularly adhesion durability under a severe temperature condition of 200° C., and fatigue resistance of cord when treated to synthetic fibers.

As an example of adding a water-soluble high polymer as a modifier to an adhesive composition matrix, there are mentioned a method of adding a thermoplastic resin containing, for example, an amino group or a carboxyl group as a modifier and so on.

Particularly, according to a literature (Large Encyclopedia for Adhesion; supervised and translated by H. Mizumachi et al., 1993, Asakura Bookstore, p. 195), it is considered that the carboxyl group can play a main role of chemical reaction exerting upon a crosslinking inside and between chains of the polymer and upon an affinity to an adherend and is related to a fact that an acid or other electron accepting group improving the adhesion force causes an electron movement at an interface between the polymer and the adherend. Therefore, there are made various proposals on the application of a carboxylated polymer to the adhesive composition.

In connection with a water-soluble high polymer obtained by copolymerizing maleic anhydride and a monomer including isobutylene among the carboxylated polymers, an adhesive composition containing the water-soluble high polymer obtained by copolymerizing maleic anhydride and the monomer including maleic anhydride, an epoxide compound and a metal salt or a metal oxide or a rubber latex comprised of styrene-butadiene copolymer is disclosed in JP-A46-20521, JP-A-10-310755 and the like.

However, the heat resistance and durability of the adhesion performance are examined by applying such a carboxyl group-containing water-soluble high polymer to the adhesive composition, but there has not yet been found an adhesive composition sufficiently establishing the three subject matters of heat deteriorations under a high temperature of about 200° C. and through sulfur at the high temperature and durability under high strain.

Further, there are disclosed many examples of adding a benzene derivative containing a (blocked) isocyanate group or a compound having a structure with methylene linked aromatics having a polar functional group to the adhesive composition as an adhesion promoter to be added to the adhesive composition.

As the benzene derivative having the (blocked) isocyanate group, there are mentioned (blocked) isocyanates such as tolylene diisocyanate (dimer thereof), m-phenylene diisocyanate, p-phenylene diisocyanate, tetramethylxylene diisocyanate, isopropenyl dimethylbenzyl isocyanate and the like.

As the compound having a structure with methylene linked aromatics having a polar functional group, there are mentioned (blocked) isocyanates such as diphenylmethane-4,4'-diisocyanate, blocked product thereof and the like; phenolic resins such as resorcin-formaldehyde condensate, chlorophenol-resorcinol-formaldehyde condensate and the like obtained through novolak reaction; modified phenolic resins such as cresol novolak resin having an epoxy group and the like; an aqueous urethane compound obtained by reacting an organic polyisocyanate having a structure with methylene linked aromatics, a compound having two or more active hydrogens and a component including a thermally dissociatable blocking agent, and so on.

These adhesion promoters are used in many adhesive compositions disclosed in tire cord and rubber owing to the action enhancing adhesive performances and adhesion property to the resin material such as polyester or the like.

As regard to the aqueous urethane compound (I) obtained by reacting the organic polyisocyanate having a structure of bonding an aromatic to methylene, the compound having two or more active hydrogens and the component including a thermally dissociatable blocking agent, JP-B-63-51474 discloses, for example, a heat-reactive type aqueous urethane resin as an adhesion improver for an organic high polymer material.

And also, JP-A-9-111050 discloses a rubber/cord composition treated with a heat-reactive type aqueous urethane resin and an epoxy compound, and JP-A-11-35702 discloses a rubber/cord composition treated with a first treating solution comprised of styrene-butadiene copolymer rubber latex or epoxy-modified styrene-butadiene copolymer rubber latex and thereafter treated with a second treating solution comprised of RFL.

However, the styrene-butadiene copolymer rubber latex is used in these adhesive compositions, so that the heat-resistant adhesion force of the synthetic fiber treated, particularly the adhesion force after the heat deterioration at 200° C. can not be said to be sufficient as compared with the adhesive composition containing the polymer, water-soluble high polymer or the like containing substantially free of carbon-carbon double bond with a hydrogen radical at its allyl position as in the invention.

As an example of compounding the metal salt or the metal oxide as a filler with the adhesive composition, there are mentioned, for example, an adhesive composition compounded with maleic anhydride-isobutylene copolymer and a metal salt or metal oxide as disclosed in JP-B-46-20521, a method of adding bentonite (JP-B-60-24226) or smectite (JP-B-57-29586) as a mixture of metal oxides to epoxy and blocked isocyanate compounds, and the like. By the addition of the filler such as metal salt or metal oxide is improved the cost performance if the filler is inexpensive. Particularly, when the carboxylated polymer such as maleic anhydride-isobutylene copolymer or the like is included in the adhesive composition, there is known an example that an interaction of ionic bonding between a metal position of the filler and the adhesive composition is developed to provide ductility and toughening effect to the adhesive composition (see "Japan Adhering Society Magazine", p287, Vol. 10, No. 6 (1974)).

Even in the adhesive composition containing the metal salt and metal oxide as a filler, however, it can not be said that the three subject matters of heat deterioration under a high temperature of about 200° C. and through sulfur at the high temperature and the durability under a high strain can be fully established as compared with the adhesive composition including the thermoplastic high molecular weight polymer (A), the water-soluble high polymer (B) and the compound (C) or the aqueous urethane compound (1).

It is, therefore, an object of the invention to provide an adhesive composition having a sufficient durability to adhesion deterioration at a high temperature, for example, an initial adhesion and an adhesion property under a high temperature condition of 200° C. and an adhesion force after the heat deterioration at 200° C. for 30 minutes and good adhesion durability under continuous strain in a tire or the like, a resin material such as a cord or the like treated with such an adhesive composition, a rubber article reinforced with such a resin material, which has excellent fatigue resistance and heat resistance, and a pneumatic tire controlling the lowering of adhesion force in heat endurance by using such a rubber article and having an excellent durability.

The inventor has made various studies with respect to the adhesion property under a high temperature condition, deterioration of adhesion force through strain in the adhesion created with a lapse of time at the high temperature and fatigue property of the adhesive composition under a high strain, and found that an adhesive composition including (A) a thermoplastic high molecular weight polymer containing a pendant group provided with a crosslinkable functional group and substantially free of carbon-carbon double bond with a hydrogen radical at its allyl position, (B) a water-soluble high polymer and (C) a compound having a structure with methylene linked aromatics having a polar functional group is effective as an adhesive composition directly covering a resin material, and as a result, the invention has been accomplished.

In order to achieve the above object, the invention is constituted as follows:

(1) A first adhesive composition according to the invention comprises (A) a thermoplastic high molecular weight polymer containing a pendant group provided with a crosslinkable functional group and substantially free of carbon-carbon double bond with a hydrogen radical at its allyl position, (B) a water-soluble high polymer and (C) a compound having a structure with methylene linked aromatics having a polar functional group. Alternatively, in addition to the above components, the adhesive composition includes at least one component selected from the group consisting of (D) an aliphatic epoxide compound, (E) a metal salt, (F) a metal oxide, (G) a rubber latex and (H) a benzene derivative having two or more (blocked) isocyanate groups.

(2) A second adhesive composition according to the invention comprises (A) the above thermoplastic high molecular weight polymer and (I) an aqueous urethane compound obtained by reacting (α) an organic polyisocyanate having a structure with methylene linked aromatics, (β) a compound having plural active hydrogens and (γ) a thermally dissociatable blocking agent for an isocyanate group. Alternatively, in addition to the above components, the adhesive composition includes at least one component selected from the group consisting of (D) an aliphatic epoxide compound, (E) a metal salt, (F) a metal oxide, (G) a rubber latex and (H) a benzene derivative having two or more (blocked) isocyanate groups.

(3) A third adhesive composition according to the invention comprises (B) the above water-soluble high polymer and (I) the above aqueous urethane compound. Alternatively, in addition to the above components, the adhesive composition includes at least one component selected from the group consisting of (D) an aliphatic epoxide compound, (E) a metal salt, (F) a metal oxide, (G) a rubber latex and (H) a benzene derivative having two or more (blocked) isocyanate groups.

In the invention, the term "pendant group" means a functional group modifying a high polymer chain. And also, the introduction of the pendant group into the high polymer chain can be carried out by any known methods such as a method of introducing a pendant group into the high polymer chain through chemically modifying reaction and the like in addition to a method of polymerizing a monomer containing a group to be pendant as in the invention. Further, the term "aqueous" in the aqueous urethane compound or the like indicates water soluble or water dispersible, and the term "water soluble" does not necessarily mean completely water soluble but also means partially water soluble or a feature that phase separation does not occur in the aqueous solution of the adhesive composition according to the invention, and the term "water dispersible" means that it disperses in water or in the aqueous solution of the adhesive composition according to the invention, and the term "carbon-carbon double bond with a hydrogen radical at its allyl position" means a "carbon-carbon double bond with a hydrogen radical at a saturated carbon atom of its allyl position" and does not include a carbon-carbon double bond having a resonance stability such as an aromatic six-membered ring or the like. Further, the term "(co)polymer" means "polymer or copolymer", and the term "(blocked) isocyanate" means "blocked isocyanate or isocyanate" and includes a blocked isocyanate produced by reacting a blocking agent to an isocyanate group, an isocyanate with an isocyanate group not reacted with a blocking agent, an isocyanate obtained by dissociation of the blocking agent in the blocked isocyanate and so on.

And also, the water-soluble high polymer (B) according to the invention is preferable to have a carboxyl group. Moreover, it includes such a case that a carboxyl group is isolated when an adhesive composition is dissolved into water in use or the like. As such a water-soluble high polymer, there are mentioned a salt of water-soluble high polymer with a basic compound, and a water-soluble high polymer containing a unit capable of isolating a carboxyl group through hydrolysis such as a maleic anhydride unit, an anhydrous maleimide unit or the like, and so on.

(4) The resin material according to the invention is characterized in that its surface is coated with the above adhesive composition.

(5) The rubber article according to the invention is characterized in that it is reinforced with the above resin material.

(6) The pneumatic tire according to the invention is characterized in that the above rubber article is applied as a rubber member.

The invention will be described in detail below.

[1] The Thermoplastic High Molecular Weight Polymer (A) Will be Described Below

The thermoplastic high molecular weight polymer (A) is a thermoplastic resin included as a modifier in the adhesive composition for the purpose of enhancing a flexibility of a matrix of the adhesive composition which tends to become hard and brittle through the crosslinking component such as the compound (C) or the aqueous urethane compound (I) or the aliphatic epoxide compound (D).

Because the thermoplastic high molecular weight polymer (A) enhances the flexibility of the adhesive composition while controlling the adhesion strain caused by the crosslinking reaction with sulfur, the lowering of cord tenacity under a high strain can be prevented and the adhesion force after the heat aging and the flexibility under the high strain can be maintained.

Further, the fracture toughness and the resistance to thermal deformation can be held by the action of a relatively high flexibility provided by a crosslinking reaction at a crosslinkable pendant group included in the thermoplastic high molecular weight polymer (A).

In the thermoplastic high molecular weight polymer (A), a crosslinkable functional group is provided as a pendant group. This is due to the fact that the molecular motion at a high temperature can be suppressed by intermolecular crosslinking or the like of the thermoplastic high molecular weight polymer (A) to thereby improve the adhesion force at the high temperature in addition to the obtention of bond between the adhesive layer and the resin surface. However, when the amount of the crosslinkable functional group becomes excessive, the chemical heat resistance lowers.

The crosslinkable functional group in the pendant group of the thermoplastic high molecular weight polymer (A) preferably includes any of an oxazoline group, a bismaleimide group, a (blocked) isocyanate group, an epoxy group, an aziridine group, a carbodiimide group, a hydrazino group and an epithio group. Particularly, the oxazoline group, hydrazino group or (blocked) isocyanate group is favorable.

The preferable amount of the crosslinkable functional group included in the thermoplastic high molecular weight polymer (A) depends upon the molecular weight of the main chain structure in the thermoplastic high molecular weight polymer (A), the kind of the crosslinkable functional groups included in the pendant group, and the molecular weight of the pendant group, but is generally favorable to be within a range of 0.01 millimol/g–8.0 millimol/g based on the total weight of the dried thermoplastic high molecular weight polymer (A).

Particularly, when the crosslinkable functional group is a self-crosslinkable functional group capable of crosslinking in the molecule of the thermoplastic high molecular weight polymer (A), the amount is preferable to be 0.01 millimol/g–6.0 millimol/g.

This is to avoid an increase in modulus through the self-crosslinking which lowers the effect of improving the flexibility, which is the main purpose of adding the thermoplastic high molecular weight polymer (A), and deteriorates the adhesion due to strain produced by the internal stress.

For this end, the preferable amount of the pendant group provided with the crosslinkable functional group to be introduced into the thermoplastic high molecular weight polymer (A) is within a range of improving the adhesion at an interface between the adhesive matrix and the high molecular weight polymer and of not generating the lowering of the flexibility through the self-crosslinking.

And also, the main chain of the thermoplastic high molecular weight polymer (A) is substantially free of carbon-carbon double bond with a hydrogen radical at its allyl position in order to avoid the heat deterioration of adhesion accompanied with the sulfur crosslinking which becomes large in the use of the rubber article containing sulfur and the like when the main chain of the thermoplastic high molecular weight polymer (A) is sulfur reactive.

Moreover, the thermoplastic high molecular weight polymer (A) may have a carbon-carbon double bond when it has a structure having a side chain and the like in addition to the main chain. In this case, such a double bond, just like that in the main chain, is favorable to have a low reactivity with sulfur such as an aromatic carbon-carbon double bond, which is stable owing to, for example, resonance structure or the like.

Further, the thermoplastic high molecular weight polymer (A) is preferable to be a high molecular weight polymer having mainly a straight chain structure and being in a relatively high molecular weight region. More preferably, it has a weight average molecular weight of not less than 10,000, more particularly not less than 20,000 as converted into polystyrene through a gel permeation chromatography.

Because, when the molecular weight is too small, the effect of improvement by absorbing the strain through the adhesion is not obtained.

Moreover, the thermoplastic high molecular weight polymer (A) can be synthesized from the same starting material as in the aqueous urethane compound (I) although the aqueous urethane compound (I) preferably has a molecular weight within a range of relatively low to middle molecular weight, more preferably, not more than 9,000 as will be mentioned later.

In the synthesis or the like of the thermoplastic high molecular weight polymer (A), an alkali can be used as a starting material. In this case, the kind and amount of the alkali differ depending on the polymer and are not particularly limited. However, the amount of the alkali is favorable to be decreased as far as possible when using a base of an alkali metal and non-volatile and relatively low to middle molecular weight amines. Even when using a volatile amine or the non-volatile and relatively low to middle molecular weight amines, an amine component may be used insofar as it is incorporated into the polymer in the reaction of the polymer.

This is due to the fact that when the alkali component diffuses into the resin material as previously mentioned, it promotes the hydrolysis reaction of ester bond in the resin material.

It is favorable that the thermoplastic high molecular weight polymer (A) is water dispersible because water can be used as a solvent and contamination into the environment can be decreased.

The glass transition temperature of the thermoplastic high molecular weight polymer (A) is preferably not lower than −90° C. and not higher than 180° C.

When the glass transition temperature is lower than −90° C., the creeping property becomes large in use at a high temperature, while when it is higher than 180° C., the polymer becomes too hard and the stress relaxation inherent to the soft thermoplastic resin becomes small, and the fatigue resistance of cord under a high strain as used in a tire or the like lowers. From the similar point of view, the glass transition temperature is more preferably not lower than −50° C. and not higher than 120° C., particularly not lower than 0° C. and not higher than 100° C.

As the main chain of the thermoplastic high molecular weight polymer (A), use may be preferably made of an ethylenic addition polymers such as an acrylic polymer, a vinyl acetate based polymer, a vinyl acetate-ethylene based polymer and the like; and a urethane based high molecular weight polymer mainly having a straight-chain structure. This is due to the fact that the urethane bond in such a urethane based high molecular weight polymer is high in the cohesive energy existing in the molecule and in the resistance to cohesive failure based on the intermolecular secondary bond through the urethane bond, so that the durability is improved.

These polymers may be used alone or in a combination thereof.

The main chain structure of the thermoplastic high molecular weight polymer (A) will be described below by dividing into cases of [1-1] an ethylenic addition polymer and [1-2] a urethane based high molecular weight polymer.

[1-1] Ethylenic Addition Polymers

When the thermoplastic high molecular weight polymer (A) is made of an ethylenic addition polymer, it comprises (a) an ethylenically unsaturated monomer having a single carbon-carbon double bond and (b) a monomer having two or more carbon-carbon double bonds.

(a) As the ethylenically unsaturated monomer having a single carbon-carbon double bond, mention may be made of α-olefins such as ethylene, propylene, butylene, isobutylene and the like; α, β-unsaturated aromatic monomers such as styrene, α-methylstyrene, monochlorostyrene, vinyl toluene, vinyl naphthalene, sodium sulphonate and the like; ethylenic carboxylic acids such as itaconic acid, fumaric acid, maleic acid, acrylic acid, methacrylic acid, butenetricarboxylic acid and the like or salts thereof; acid anhydrides such as maleic anhydride, itaconic anhydride and the like; esters of unsaturated carboxylic acids such as methyl(metha)acrylate, ethyl(metha)acrylate, butyl(metha)acrylate, 2-ethylhexyl(metha)acrylate, (metha)acrylic acid methoxypolyethylene glycol, 2-hydroxyethyl(metha)acrylate, 2-aminoethyl(metha)acrylate and the like; monoesters of ethylenic dicarboxylic acids such as itaconic acid monoethylester, fumaric acid monobutylester, maleic acid monobutylester and the like; diesters of ethylenic dicarboxylic acids such as itaconic acid diethylester, fumaric acid dibutylester and the like; amides of α, β-ethylenically unsaturated acids such as acrylamide, maleic amide, N-methylol acrylamide, N-(2-hydroxyethyl)acrylamide, methacrylamide, N-methylol methacrylamide, N-(2-hydroxyethyl)methacrylamide, maleic amide and the like; hydroxyl group-containing monomers such as 2-hydroxyethyl(metha)acrylate, polyethylene glycol mono (metha)acrylate and the like; unsaturated nitriles such as acrylonitrile, methacrylonitrile, fumaronitrile, α-chloroacrylnitrile and the like; vinyl ethers such as methyl vinyl ether, ethyl vinyl ether and the like; vinyl ketones; vinyl amides; halogen-containing α, β-unsaturated monomers such as vinyl chloride, vinylidene chloride, vinyl fluoride, vinylidene fluoride and the like; vinyl compounds such as vinyl acetate, vinyl valerate, vinyl caprylate, vinylpyridine and the like; addition polymerizable oxazolines such as 2-isopropenyl-2-oxazoline and the like; heterocyclic vinyl compounds such as vinylpyrrolidone and the like; unsaturated-bond-containing silane compounds such as vinyl ethoxysilane, α-methacryloxy propyltrimethoxy silane and the like.

(b) As the monomer having two or more carbon-carbon double bonds, mention may be made of conjugated diene monomers such as 1,3-butadiene, 2-methyl-1,3-butadiene, 2,3-dimethyl-1,3-butadiene and halogen substituted butadiene such as chloroprene or the like; and non-conjugated diene monomers such as vinyl norbornene, dicyclopentadiene, 1,4-hexadiene and the like.

These monomers may be used alone or in combination of two or more monomers. Further, it is preferable to obtain the polymer (A) by a radical addition polymerization.

The method of introducing a crosslinkable functional group is not specifically limited. For example, there can be adopted a method of copolymerizing an addition polymerizable monomer having any of an oxazoline, an epoxy group, a maleimide, a blocked isocyanate group or an epithio group in the polymerization of any of the abovementioned monomers through a radical addition polymerization or the like.

The addition polymerizable monomer containing oxazoline in its pendant group can be represented by the following general formula:

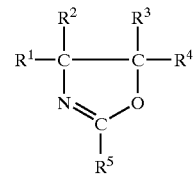

[wherein $R^1$, $R^2$, $R^3$ and $R^4$ each independently represents a hydrogen atom, a halogen atom, an alkyl group, an aralkyl group, a phenyl group or a substituted phenyl group, and $R^5$ represents a non-cyclic organic group having an addition polymerizable unsaturated bond].

Concretely, mention may be made of 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. Among them, 2-isopropenyl-2-oxazoline is favorable because it is industrially available with ease.

As the addition polymerizable monomer containing an epoxy group in its pendant group, mention may be made of glycidyl esters of unsaturated carboxylic acids such as glycidyl(metha)acrylate, β-methylglycidyl(metha)acrylate, dicyclopentenyl(metha)acrylate, (metha)acrylic monomer having an alicyclic epoxy group such as 4-vinylepoxy cyclohexane, 6-vinyl epoxynorbornane or the like, and so on. Particularly, glycidyl(metha)acrylate is preferable.

As the addition polymerizable monomer containing a bismaleimide group in its pendant group, mention may be made of maleimide, N-methylmaleimide, N-butylmaleimide, N-(p-methylphenyl)maleimide, N-phenylmaleimide, N-cyclohexylmaleimide and the like. Particularly, maleimide is preferable.

As the addition polymerizable monomer containing a blocked isocyanate group in its pendant group, there can preferably be exemplified a compound represented by the following general formula:

[wherein $R^6$ is a hydrogen atom or a methyl group, X is —OBO— (where B is an alkylene group having a carbon number of 2–10, which may be substituted with a halogen atom or an alkyl group) or —NH—, and Y is an aromatic diisocyanate residue, and Z is a ketoxime residue].

The addition polymerizable monomer containing a blocked isocyanate group in its pendant group can be obtained by an addition reaction of a well-known blocking agent with a polymerizable monomer having an isocyanate group such as 2-methacryloyloxyethyl isocyanate or the like.

As the well-known blocking agent which can block the isocyanate group, mention may be made of phenols such as phenol, thiophenol, chlorophenol, cresol, resorcinol, p-sec-butylphenol, p-tert-butylphenol, p-sec-amylphenol, p-octylphenol, p-nonylphenol and the like; secondary or tertiary alcohols such as isopropyl alcohol, tert-butyl alcohol and the like; aromatic secondary amines such as diphenylamine, xylidine and the like; phthalic acid imides; lactams such as ε-caprolactam, δ-valerolactam and the like; caprolactams such as ε-caprolactam and the like; active methylene compounds such as maronic acid dialkylester, acetylacetone, acetoacetic acid alkylester and the like; oximes such as acetoxime, methylethylketoxime, cyclohexanonoxime and the like; basic nitrogen compounds such as 3-hydroxypyridine and the like, and acidic sodium sulfite, and so on.

As the addition polymerizable monomer containing an epithio group in its pendant group, mention may be made of 2,3-epithiopropyl-(metha)acrylate; β-methylglycidyl (metha)acrylate; glycidyl esters of unsaturated carboxylic acids such as (metha)acrylic monomer having an alicyclic epoxy group and the like. Particularly, 2,3-epithiopropyl-(metha)acrylate is preferable.

Among these thermoplastic high molecular weight polymers (A), the thermoplastic high molecular weight polymer (A) containing an oxazoline group in its pendant group is preferably used because the preservation stability of the crosslinkable functional group in long-term storage is good.

[1-2] Urethane Based High Molecular Weight Polymer

When the thermoplastic high molecular weight polymer (A) is made of the urethane based high molecular weight polymer, the main chain structure has many bonds generated through the reaction between an isocyanate group and an active hydrogen such as urethane bond, urea bond and the like which are obtained mainly by polyaddition reaction between polyisocyanate and compound having two or more active hydrogens.

Moreover, it is needless to say that an ester bond, an ether bond and an amide bond included in the molecule of the compound having an active hydrogen, and urethodione, carbodiimide and the like produced by the reaction between isocyanate groups are also included in addition to the bonds generated through the reaction between an isocyanate group and an active hydrogen.

The urethane based high molecular weight polymer having an epoxy group can be obtained, for example, by a polyaddition reaction of a compound having a hydroxyl group of diglycidyl ether and an epoxy group such as glycidol, glycerine diglycidyl ether, trimethylolpropane diglycidyl ether bisphenol-A or the like to a terminal isocyanate group of a urethane based high molecular weight polymer having an isocyanate group at its terminal produced by a method as will be described later.

And also, a blocked isocyanate group is obtained, for example, by treating a urethane based high molecular weight polymer having a terminal isocyanate group with a well-known blocking agent.

As a polyisocyanate (a) used in the synthesis of the urethane based high molecular weight polymer according to the invention, mention may be made of aromatic, aliphatic and alicyclic organic polyisocyanates usually used from the old time. Concretely, it includes, for example, isocyanate compounds such as toluene diisocyanate, diphenylmethane diisocyanate, 1,6-hexamethylene diisocyanate, 2,2,4(2,4,4)-trimethylhexamethylene diisocyanate, p-phenylene diisocyanate, 4,4'-dicyclohexylmethane diisocyanate, 3,3'-dimethyldiphenyl 4,4'-diisocyanate, dianisydine isocyanate, m-xylene diisocyanate, hydrogenatedxylene diisocyanate, 1,3-bis(isocyanatemethyl)cyclohexane, tetramethylxylene diisocyanate, isophorone diisocyanate, 1,5-naphthalene diisocyanate, 1,4-cyclohexyl diisocyanate, lysine isocyanate, dimethyl-triphenylmethane tetraisocyanate, triphenylmethane triisocyanate, tris(isocyanatephenyl)thiophosphate, urethane-modified toluene diisocyanate, allophanate-modified toluene diisocyanate, burett-modified toluene diisocyanurate, isocyanurate-modified toluene diisocyanate, urethane-modified diphenylmethane diisocyanate, carbodiimide-modified diphenyl-methane diisocyanate, acylurea-modified diphenylmethane diisocyanate, polymeric diphenylmethane diisocyanate and the like, but is not intended as limitations thereof. They may be used alone or in combination of two or more kinds.

As the compound having two or more active hydrogens (b) used in the synthesis of the urethane based high molecular weight polymer according to the invention, mention may be made of well-known polyethers, polyesters, polyetheresters, polythioethers, polyacetals, polysiloxanes and the like having two or more hydroxyl groups, carboxyl groups, amino groups or mercapto groups at a terminal of the molecule or in the molecule.

Among them, polyether or polyester having two or more hydroxyl groups at the terminal of the molecule is preferable. Such a compound having two or more active hydrogens is preferable to have a molecular weight of 50–5,000.

Concretely, mention may be made of low molecular weight polyols such as ethylene glycol, 1,2-propane diol, 1,3-propane diol, 1,2-butane diol, 1,3-butane diol, 1,4-butane diol, 2,3-butane diol, 2,2-dimethyl-1,3-propane diol, 1,2-pentane diol, 1,4-pentane diol, 1,5-pentane diol, 2,4-pentane diol, 3,3-dimethyl-1,2-butane diol, 2-ethyl-2-methyl-1,3-propane diol, 1,2-bexane diol, 1,5-hexane diol, 1,6-hexane diol, 2,5-hexane diol, 2-methyl-2,4-pentane diol, 1,7-heptane diol, 2-methyl-2-propyl-1,3-propane diol, 2,5-dimethyl-2,5-hexane diol, 1,2-octane diol, 1,8-octane diol, 2,2,4-trimethyl-1,3-pentane diol, propylene diol, glycerin, trimethylolpropane, 1,2,6-hexanetriol, hydrogenated bisphenol A, ethylene oxide or propylene oxide addition product of bisphenol A and the like; and low molecular weight polyols of carboxyl group-containing polyols such as 2,2-bis(hydroxymethyl)propionic acid, 2,2-bis(hydroxymethyl) butanoic acid, 2,5,6-trimethoxy-3,4-dihydroxyhexanoic acid, 2,3-dihydroxy-4,5-dimethoxy pentanoic acid and the like.

As the high molecular weight polyol, mention may be made of polyether polyols such as polypropylene glycol, polyethylene glycol, polytetramethylene glycol, ethylene oxide/propylene oxide copolymer, THF/ethylene oxide copolymer, THF/propylene oxide copolymer and the like;

polyester polyols such as dimethylolpropionic acid, polyethylene adipate, poly(propylene adipate), poly-ε-caprolactone, and their copolymers; polyether ester polyols, polycarbonate polyols of polycarbonoic ester compound or the like, hydrocarbon skeletal polyols, and their polyaddition products and so on, but are not intended as limitations thereof. They may be used alone or in combination of two or more kinds.

As the compound having two or more active hydrogens used in the polyurethane polymer according to the invention, it is favorable to include at least one aromatic compound or a compound having a structure with methylene linked aromatics. This is due to the fact that the adhesion performances to polyester material or the like is obtained by including the structure with methylene linked aromatics. And also, compounds having a structure with a linkage of the aromatic other than methylene linked aromatics are favorable because of similar effect.

As the compound having such a structure, there are mentioned diols represented by the following chemical formulae, but are not intended as limitations thereof.

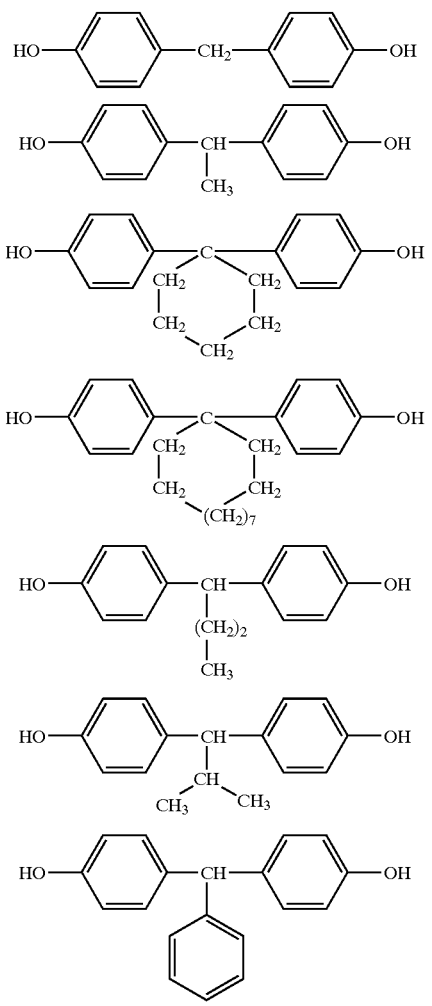

-continued

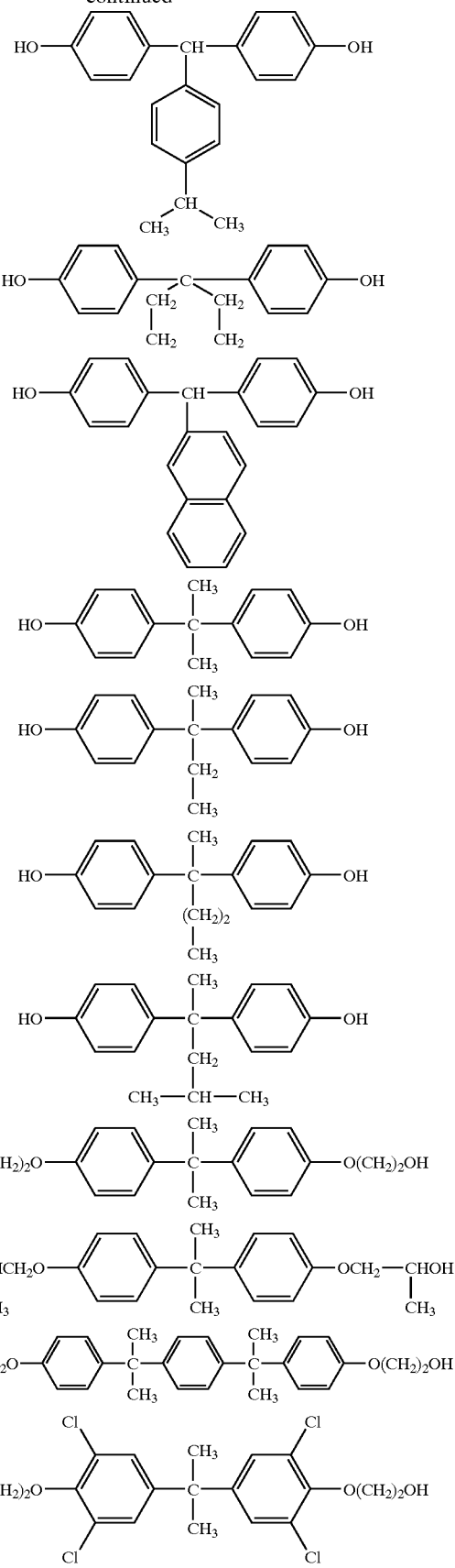

-continued
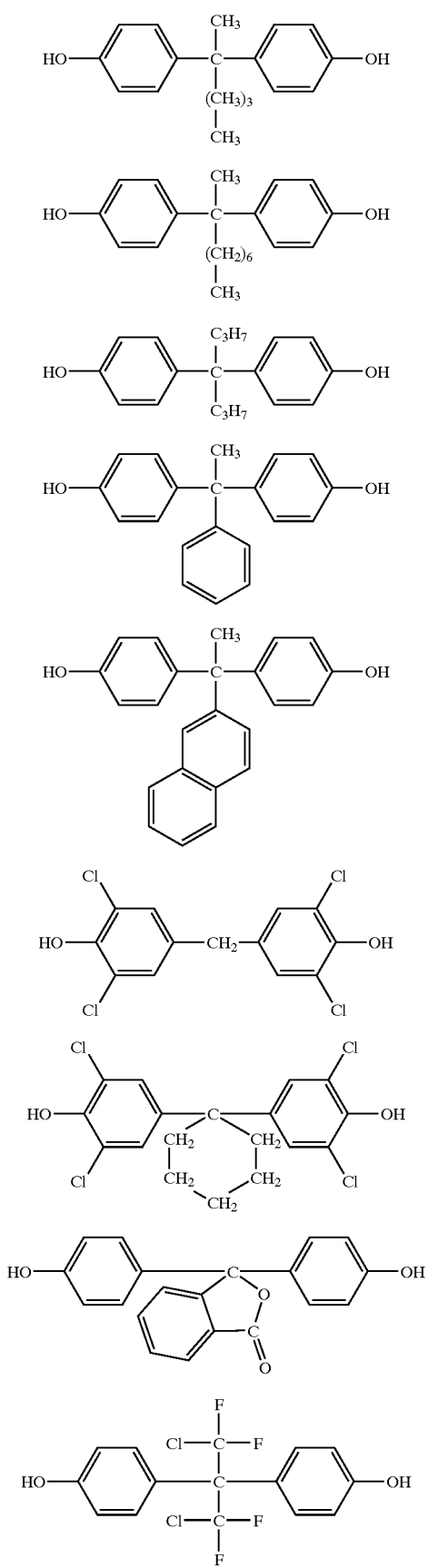
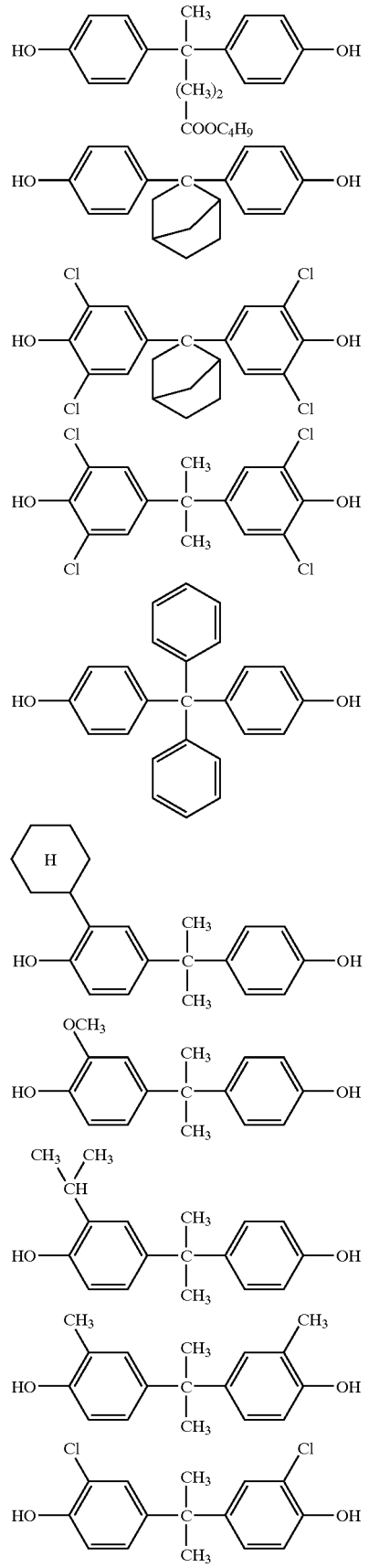

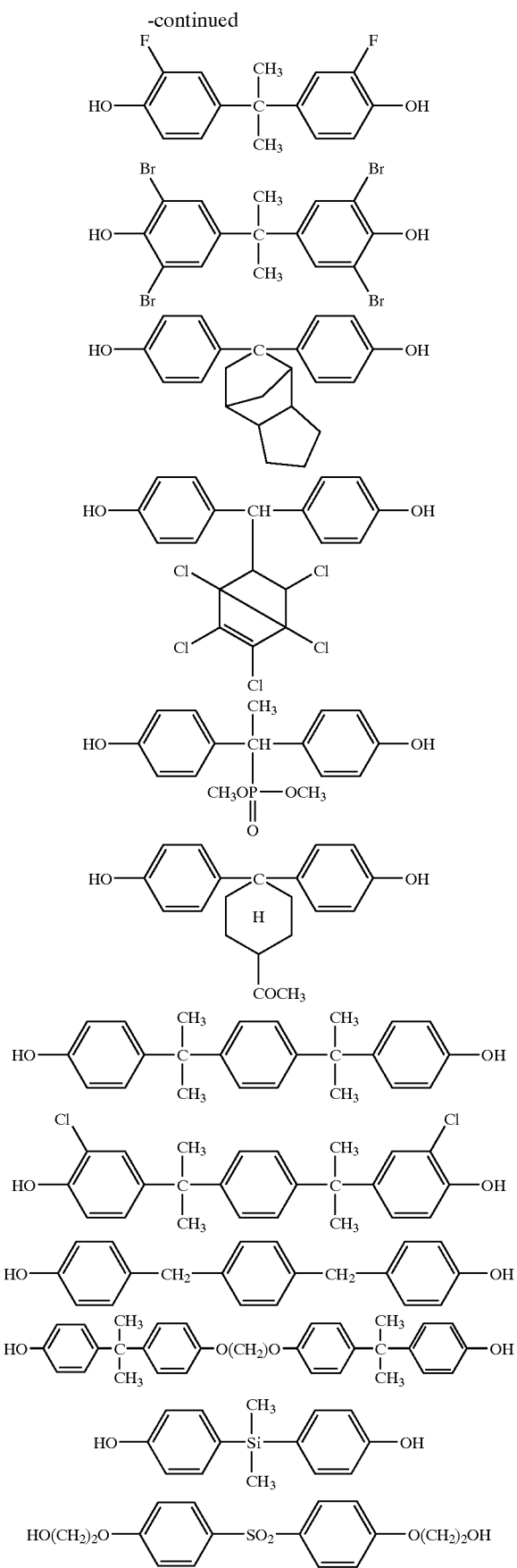
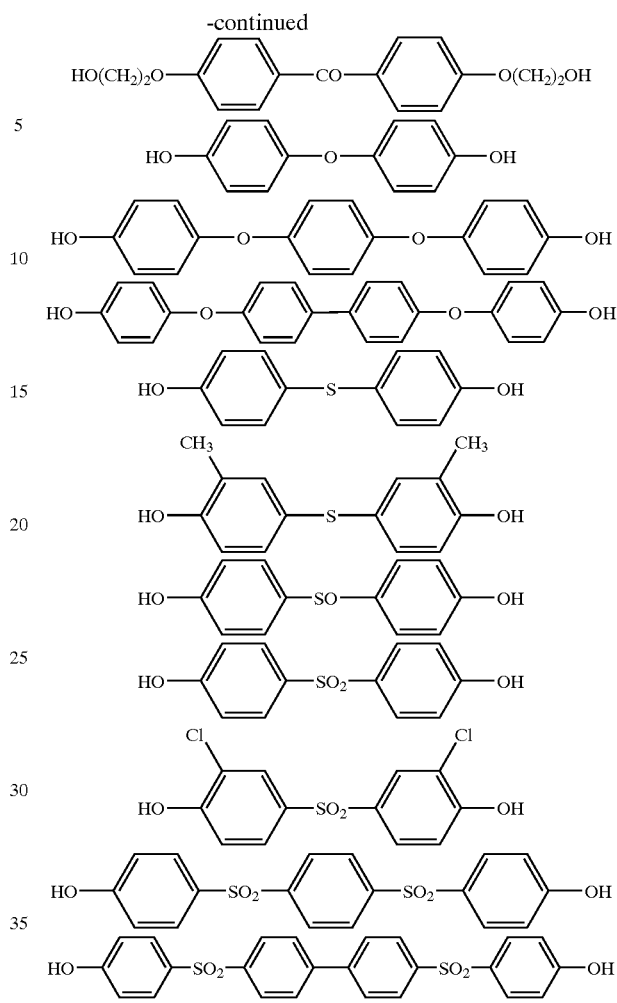

A concrete synthesizing method for the urethane based high molecular weight polymer containing a hydrazino group in its pendant group is not particularly limited.

The synthesis of the urethane based high molecular weight polymer containing a hydrazino group in its pendant group according to the invention is carried out by firstly reacting a compound having two or more active hydrogens with an excessive amount of polyisocyanate through polyaddition reaction or the like to produce a urethane based high molecular weight polymer having a terminal isocyanate, neutralizing with a neutralizing agent such as a tertiary amine or the like, adding with water to conduct phase reversal, and conducting treatments for chain extension and terminal isocyanate blockage with polyfunctional carboxylic acid polyhidrazide.

The reaction between the compound having two or more active hydrogens and the excessive amount of polyisocyanate can be carried out by the conventionally known single-stage or multi-stage isocyanate addition reaction method at room temperature or under a temperature condition of about 40~120° C.

In the above reaction may be used a well-known catalyst such as dibutyltin dilaurate, stannous octoate, triethyl amine or the like, a reaction controlling agent such as phosphoric acid, adipic acid, benzoylchloride or the like, and an organic solvent inactive with the isocyanate group.

As the solvent, mention may be made of ketones such as acetone, methylethyl ketone, methylisobutyl ketone, cyclohexanone and the like; ethers such as tetrahydrofuran, dioxane and the like; esters such as ethyl acetate and the like; amide based solvents such as N-methylpyrrolidone and the like; and toluene, xylene and so on.

As the neutralizing agent used in the above reaction, mention may be made of ammonia; amines such as trimethylamine, triethylamine, tripropylamine, triethanol amine, monoethanol amine, N-methylmorpholine, morpholine, 2,2-dimethylmonoethanol amine, N,N-dimethylmonoethanol amine and the like; sodium hydroxide, potassium hydroxide and so on.

As the polyfunctional carboxylic acid polyhidrazide used in the above reaction, mention may be made of oxalic dihydrazide, malonic dihydrazide, glutaric dihydrazide, adipic dihydrazide (ADH), sebacic dihydrazide, dodecanedionic dihydrazide, maleic dihydrazide, fumaric dihydrazide, itaconic dihydrazide, isophthalic dihydrazide, terephthalic dihydrazide, 4,4'-oxybisbenzenesulphonyl hydrazide, trimesinic trihydrazide, 1,3-bis(hydrazinocarboethyl)-5-isopropylhydantoin (VDH), enocoic dihydrazide, 7,11-octadecadiene-1,18-dicarbohydrazide, polyacrylic hydrazide, acrylamide-acrylic hydrazide copolymer and the like. Among them, adipic dihydrazide, isophthalic dihydrazide and 1,3-bis(hydrazinocarboethyl)-5-isopropylhydantoin (VDH) are preferably used.

There may be used a well-known chain extending agent such as diamine, polyamine, N-alkyldialkanolamine such as N-methyldiethanol amine, dihydrazide compound or the like, if necessary.

Moreover, when the organic solvent is existent in the aqueous dispersion of the resulting urethane based high molecular weight polymer (A), it can be distilled off in a heating condition under a reduced pressure, if necessary.

[2] The Water-soluble High Polymer (B) Will be Described Below

The water-soluble high polymer (B) is added as a modifier to the adhesive composition to strengthen the adhesive composition through the interaction with the adhesive composition matrix to thereby enhance the ductility and fracture toughness of the adhesive composition.

Particularly, when the water-soluble high polymer (B) contains carboxyl group, it can enhance more the ductility and fracture toughness through the crosslinking reaction with the crosslinkable functional group in the aliphatic epoxide compound (D), aqueous urethane compound (I) or the like constituting the matrix, or through ionic interaction with the metal salt (E) or metal oxide (F).

The water-soluble high polymer (B) is soluble in water or an aqueous solution containing an electrolyte and is not particularly critical in its structure. That is, its chain may be straight, branched, two-dimensionally or three-dimensionally crosslinked. However, it is favorable to be a polymer having only a straight chain or branched-chain structure from a viewpoint of performances.

As a characteristic of this polymer, it is favorable that the main chain extends as far as possible without enrolling like a rubber ball during the process of blending it into an aqueous solution of the adhesive composition or the like. Because, the resistance to thermal deformation of the adhesive composition can be improved by extending the main chain and interacting the carboxyl group with the adhesive matrix.

Moreover, when the water-soluble high polymer is partially dissolved in water, for example, as a colloidal dispersion, even if it is not extended sufficiently, the effect can be obtained insofar as the water-soluble high polymer is partially compatible with the adhesive composition matrix.

The water-soluble high polymer (B) is preferable to contain in its molecule at least one hydrophilic functional group selected from the group consisting of a hydroxyl group, a carboxyl group, an amino group, an imino group, a tertiary amine, a quaternary ammonium base, an oxazoline group, a hydrazino group and an azido group.

As the main chain of the water-soluble high polymer (B), use may be preferably made of ethylenic carboxylic acids such as itaconic acid, fumaric acid, maleic acid, aconitic acid, citraconic acid, methaconic acid, acrylic acid, methacrylic acid, butene tricarboxylic acid and the like, and salts thereof; acid anhydrides such as maleic anhydride, itaconic anhydride and the like; hydroxy group-containing acrylic acids such as poly-α-hydroxyacrylic acid and the like; esters of unsaturated carboxylic acids such as methyl(metha)acrylate, ethyl(metha)acrylate, butyl(metha)acrylate, 2-ethylhexyl(metha)acrylate, methoxypolyethylene glycol (metha)acrylate, 2-hydroxyethyl(metha)acrylate, 2-aminoethyl(metha)acrylate and the like; monoesters of ethylenic dicarboxylic acids such as itaconic acid monoethylester, fumaric acid monobutylester, maleic acid monobutylester and the like; diesters of ethylenic dicarboxylic acids such as itaconic acid diethylester, fumaric acid dibutylester and the like; and (co)polymers with one or more water-soluble monomers of amides of α, β-ethylenically unsaturated acids or with the other monomer. As the other monomer, mention may be made of a long-chain alkylene, styrene, methyl vinyl ether, ethylene, acrylonitrile, butadiene, isoprene, acryloxyethyl phosphate, methacryloxyethyl sulphonate, styrene sulphonate and so on without limiting thereto.

Particularly, it is favorable to be an isobutene-maleic anhydride copolymer. Further, the water-soluble high polymer according to the invention may be in a salt form.

Moreover, the water-soluble high polymer (B) can be used by dissolving in water, and can be also used by dissolving it as a salt neutralized with a basic substance.

As a concrete example of the water-soluble high polymer (B), there are mentioned polyacrylic acid; poly-(α-hydroxy carboxylic acid); acrylamide-acrylic acid; (metha)acrylic acid-(metha)acrylic acid ester; vinyl acetate-maleic anhydride; styrene-maleic acid copolymer; ethylene-acrylic acid copolymer; (metha)acrylic acid ester-maleic anhydride copolymer; α-olefin-maleic anhydride copolymer such as isobutene-maleic anhydride or the like; alkyl vinyl ether-maleic anhydride copolymer such as methyl vinyl ether-maleic anhydride, aryl ether-maleic anhydride or the like; styrene-acrylic acid copolymer; α-olefin-(metha)acrylic acid ester-maleic acid copolymer; or products of these water-soluble high polymers neutralized with a basic substance. Particularly, isobutene-maleic anhydride copolymer or a product thereof neutralized with a basic substance is preferable.

The basic substances neutralizing the water-soluble high polymer (B) are not particularly limited and include, for example, hydroxides of alkali metal or alkaline earth metal such as sodium hydroxide, potassium hydroxide, lithium hydroxide and the like; ammonia; amines such as methylamine, ethylamine, propylamine, dimethylamine, triethylamine, monoethanol amine, diethanol amine and the like; carbonates of alkali metal such as sodium carbonate, potassium carbonate and the like; acetates of alkali metal such as sodium acetate, potassium acetate and the like; and phosphates of alkali metal such as trisodium phosphate and the like. Among them, sodium hydroxide, potassium hydroxide, ammonia, trimethylamine, triethylamine are preferably used. Particularly, organic amines having a boiling point of not higher than 150° C., more preferably not higher than 100° C. and being volatile such as ammonia, trimethylamine, triethylamine and the like, which fly at the heating step or the like after the application onto the resin material, are favorable rather than bases containing the alkali metal which hydrolyze or deteriorate the resin material such as polyester or the like.

And also, the water-soluble high polymer (B) is favorable to substantially comprise a unit derived from a monomer having one carbon-carbon double bond. Because, if it is sulfur-reactive, the heat deterioration of adhesion accompanied with the sulfur crosslinking becomes large. When the carbon-carbon double bond with a hydrogen radical at its allyl position is decreased from the main chain structure of the water-soluble high polymer (B), it is possible to reduce the heat deterioration of the adhesion force resulted from the irreversible chemical deterioration among chemical structure shrinking changes accompanied with the crosslinking with sulfur used in the rubber article.

Furthermore, the water-soluble high polymer (B) is favorable to be a polymer of a relatively high molecular weight range and has a weight average molecular weight of not less than 3,000, preferably not less than 10,000, more particularly not less than 80,000.

[3] The Compound (C) Will be Explained Hereinafter

The compound (C) is mainly included for the purpose of promoting the adhesion of the adhesive composition to the resin material which is an adherend.

The compound (C) has a structure with methylene linked aromatics having a polar functional group. Because, the synthetic resin material such as a polyester resin or the like as a substrate is comprised of a flat and linear high polymer chain, and the high polymer chain has π electronic atmosphere derived from the aromatics included in the high polymer chain. Therefore, when a molecular structure having an aromatic π electron at its molecular side face is included in the components of the adhesion composition, there can easily be obtained effects such as adhesion performances of the adhesive composition onto the resin surface, diffusion among the high polymer chains of the resin and the like by π electronic interaction between the above molecular structure portion and the π electronic atmosphere portion of the high polymer chain of the resin.

And also, the polar functional group of the compound (C) is preferable to be a group reacting with a carboxyl group, an epoxy group as a crosslinking component, a (blocked) isocyanate group or the like included in the adhesive composition. Concretely, mention may be made of a crosslinkable functional group such as an epoxy group, a (blocked) isocyanate group or the like, a hydroxyl group, an amino group, a carboxyl group and so on.

As the molecular structure with methylene linked aromatics, there are mentioned molecular structures seen in, for example, diphenylmethane diisocyanate, polyphenylene polymethylene polyisocyanate, a condensate of phenols and formaldehyde and the like. The molecular structure portion with methylene linked aromatics is preferable to be a straight-chain without branching or the like.

The molecular structure with methylene linked aromatics is favorable to be a structure of methylene diphenyl or polymethylene polyphenyl having a relatively linear molecular structure. Moreover, the molecular weight of the molecular structure with methylene linked aromatics is not particularly limited, but is preferably not more than 6,000, more preferably not more than 2,000. Because, when the molecular weight exceeds 6,000, the molecular weight becomes too high and the diffusion into the substrate becomes small irrespectively of the substantially constant anchoring effect.

Furthermore, the compound (C) is favorable to be a molecule in relatively low to middle molecular weight region and to have a molecular weight of not more than 9,000.

Moreover, the compound (C) is preferable to be aqueous (water-soluble or water-dispersible).

As the compound (C), mention may be made of a compound containing an aromatic polyisocyanate and a thermally dissociatable blocking agent, a water-dispersible compound containing a component obtained by blocking diphenylmethane diisocyanate or an aromatic polyisocyanate with a thermally dissociatable blocking agent, a bisphenolic epoxide compound, a condensate of a phenol and formaldehyde or a modified product thereof, a condensate of resorcin and formaldehyde through novolak reaction, a condensate of chlorophenol-resorcinol-formaldehyde, a phenolic resin such as a cresol novolak resin having an epoxy group or a modified product thereof; an aqueous urethane compound (I) and the like.

As the compound containing an aromatic polyisocyanate and a thermally dissociatable blocking agent, there are favorably mentioned a blocked isocyanate compound containing diphenylmethane diisocyanate and a known isocyanate blocking agent, and so on.

As the water-dispersible compound containing the component obtained by blocking diphenylmethane diisocyanate or an aromatic poly-isocyanate with a thermally dissociatable blocking agent, there is mentioned a reaction product obtained by blocking diphenylmethane diisocyanate or a polymethylene polyphenyl polyisocyanate with the above known blocking agent which blocks the isocyanate group. Concretely, commercially available blocked polyisocyanate compounds such as ELASTRON BN 69, DELION PAS-037 and the like as used in the examples can be used.

As the phenols, mention may be made of phenol; alkylphenols; halophenols; monovalent phenols such as aminophenol, nitrophenol, dinitrophenol, m-methoxyphenol and the like; polyvalent phenols such as resorcin, alkyl resorcins, pyrogallol, catechol, hydroquinone, bisphenol, natural phenolic resins, and the like.

As the alkylphenols, there are mentioned o-cresol, m-cresol, p-cresol, ethylphenol, isopropylphenol, xylenol, 3,5-xylenol, butylphenol, t-butylphenol, nonyl phenol and the like.

As the halophenols, there are mentioned o-fluorophenol, m-fluorophenol, p-fluorophenol, o-chlorophenol, m-chlorophenol, p-chlorophenol, o-bromophenol, m-bromophenol, p-bromophenol, o-iodophenol, m-iodophenol, p-iodophenol and the like.

As the aminophenols, there are mentioned o-aminophenol, m-aminophenol, p-aminophenol and the like.

As the nitrophenols, there are mentioned o-nitrophenol, m-nitrophenol, p-nitrophenol, 2,4-dinitrophenol and the like.

As the alkyl resorcins, there are 5-methyl resorcin, 5-ethyl resorcin, 5-propyl resorcin, 5-n-butyl resorcin, 4,5-diethyl resorcin, 2,5-diethyl resorcin, 4,5-dipropyl resorcin, 2,5-dipropyl resorcin, 4-methyl-5-propyl resorcin, 2-methyl-5- propyl resorcin, 2,4,5-trimethyl resorcin, 2,4,5-triethyl resorcin and the like.

As the natural phenol resins, mention may be made of polyvalent phenol mixture (alkylace) obtained by dry distilling oil shale produced from Estonia and the like.

It is favorable to use a phenol resin obtained through novolak reaction (Development and New Technology of Functional Adhesives (Former Volume) p.82; 1997; CMC Co., Ltd.).

There may be mentioned a reaction product obtained by condensing one or more of these phenols with formaldehyde.

And also, the condensate of one of phenols and formaldehyde can favorably be used as a modified derivative through epoxidation, sulfomethylation, sulfilmethylation or the like.

More preferably, there are mentioned a resorcin-formaldehyde condensate obtained through novolak reaction, a novolak chlorophenol-resorcinol-formaldehyde condensate, and a cresol novolak resin having an epoxy group.

As the concrete example of the phenol-formaldehyde condensate, there are mentioned a resorcin-formaldehyde condensate obtained through novolak reaction, a condensate of aminophenol, cresol and formaldehyde, a condensate of p-chlorophenol and formaldehyde, a condensate of chlorophenol, resorcin and formaldehyde, and so on. Preferably, the resorcin-formaldehyde condensate obtained through novolak reaction, the condensate of p-chlorophenol, resorcin and formaldehyde and the like are mentioned.

More concretely, as the resorcin-formaldehyde condensates obtained through novolak reaction, there can be used a resorcin-formaldehyde condensate obtained through novolak reaction as described in the example of the above WO 97/13818, and as the condensate of chlorophenol, resorcin and formaldehyde, there can be used DENABOND, DENABOND-AL, DENABOND-AF and the like made by Nagase Kasei Kogyo Co., Ltd.

As the epoxy cresol novolak resins, there can be used commercially available products such as ARALDITE ECN1400 made by Asahi Chiba Co., Ltd., DENAKOL EM-150 made by Nagase Kasei Kogyo Co., Ltd. and the like. Since these epoxy novolak resins are epoxide compounds, they also serve as an intermolecular crosslinking component of an adhesive molecule for suppressing the fluidization of the adhesive composition at a high temperature.

The sulfomethylated compound of the phenol-formaldehyde condensate is a compound obtained by reacting with a sulfomethylating agent under heating on or before or after the condensation reaction of the phenols and formaldehyde. As the sulfomethylating agent, there is mentioned a salt of sulfurous acid or bisulfite with a basic substance.

Concretely, use may be made of a sulfomethylated product of a phenol-formaldehyde condensate as described in the example of a publication of Japanese Patent Application No. 10-203356.

[4] The Aqueous Urethane Compound (I) Will be Explained Hereinafter

The aqueous urethane compound (I) is included as an adhesion improver for mainly promoting the adhesion of the adhesive composition to the resin material.

The aqueous urethane compound (I) is preferable to have two or more molecular structures with methylene linked aromatics in its molecule.

Moreover, the aqueous urethane compound (I) has not only the aforementioned action as an adhesion improver but also an action controlling the fluidization of the adhesive layer at a high temperature as a flexible crosslinking agent owing to the flexible molecular structure.

Further, the aqueous urethane compound (I) is preferable to have two or more thermally dissociatable blocked isocyanate groups in its molecule. Because the adhesion can be promoted through crosslinking reaction with the active hydrogen existing in the vicinity of the surface of the polyester resin material as a substrate or the adhesive composition the adhered rubber.

Moreover, the aqueous urethane compound (I) is favorable to have a group capable of producing a salt or a hydrophilic group such as a hydrophilic polyether chain or the like. Because, water advantageous to the sanitary can be used as a solvent. From the same reason, the aqueous urethane compound (I) is preferable to be an aqueous resin.

Preferably, the aqueous urethane compound (I) is a reaction product of 40–85% by weight of an organic polyisocyanate compound ($\alpha$), 5–35% by weight of a compound ($\beta$), 5–35% by weight of a blocking agent ($\gamma$) and 5–35% by weight of a compound ($\delta$). More preferably, the amount of the thermally dissociatable blocked isocyanate group in the molecular weight of the reaction product is 0.5–11% by weight (calculated as NCO=42). Moreover, if the amount is 0–50% by weight, another compound ($\epsilon$) having an active hydrogen may be included. As the compound ($\epsilon$), there can be exemplified a compound having one active hydrogen in its molecule, for example, an alcohol such as methanol, ethanol or the like, urea, thiourea and so on.

The molecular structure with methylene linked aromatics is preferable to be a structure of methylene diphenyl, or polymethylene polyphenyl if it has a relatively linear molecular structure. Moreover, the molecular weight at the molecular structure portion with methylene linked aromatics is not particularly limited, but the molecular weight is preferably not more than 6,000, more preferably not more than 2,000. When the molecular weight is more than 6,000, the diffusion into the substrate becomes small irrespectively of the substantially constant anchoring effect.

And also, the molecular weight of the aqueous urethane compound (I) is not particularly limited, but is preferably not more than 9,000, more preferably not more than 5,000.

The compound ($\delta$) is not particularly limited insofar as it is a compound having at least one active hydrogen and an anionic and/or a nonionic hydrophilic group. As the compounds having at least one active hydrogen and an anionic hydrophilic group, there can be exemplified taurine, N-methyl taurine, N-butyl taurine, aminosulfonic acids such as sulfanilic acid and the like; aminocarboxylic acids such as glycine, alanine and so on. And also, as the compounds having at least one active hydrogen and a nonionic hydrophilic group, compounds having a hydrophilic polyether chain can be exemplified.

As the method for introducing an anionic hydrophilic group, there can be exemplified a method wherein a part of terminal isocyanate group in the product after the reaction between polyisocyanate and polyol is reacted with a salt of an organic acid having an active hydrogen such as taurine, N-methyl taurine, N-butyl taurine, or a sodium salt or the like of aminosulfonic acid such as sulfanilic acid or the like; and a method wherein a tertiary nitrogen atom is previously introduced by adding N-methyl-diethanol amine or the like at the step of reacting polyisocyanate and polyol and such a tertiary nitrogen atom is quaternarized with dimethylsulfuric acid.

As the method for introducing the hydrophilic group such as hydrophilic polyether chain or the like, there can be exemplified a method wherein a part of terminal isocyanate group in the product after the reaction of polyisocyanate and polyol is reacted with a compound having at least one active hydrogen and a hydrophilic polyether chain such as mono-functional polyethylene glycol monoalkyl ether having a molecular weight of 350–3000 (such as BROX 350, 550, 750, made by BP Chemical Co., Ltd.) or the like.

The hydrophilic polyether chain of these compounds includes at least 80%, preferably 100% of alkylene oxide unit such as ethylene oxide and/or propylene oxide and the like.

And also, the aqueous urethane compound (I) is favorable to be represented by the following general formula:

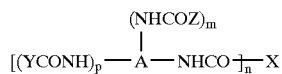

[wherein A is a residue of an organic polyisocyanate compound (α) after desorption of active hydrogen, Y is a residue of a thermally dissociatable blocking agent (γ) after desorption of active hydrogen, Z is a residue of a compound (δ) after desorption of active hydrogen, X is a residue of a compound (β) after desorption of active hydrogen, n is an integer of 2~4, and p+m is an integer of 2~4 (m≧0.25)].

As the organic polyisocyanate (α) having a structure with methylene linked aromatics, mention may be made of methylene diphenyl polyisocyanate, polymethylene polyphenyl polyisocyanate and so on. Preferably, it is polymethylene polyphenyl polyisocyanate having a molecular weight of not more than 6,000, more preferably not more than 40,000.

And also, the compound (β) is a compound having preferably 2~4 active hydrogens and an average molecular weight of not more than 5,000. As the compound having such plural active hydrogens, there are mentioned compounds selected from the group consisting of the followings (i)~(vii):

(i) polyvalent alcohols having 2–4 hydroxyl groups;
(ii) polyvalent amines having 2–4 primary and/or secondary amino groups;
(iii) aminoalcohols having 2–4 primary and/or secondary amino group(s) and hydroxyl group(s);
(iv) polyester polyols having 2–4 hydroxyl groups;
(v) polybutadiene polyols having 24 hydroxyl groups, and copolymers thereof with another vinyl monomer;
(vi) polychloroprene polyols having 24 hydroxyl groups, and copolymers thereof with another vinyl monomer;
(vii) polyether polyols having 2–4 hydroxyl groups, such as polyaddition products with C2–C4 alkylene oxide of polyvalent amine, polyhydric phenol and amino alcohol, polyaddition products with C2–C4 alkylene oxide of C3 or more polyvalent alcohol, copolymer of C2–C4 alkylene oxide or polymer of C3–C4 alkylene oxide.

As the polyol compound having 2 to 4 hydroxyl groups and an average molecular weight of not more than 5,000, the aforementioned polyols constituting the thermoplastic high molecular weight polymer (A) can also be used as long as its average molecular weight is not more than 5,000. Among them, the polyol compound having the structure with methylene linked aromatics such as an addition product of bisphenol A with ethylene oxide or the like can introduce the structure with methylene linked aromatics not only into the residue of the organic isocyanate (α) of the aqueous urethane compound (I) but also into the residue of the compound (β).

As the thermally dissociatable blocking agent (γ) isolating the isocyanate group through heat treatment, there are mentioned well-known isocyanate blocking agents.

The aqueous urethane compound (I) can concretely be manufactured by well-known synthesizing methods such as a method described in JP-B-63-51474. In addition to the heat-reactive type aqueous urethane resin synthesized by the above methods, there can be used commercial products such as ELASTRON BN27, ELASTRON BN77 and the like made by Daiichi Kogyo Seiyaku Co., Ltd. ELASTRON BN27 corresponds to the compound represented by the aforementioned general formula, while ELASTRON BN77 corresponds to a compound having m=0 in the general formula. Since the hydrophilic portion is existent in the portion X of the general formula, ELASTRON BN77 also exhibits a water-solubility.

Moreover, some molecular structure portions with methylene linked aromatics are arranged in the relatively flexible molecular chain of the aqueous urethane compound (I) through urethane linkage, so that when the molecular structure portion with methylene linked aromatics is closely adhered to the substrate, the other portions form anchors or IPN (interpenetrating polymer network) in the adhesive composition and hence the adhesion promoting effect can be efficiently obtained.

Of course, a compound having one molecular structure with methylene linked aromatics in its molecule may simultaneously be added as an adhesion promoting agent to the adhesive composition together with the aqueous urethane compound (I).

[5] The Aliphatic Epoxide Compound (D) Will be Explained Hereinafter

The aliphatic epoxide compound is included as a crosslinking agent of the adhesive composition.

The aliphatic epoxide compound (D) is a compound having preferably not less than two, more preferably not less than 4 epoxy groups in its molecule.

Because, as the epoxy group becomes more polyfunctional, the effect of controlling creep or flow through stress of the adhesive composition at a high temperature region becomes high and the adhesion force at the high temperature becomes higher.

And also, the compound having 2 or more epoxy groups is preferable to be a reaction product of polyvalent alcohols and epichlorohydrin.

As the aliphatic epoxide compound, there are mentioned glycidyl esters of aliphatic acid, glycidyl ethers of aliphatic polyvalent alcohol, cyclic aliphatic epoxide compounds and so on.

As this epoxide compound are favorably used glycidyl esters of long chain aliphatic acid, which is particularly the aforementioned epoxy resin, glycidyl ethers of polyvalent alcohol and the like.

As a concrete example of the epoxy compound (D), there are mentioned reaction products between polyvalent alcohol and epichlorohydrin such as diethylene glycol-diglycidyl ether, polyethylene-diglycidyl ether, polypropylene glycol-diglycidyl ether, neopentyl glycol-diglycidyl ether, 1,6-hexanediol-diglycidyl ether, glycerol-polyglycidyl ether, trimethylol propane-polyglycidyl ether, polyglycerol-polyglycidyl ether, pentaerythiol-polyglycidyl ether, diglycerol-polyglycidyl ether, sorbitol-polyglycidyl ether and so on.

Among the reaction products between polyvalent alcohol and epichlorohydrin, polyglycerol-polyglycidyl ether and sorbitol-polyglycidyl ether are particularly preferable.

Because, the epoxy group is polyfunctional, and is less in the lowering of the adhesion force at a high temperature due to flow and creep based on the stress of the adhesive layer at a high temperature, and has a long-chain and soft main skeletal structure and is flexible, so that the occurrence of hardening/shrinkage of the adhesive layer through the crosslinking is less and the lowering of the adhesion force due to the internal strain stress becomes small.

Commercially available chemicals can be used as the sorbitol-polyglycidyl ether, polyglycerol-polyglycidyl ether and novolak type epoxy resin.

Such a polyepoxide compound can be used by dissolving in water, or by dispersing in water through emulsification. In the preparation of an emulsion, such a polyepoxide compound is dissolved in water as it is, or it is dissolved in a small amount of a solvent, if necessary, and can be emulsified in water with a known emulsifying agent such as sodium alkyl benzene sulfonate, sodium dioctyl sulfosuccinate, addition product of nonyl phenol with ethylene oxide or the like.

[6] The Metal Salt (E) and Metal Oxide (F) Will be Explained Hereinafter

The metal salt (E) and metal oxide (F) are included as an inexpensive filler in the adhesive composition and can give ductility and toughness to the adhesive composition.

As the metal salt and metal oxide, polyvalent metal salts and polyvalent metal oxides are favorable. The term "metal" used herein covers analogous metals such as boron, silicon and so on. The polyvalent metal salt and polyvalent metal oxide are favorably less in the action of deteriorating the resin material such as polyester or the like as a substrate through alkali hydrolysis or the like as compared with the monovalent alkali such as sodium hydroxide. In addition, there can be expected an effect of crosslinking polymers containing a carboxyl group in the adhesive composition by an ionic bonding interaction.

As the polyvalent metal salt, there are mentioned salts such as sulfate, nitrate, acetate, carbonate, chloride, hydroxide, silicate and the like of bivalent or polyvalent metals such as calcium, magnesium, zinc, barium, aluminum, iron, nickel and so on.

As the polyvalent metal oxide, there are mentioned oxides of magnesium, calcium, barium, zinc, aluminum, titanium, boron, silicon, bismuth, manganese, iron, and nickel; or bentonite, silica, zeolite, clay, talc, satin white, smectite and the like containing these oxides as a constituent element.

In general, these polyvalent metal salts and polyvalent metal oxides hardly dissolve in a solvent such as water or the like, but easily disperse into the adhesive composition rather than the dissolution, so that they easily act as a filler. Therefore, these metal salts and metal oxides are preferable to be added as fine particles, and an averaged particle size thereof is not more than 20 $\mu$m, more preferably not more than 5 $\mu$m. Since, the thickness of the coating layer made of the adhesive composition is generally about several $\mu$m to 50 $\mu$m in tire cords and the like, it is desirable that the particle size is smaller than the above thickness.

And also, the metal salt and metal oxide can be used by dispersing in water with a known surfactant or water-soluble high polymer. In the invention, a relatively stable aqueous dispersion is obtained by utilizing the water-soluble high polymer (B) as a protecting colloid, but the invention is not limited to such a method insofar as the metal salts and metal oxides can be dispersed in water.

[7] The Rubber Latex (G) Will be Explained Hereinafter

As the rubber latex, well-known rubber latex can be used.

There can be mentioned synthetic latexes such as a vinylpyridine-conjugated diene compound based copolymer latex and its modified latex, a styrene-butadiene copolymer latex and its modified latex, an acrylonitrile-butadiene copolymer latex and its modified latex and the like; and a natural rubber latex and so on. They can be used alone or in combination of two or more.

Moreover, the synthetic latex may contain a monomer having a crosslinkable functional group such as carboxyl group, epoxy group or the like which can crosslink with the adhesive composition matrix. Further, modified latexes such as carboxyl modified, epoxy modified latexes and the like may be used.

Particularly, when the latex contains a crosslinkable functional group for the adhesive composition matrix, the resistance to cohesive failure of the matrix is improved, and hence the initial adhesion force and the adhesion durability under a strain are preferably improved.

As the vinylpyridine-conjugated diene compound based copolymer latex, there can be used a copolymer having a lower butadiene amount obtained by a multi-stage feed polymerization method without damaging the adhesion performance as disclosed in WO 97/13818 and the like. As this nVp latex, products made by JSR Corporation and so on can be used.

[8] The Benzene Derivative (H) Having Two or More (Blocked) Isocyanate Groups Will be Explained Hereinafter As the benzene derivative (H), mention may be made of isocyanate derivatives of benzene such as tolylene diisocyanate, m-phenylene diisocyanate, p-phenylene diisocyanate, tetramethylxylene diisocyanate, isopropenyl dimethylbenzyl diisocyanate and the like or dimers thereof.

[9] The Composition Ratio of the Adhesive Composition Will be Explained Hereinafter

[9-1] In Case of the Adhesive Composition Containing a Thermoplastic High Molecular Weight Polymer (A), a Water-soluble High Polymer (B) and a Compound (C)

The adhesive composition is favorable to comprise 2–75% of the thermoplastic high molecular weight polymer (A), 5–75% of the water soluble high polymer (B) and 15–77% of the compound (C) on dry weight. When the amount of the thermoplastic high molecular weight polymer (A) is less than 2% by weight, the effect of controlling the deterioration of adhesion force through strain absorption in the adhesion for the purpose of adding the polymer (A) is not sufficiently obtained, while when it exceeds 75% by weight, the amount of the thermoplastic high molecular weight polymer (A) contained in the adhesive composition is too large and hence the adhesion force at a high temperature is unfavorably deteriorated by plasticization through heat.

When the amount of the water-soluble high polymer (B) is less than 5% by weight, the effect of enhancing the durability to thermal deformation, toughness and the like in the adhesive composition for the purpose of adding the water soluble high polymer (B) can not be sufficiently obtained, while when it exceeds 75% by weight, the amount of the water soluble high polymer (B) contained in the adhesive composition becomes large and the amount of compound (C) becomes too small and hence the initial adhesion force lowers.

When the amount of the compound (C) is less than 15% by weight, the content of the compound (C) as an adhesion improver is too small and the adhesion force lowers from an initial stage, while when it exceeds 77% by weight, the amounts of other components in the adhesive composition become too small and the adhesion force at a high temperature or the heat resistant adhesion force lowers.

From the similar viewpoint, the amount of the thermoplastic high molecular weight polymer (A) is preferably 6–65%, more particularly 10–55%, and the amount of the water-soluble high polymer (B) is preferably 15–60%, more particularly 18–45%, and the amount of the compound (C) is preferably 15–55%, more particularly 18–55%.

[9-2] In Case of the Adhesive Composition Containing the Thermoplastic High Molecular Weight Polymer (A) and the Aqueous Urethane Compound (I)

The amount of the thermoplastic high molecular weight polymer (A) and the reason thereof are the same as mentioned above.

The aqueous urethane compound (I) is preferable to be 15–87% by weight in the adhesive composition on dry weight.

When the amount is less than 15% by weight, the aqueous urethane compound (I) as an adhesion improver is too small and the adhesion force lowers from the initial stage, while when it exceeds 87% by weight, the amounts of other components in the adhesive composition become too small and the adhesion force at a high temperature or the heat resistant adhesion force lowers.

From the similar viewpoint, the amount of the aqueous urethane compound (I) is preferably 15–60%, more particularly 18–45%.

[9-3] In Case of the Adhesive Composition Containing the Water-soluble High Polymer (B) and the Aqueous Urethane Compound (I):

The amount of the water soluble high polymer (B) is the same as mentioned above. When the content of the water-soluble high polymer (B) is less than 5% by weight on dry weight, it is too small and the effect of enhancing the durability to thermal deformation, toughness and the like in the adhesive composition for the purpose of adding the water-soluble high polymer (B) can not sufficiently be obtained, while when it exceeds 75% by weight, the amount of the water-soluble high polymer (B) contained in the adhesive composition becomes too large and the crosslinking of the water-soluble high polymer (B) in the adhesive composition becomes less and the adhesion force lowers.

The aqueous urethane compound (I) is preferable to be 15–77%.

When the amount is less than 15% by weight, the amount of the aqueous urethane compound (I) as an adhesion improver becomes too small and the adhesion force lowers from the initial stage, while when it exceeds 77% by weight, the amounts of other components in the adhesive composition become too small and the adhesion force at a high temperature or the heat resistant adhesion force lowers.

From the similar viewpoint, the amount of the water-soluble high polymer (B) is preferably 15–60%, more particularly 18–45%, and the amount of the aqueous urethane compound (I) is preferably 15–55%, more particularly 18–55%.

In addition to the above components, all of the adhesive compositions [9-1], [9-2] and [9-3] can further contain at least one component of the aliphatic epoxide compound (D), metal salt (E), metal oxide (F), rubber latex (G) and benzene derivative (H) having two or more (blocked) isocyanate groups. The compounding amounts in such a case will be explained hereinafter.

The aliphatic epoxide compound (D) is preferable to be not more than 70% in the adhesive composition on dry weight.

When it exceeds 70% by weight, the adhesive composition becomes too hard and the fatigue property under strain such as tube fatigue or the like lowers.

From the similar viewpoint, it is preferably not more than 45%, more particularly 10–30%.

In case that the compound (C) is a crosslinkable compound containing epoxy group such as epoxy cresol novolak resin or the like, the total of "contents of the aliphatic epoxide compound (D) and the compound (C)" contained in the adhesive composition is preferable to be 9~70% or less on the dry weight of the adhesive composition.

When it is less than 9% by weight, the compound (C) becomes less and the effect of suppressing the molecular motion of the adhesive composition through the crosslinking lowers and hence there is a case of lowering the adhesion force at a high temperature, while when it exceeds 70% by weight, the adhesive composition becomes too hard and the fatigue property under strain such as tube fatigue or the like lowers.

The metal salt (E) is preferable to be not more than 50%. When it exceeds 50% by weight, the toughness of the adhesive composition is decreased to lower the adhesion force. From the similar viewpoint, it is preferably 3–40%, more particularly 5–25%.

The metal oxide (F) is preferable to be not more than 50%. When it exceeds 50% by weight, the toughness is also decreased to lower the adhesion force. From the similar viewpoint, it is preferably 3–40%, more particularly 5–25%.

The rubber latex (G) is preferable to be not more than 18%. When it exceeds 18%, the adhesive composition reacts with sulfur and the adhesion force lowers due to strain based on internal stress. From the similar viewpoint, it is preferably not more than 15%.

The benzene derivative (H) is preferable to be not more than 50%. When it exceeds 50%, the toughness of the adhesive composition becomes low to lower the adhesion force. From the similar viewpoint, it is preferably not more than 20%.

Moreover, in each of the above components (A)–(H), two or more kinds of the respective constituents may be used without limiting to one constituent. In this case, the total amount is favorable to be within the above composition range.

The adhesive composition according to the invention contains the above components (A)–(H) as the main component, but may contain another aqueous resin component such as aqueous urethane resin containing no crosslinkable functional group, cellulose based copolymer and the like. In general, these aqueous components are preferable to be not more than 30% of the dry weight of the adhesive, but are not limited thereto.

And also, each component can be used by dissolving or dispersing in various solvents such as water, an organic solvent and the like at steps of production, application and the like of the adhesive composition.

Furthermore, the alkali metal is preferable to be not more than 2% in the adhesive composition on dry weight. This is due to the fact that when the adhesive composition is basic, the alkali metal deteriorates the molecule of the resin material as an adherend such as polyester or the like through hydrolysis. Even when the adhesive composition is not basic, the alkali metal is preferable to be not more than 2% from the following reason. Namely, the amine component generated from the vulcanization accelerator component in rubber at the vulcanization step or the like in the manufacture of rubber articles penetrates into the adhesive composition to affect the resin material. At this time, as the alkali metal interacting with the carboxyl group of the water-soluble high polymer or the like in the adhesive composition becomes less, the effect of shielding the amine component penetrating into the adhesive composition is obtained, so that in case of the polyester or the like, the effect of decreasing the lowering of the cord tenacity is obtained as the alkali metal contained in the adhesive composition becomes less.

Therefore, in case of the resin material such as polyester or the like, it is favorable to decrease the alkali metal included in the adhesive composition for providing the adhesive composition having a good durability at a high temperature.

[10] The Storage Modulus G' (at 60° C. and 200° C.) of the Adhesive Composition Will be Explained Hereinafter In the above adhesive composition, it is important to control the viscoelasticity of the adhesive composition at each temperature. Particularly, in the non-general-purpose tires, the physical properties of the adhesive composition are desirable that it is not softened at a high temperature of about 200° C. being a temperature during the running under high strain, and that at about 60° C. being a temperature in the usual running it is flexible to strain and high in the flexibility and the hardness is maintained.

The adhesive composition according to the invention is favorable to have a storage modulus G' of not more than $10^9$ when the dynamic viscoelasticity is measured at 60° C. and a frequency of 10 Hz by using a plate type dynamic viscoelasticity measuring device. When it exceeds $10^9$, the material generally renders substantially into vitreous state, and the durability as a tire lowers in the running under a high strain, or in the tube fatigue test or the like. From the similar viewpoint, it is more preferably not more than $10^8$. Such an effect is obtained by the action of the thermoplastic high molecular weight polymer (A) or the water-soluble high polymer (B).

And also, the storage modulus G' is preferable to be not less than $10^6$ at 200° C. and a frequency of 10 Hz. At a high temperature, it is a feature that the modulus at about 200° C. is improved by intermolecular crosslinking of the adhesive composition matrix or crosslinking of the functional group contained in the thermoplastic high molecular weight polymer (A) or the water-soluble high polymer (B) to provide so-called wide plateau region (storage modulus is about $10^6$–$10^8$). When the storage modulus G' is less than $10^6$, the material generally enters a low modulus region near to so-called tackifier and the adhesive composition is unfavorably apt to be deformed and broken by heat in the running of the tire at a high temperature or the like.

Thus, it is one of preferable features for obtaining an adhesive composition having a good durability under a high temperature and high strain that the control of the storage modulus G' at 60° C. for maintaining the flexibility is simultaneously established together with the control of the softening and maintenance of high storage modulus G' at a high temperature of 200° C.

[11] The Integrated Reaction Heat Quantity of the Adhesive Composition Will be Explained Hereinafter Since the integrated reaction heat quantity is interrelated to a reaction heat based on the reaction between carbon-carbon double bond with a hydrogen radical at its allyl position and sulfur, the amount of the above double bond can be evaluated from such a quantity.

It is favorable that the integrated reaction heat quantity per 1 g of the dried adhesive composition is not more than 85 J joule) when 100 parts by dry weight of the adhesive composition and 10 parts by weight of sulfur are reacted with each other at 160° C. for 90 minutes according to the method described in the example.

When it is more than 85 J, the lowering of the adhesion force after the heat deterioration and the amount of rubber adhered becomes remarkable, and particularly the ratio of rubber adhered is undesirably no more than C-level on the standard in Table 14. As a result, the overall heat-resistant adhesion force and the adhered rubber level are deteriorated.

This is due to the fact that as the vulcanization reaction is promoted by thermal stimulus, rubber is hardened to decrease a soft stress relaxation property inherent to the thermoplastic high molecular weight polymer (A) and also stress is created accompanied with the restraint of the molecular chain through the crosslinking and hence deterioration of chemical adhesion through the vulcanization becomes remarkable. From the similar viewpoint, it is more preferably not more than 65 J.

Moreover, the sulfur reactivity of the adhesive composition can be determined by measuring the reaction heat quantity at the vulcanizing temperature by using to the method defined in the example according to the invention.

It is needless to say that the effect of defining the integrated reaction heat quantity to a predetermined range is obtained in an adhering method wherein a vulcanizing agent included in either of an adherend of a synthetic resin material such as synthetic fiber or the like and an adherend of a rubber composition containing a vulcanizing agent such as sulfur or the like migrates into the adhesive composition and hence the adhesive composition may be crosslinked by such a vulcanizing agent.

As the vulcanizing agent, there are mentioned sulfur; thiuram polysulfide compounds such as tetramethyl thiuram disulfide, dipentamethylene thiuram tetrasulfide and the like; organic vulcanizing agents such as 4,4-dithiomorpholine, p-quinone dioxime, p,p'-dibenzoquinone dioxime, cyclic sulfur imide and so on.

[12] The Resin Material Will be Explained Hereinafter

A resin material adhered on its surface with an adhesive composition can be prepared by applying the above adhesive composition onto a surface of a resin material such as polyester resin, aromatic polyamide resin or acrylic resin and subjecting it to a suitable heat treatment.

As the resin material adhered with the adhesive composition according to the invention, a polyester resin material is particularly preferable. The polyester is a high polymer having ester bond in its main chain, wherein not less than 80% of the bonding form of repeating unit in the main chain is minutely ester bonding form. Such a polyester is obtained by condensing through an esterification reaction or ester interchange reaction between a glycol such as ethylene glycol, propylene glycol, butylene glycol, methoxypolyethylene glycol, pentaerythritol or the like and a dicarboxylic acid such as terephthalic acid, isophthalic acid or a dimethyl derivative thereof. The most representative polyester is polyethylene terephthalate and polyethylene naphthalate.

In addition to the above polyester resin material, there are mentioned aliphatic polyamide resin materials such as 6-nylon, 6,6-nylon, 4,6-nylon and the like, and aromatic polyamide resin materials such as paraphenylene terephthalamide and the like.

As the form of these resin materials, there are mentioned a cord, cable, a film, a filament, a filament chip, a cord fabric, a canvas, a short fiber, a nonwoven fabric and so on. Particularly, a cord obtained by twisting plural filaments of the above resin material are preferably used for reinforcing a rubber article such a tire, a conveyor belt or the like.

Such a cord comprises a ply twist and a cable twist of the synthetic fibers, wherein it is favorable that a twisting coefficient N1 of the ply twist is 0–0.70 and a twisting coefficient N2 of the cable twist is 0.12–0.90 as defined by the following equations (1) and (2).

$$N1 = n1 \times (0.125 \times D1/\rho)^{1/2} \times 10^{-3} \quad (1)$$

$$N2 = n2 \times (0.125 \times D2/\rho)^{1/2} \times 10^{-3} \quad (2)$$

(wherein D1 is an indicated decitex number of the ply twist bundle, D2 is a total indicated decitex number, n1 is the number of ply twist (turns/10 cm), n2 is the number of cable twist (turns/10 cm) and $\rho$ is a specific gravity of the organic fiber.)

When the twisting coefficient N1 of the ply twist exceeds 0.70, the elastic modulus of the cord becomes low. More preferably, it is 0.15–0.60. On the other hand, when the twisting coefficient N2 of the cable twist is less than 0.12, the cord tends to become "untangled" to degrade the workability. In order to keep the elastic modulus of the cord, it is preferable to be not more than 0.9 and is more preferably 0.18–0.75.

And also, the amount of the adhesive composition coating the above cord is preferable to be 0.5–6.0% by weight per the weight of the cord on dry weight.

Moreover, as the stiffness of the cord treated with the adhesive composition according to the invention becomes too hard, the tube fatigue resistance becomes undesirably low. In a cord where the adhesive composition according to the invention is adhered to a polyethylene terephthalate tire cord as a resin material having a twisting structure of 1670 dtex/2, cable twist number of 40 turns/10 cm and ply twist number of 40 turns/10 cm in an amount of about 2.0–2.5% by weight on dry weight per the cord weight, a Galley type cord stiffness is preferably not more than 150 mN, more preferably not more than 100 mN. When the cord stiffness exceeds 150 mN, the cord becomes too hard and the service life through the tube fatigue becomes short.

Further, after the cord is treated with the adhesive composition, the softening of such a cord may be carried out by a cord softening device or the like.

The coating procedure is not particularly limited, and there can be selected a suitable procedure such as a method of immersing the resin material in the adhesive composition, a method of coating the adhesive composition with a brush, a method of spraying the adhesive composition or the like, if necessary.

In the coating treatment, it is favorable that the adhesive composition is dissolved in various types of solvent to decrease the viscosity thereof because the application work becomes easy. Such a solvent is preferably water for the environment.

It is preferable that the resin material with the adhesive composition coated on its surface is dried, for example, at a temperature of 100° C.–200° C. and then subjected to a heat treatment at a temperature higher than a glass transition temperature of the polymer constituting the resin material, preferably not lower than (melting temperature of the polymer—70° C.) but not higher than (melting temperature of the polymer—10° C.). When it is lower than the glass transition temperature of the polymer, the molecular mobility of the polymer is poor and the adhesion promoting component of the adhesive composition and the polymer can not conduct the sufficient interaction and hence the bonding force between the adhesive composition and the resin material is not obtained.

The resin materials may previously be subjected to a pretreatment such as electron beam, microwave, corona discharge, plasma treatment or the like.

The thus obtained resin material coated with the adhesive composition may be directly embedded in an uncured rubber and adhered by vulcanization to provide a good adhesion. Further, the resin material coated with the adhesive composition may be adhered to rubber by a method wherein the resin material is coated with a treating solution containing RFL prepared by a well-known method and then embedded in the uncured rubber to conduct vulcanization.

The treating solution containing the RFL is, for example, a combination of resorcin-formalin initial condensate/rubber latex (for example, 30–60% emulsion of styrene-butadiene latex, vinylpyridine-styrene-butadiene polymer latex or the like)=1:2–1:20 (weight ratio), and may contain an adhesion improver having a structure with methylene linked aromatics such as resorcin-formalin condensate obtained through novolak reaction, an aqueous dispersion of a blocked isocyanate containing methylene diphenyl dipolyisocyanate or the like and so on, if necessary.

As a method of preparing a matured solution of RFL, there are a two-step maturing method wherein water, resorcin and/or resorcin-formaldehyde condensate, formaldehyde and an alkali are mixed and condensation between resorcin and formaldehyde is conducted up to a certain extent and the resulting solution is mixed with a rubber latex and is further matured, and a one-step maturing method wherein water, resorcin and/or resorcin-formaldehyde condensate, formaldehyde, an alkali and a rubber latex are mixed from the first stage and matured. Either method may be used.

In the one-step maturing method, since a rubber latex liquid generally contains a large amount of an alkali for holding the dispersion stability thereof, even if no alkali catalyst for reacting resorcin and formaldehyde is added, a matured RFL solution might be obtained by mixing resorcin (or resorcin-formaldehyde condensate) and formaldehyde and the rubber latex liquid. In the invention, the method for obtaining a matured RFL solution by alkali contained in the rubber latex is shown by a compounding example T-2 in the following example. The decrease of alkali content included in the RFL solution by such a maturing method is favorable when the adherend is a material such as polyester or the like being easily deteriorated under heat.

As a method of treating a cord with a treating solution containing RFL, the cord is covered with the composition of the RFL treating solution in an amount of 0.5–6.0% by weight, preferably 2–6% by weight per the cord weight on dry weight. The covered cord is dried (e.g. at a temperature of 100–150° C.) and further subjected to a heat treatment at a temperature of 200–250° C.

[13] Rubber Articles and Pneumatic Tires will be Explained hereinafter

As the rubber article to be reinforced with the resin material coated with the adhesive composition according to the invention, there are mentioned a tire, a conveyor belt, a belt, a hose, an air spring and so on.

In case of a pneumatic tire, the rubber article can be preferably applied to a rubber member such as carcass ply, a belt reinforcing layer or the like.

BEST MODE FOR CARRYING OUT THE INVENTION

Figure 1:
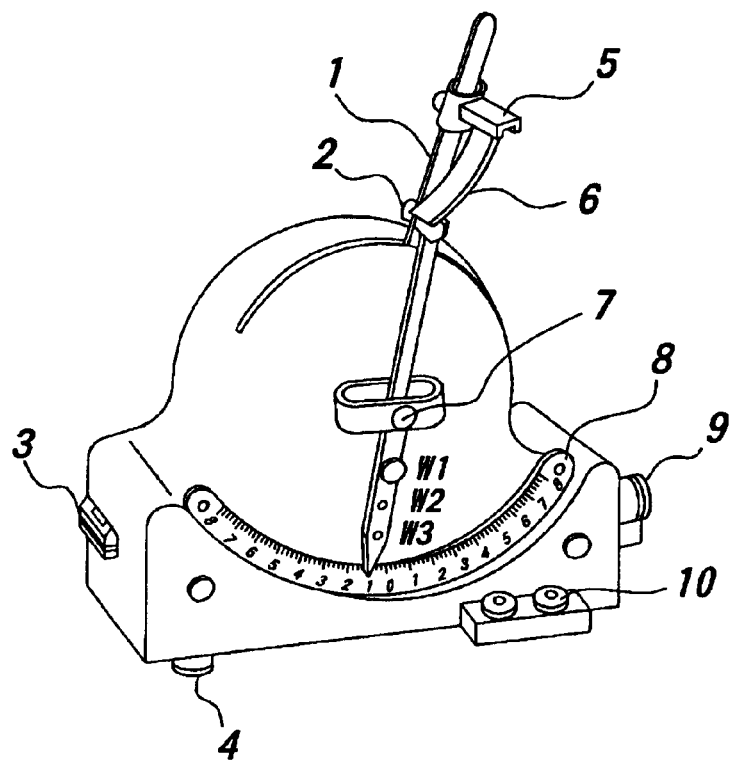
FIG. 1 is a perspective view of a Galley type testing machine.

The invention will be concretely described below, but the scope of the invention is not limited to these examples.

Moreover, the solid concentration in the examples is measured according to a method of measuring a nonvolatile component of an adhesive in the measuring methods of "Other Adhesives" of JIS K6833.

The components used in the examples are as follows:

[Polymer A]
Example products: A-1, A-2, A-3, A-4, A-5, A-8, A-9
Comparative Example products: A-6, A-7
A-1 EPOCLOTH K1010E; made by Nippon Shokubai Co., Ltd.
  Solid concentration: 40%
  (emulsion of acryl-styrene based copolymer containing 2-oxazoline group)
  Tg of polymer: −50° C., Amount of oxazoline group: 0.9 (mmol/g, solid)
A-2 EPOCLOTH K1030E; made by Nippon Shokubai Co., Ltd.
  Solid concentration: 40%
  (emulsion of acryl-styrene based copolymer containing 2-oxazoline group)
  Tg of polymer: 50° C., Amount of oxazoline group: 0.9 (mmol/g, solid)
A-3 EPOCLOTH K2030E; made by Nippon Shokubai Co., Ltd.
  Solid concentration: 40%
  (emulsion of acryl-styrene type copolymer containing 2-oxazoline group)
  Tg of polymer: 50° C., Amount of oxazoline group: 1.8 (mmol/g, solid)
A4 Polymer of Synthesis Example 1 (the preparation method will be described later)
  (emulsion of styrene based copolymer containing 2-oxazoline group)
  Tg of polymer: 140° C.
A-5 Polymer of Synthesis Example 2 (the preparation method will be described later)
  (emulsion of acryl-styrene-butadiene based copolymer containing 2-oxazoline group, but butadiene is included in not more than 10% as a monomer composition ratio)
A-6 Polymer of Synthesis Example 3 (the preparation method will be described later)
  (emulsion of acryl-styrene-butadiene based copolymer containing 2-oxazoline group, but butadiene is included in more than 10% as a monomer composition ratio)
A-7 Polymer of Synthesis Example 4 (the preparation method will be described later)
  (emulsion of acryl-styrene based copolymer containing no oxazoline group)
A-8 Polymer of Synthesis Example 5 (the preparation method will be described later)
  (emulsion of acrylic copolymer containing blocked isocyanate group)
A-9 Polymer of Synthesis Example 6 (the preparation method will be described later)
  (emulsion of urethane based copolymer containing a hydrazino group)

[Water-soluble High Polymer B]
Example products: B-1, B-2, B-3, B-4, B-5, B-6
B-1 ISOBAM 10; made by Kuraray Co., Ltd.
  solid content: 100%
  (copolymer of isobutylene and maleic anhydride)
  Molecular weight: 160,000~170,000
B-2 ISOBAM 04; made by Kuraray Co., Ltd.
  Solid content: 100%
  (copolymer of isobutylene and maleic anhydride)
  Molecular weight: 55,000~65,000
B-3 ISOBAM 110; from Kuraray Co., Ltd.
  Solid content: 100%
  (derivative of copolymer of isobutylene and maleic anhydride, obtained by reacting maleic anhydride unit with ammonia to form a monoamide unit of maleic acid and conducting ring closure under heating to form maleimide unit)
  Molecular weight: 190,000–200,000
B-4 JULIMER AC-10L; made by Nippon Junyaku Co., Ltd.
  Polyacrylic acid
B-5 SCRIPSET 520; made by Monsanto
  (styrene-maleic anhydride copolymer; molecular weight: 350,000)
B-6 Polymer of Synthesis Example 7 (the preparation method will be described later)
  Solid content: 100%
  (allyl ether-maleic anhydride copolymer; molecular weight: 27,000)

[Compound (C)]
Example products: C-1, C-2, C-3, C-4, C-5, C-6.
C-1 DELION PAS-037; made by Takemoto Yushi Co., Ltd.
  (diphenylmethane bis(4,4'-carbamoyl-ε-caprolactam): including a molecular structure of diphenylmethane diisocyanate and a blocking agent)
  Solid concentration: 27.5%
C-2 GRILBOND IL-6; made by EMS-CHEMIE AG
  (Caprolactam Blocked dipheylmethane-diisocyanate; including diphenylmethane diisocyanate and a blocking agent)
  Solid concentration: 50%
C-3 PENACOLITE R-50; made by Indspec Chem. Co.
  (Condensate of resorcin and formaldehyde through novolak reaction)
  Solid concentration: 50%
C-4 DENABOND-AF; made by Nagase Kasei Kogyo Co., Ltd.
  (Condensate of chlorophenol and formaldehyde and resorcinol)
  Solid concentration: 30%
C-5 Polymer of Synthesis Example 8 (the preparation method will be described later)
  (Sulfomethylated product of resorcin-formaldehyde condensate through novolak reaction)
C-6 ARLDITE ECN1400; made by Asahi Chiba Co., Ltd.

Solid concentration: 40%
(40% aqueous dispersion of epoxy cresol novolak resin, pH 7.5, epoxy value 0.44(equivalent/100 g, solid))

[Aqueous Urethane Compound (I)]
Example products: I-1, I-2, I-3, I-4;
I-1 Polymer of Synthesis Example 9 (the preparation method will be described later)
(Heat-reaction type aqueous urethane resin containing polymethylene polyphenylene polyisocyanate)
I-2 ELASTRON BN27; made by Daiichi Kogyo Seiyaku Co., Ltd.
Solid concentration: 30%
(Heat-reaction type aqueous urethane resin having a molecular structure of methylene diphenyl)
I-3 Polymer of Synthesis Example 10 (the preparation method will be described later)
(Heat-reaction type aqueous urethane resin containing polymethylene polyphenylene polyisocyanate)
I-4 ELASTRON BN77; made by Daiichi Kogyo Seiyaku Co., Ltd.
Solid concentration: 31%
(Heat-reaction type aqueous urethane resin having a molecular structure of methylene diphenyl)

[(D) Aliphatic Epoxide Compound]
Example products: D-1, D-2
D-1 DENAKOL EX614B; made by Nagase Kasei Kogyo Co., Ltd.
(Sorbitol polyglycidyl ether)
D-2 SR-4GL; made by Sakamoto Yakuhin Kogyo Co., Ltd.
(Polyglycerin polyglycidyl ether)

[(E) Metal Salt]
Example products: E-1, E-2
E-1 WHITON P-30; made by Shiraishi Calcium Co., Ltd.
(Calcium carbonate); Average particle size 0.15 μm.
E-2 Aluminum hydroxide; commercially available reagent, made by Wako Junyaku Co., Ltd.

[(F) Metal Oxide]
Example product: F-1
F-1 FINEX-75; made by Sakai Kagaku Kogyo Co., Ltd.
(Zinc oxide); Average particle size 0.01 μm.

[(G) Rubber Latex]
Example products: G-1, G-2
G-1 JSR2108; made by JSR Corporation
Solid concentration: 40%
(styrene-butadiene copolymer latex (SBR latex))
G-2 Polymer of Synthesis Example 11 (the preparation method will be described later)
(vinylpyridine-butadiene-styrene copolymer latex (the name: nVp latex)

[Benzene Derivative Containing Two or More (Blocked) Isocyanate Groups (H)]
Example product: H-1
H-1 Thanecure T9; made by TSE Industry Inc.
(1,3-bis(3-isocyanato-4-methylphenyl)-1,2-diazetidin-2,4-dione; dimer of tolylene diisocyanate)
Solid content: 100%

(1) Preparation Method of Thermoplastic High Molecular Weight Polymer (A)

a) Synthesis Example 1 (A-4)

Into a flask provided with a stirrer, a reflux condenser, a nitrogen introducing tube, a thermometer and a dropping funnel are charged 782.4 parts of deionized water and 128 parts of 15% aqueous solution of HITENOL N-08 (ammonium sulfate of polyoxyethylene nonylphenylether, made by Daiichi Kogyo Seiyaku Co., Ltd.), which is adjusted to pH 9.0 with a suitable amount of 28% ammonia water and then heated to 70° C. while gently flowing a nitrogen gas. 64 parts of 5% aqueous solution of potassium persulfate is poured thereinto and then a previously prepared monomer mixture comprising 576 parts of styrene and 64 parts of 2-isopropenyl-2-oxazoline is added dropwise for 3 hours. During the reaction, the nitrogen gas was blown thereinto and the temperature inside the flask is kept at 70±1° C. Even after the dropping, the same temperature is kept for 2 hours, and then the inside temperature is raised to 80° C., and the stirring is kept for 1 hour to complete the reaction. Thereafter, it is cooled to obtain an aqueous dispersion of a polymer containing 2-oxazoline group and having 39.5% of non-volatile matter and pH of 8.0.

The presence of 2-oxazoline group in the resulting aqueous dispersion is confirmed by a Fourier transform infrared spectrophotometer (FT-IR) based on a strong absorption of carbon-nitrogen double bond in the 2-oxazoline group (wave number 1655–1657 cm$^{-1}$).

b) Synthesis Example 2 (A-5)

The same procedure as in Synthesis Example 1 is repeated except that the previously prepared monomer mixture comprises 18.8 parts of 1,3-butadiene, 557.2 parts of styrene and 64 parts of 2-isopropenyl-2-oxazoline, whereby there is obtained an aqueous dispersion of a 2-oxazoline group-containing polymer having 39.3% of non-volatile matter and pH of 8.0.

The presence of 2-oxazoline group is confirmed in the same manner as mentioned above.

c) Synthesis Example 3 (A-6)

The same procedure as in Synthesis Example 1 is repeated except that the previously prepared monomer mixture comprises 105 parts of 1,3-butadiene, 471 parts of styrene and 64 parts of 2-isopropenyl-2-oxazoline, whereby there is obtained an aqueous dispersion of a 2-oxazoline group-containing polymer having 40.1% of non-volatile matter and pH of 8.0.

The presence of 2-oxazoline group is confirmed in the same manner as mentioned above.

d) Synthesis Example 4 (A-7)

The same procedure as in Synthesis Example 1 is repeated except that the previously prepared monomer mixture comprises 2200 parts of butyl acrylate and 432 parts of styrene, whereby there is obtained an aqueous dispersion of a polymer having 39.5% of non-volatile matter and pH of 8.0.

e) Synthesis Example 5 (A-8)
i) Synthesis of Urethane Acrylate Monomer Containing Blocked Isocyanate Group to be Polymerized Into a four-necked flask provided with a stirrer, a condenser and a thermometer are charged 1500 parts of 3-methylpentane adipate having a molecular weight of 500, 134 parts of trimethylol propane and 1464 parts of tetramethylxylylene isocyanate. Thereafter, they are warmed to 100° C. and reacted for 5 hours to obtain polyfunctional terminal isocyanate prepolymer (ratio of NCO content 4.1%). Then, the temperature of the product is rendered into 60° C. and 174 parts of β-hydroxyethyl methacrylate is added to conduct the reaction for 2 hours. Thereafter, 130 parts of methylethyl ketoxime is further added to conduct the reaction for 2 hours, whereby there is obtained urethane acrylate.

ii) Preparation of Monomer Mixture for Emulsion Polymerization

Into a beaker is charged 125 parts of an ion-exchanged water, to which are added 10 parts of NOIGEN EA190D (nonion type surfactant, made by Daiichi Kogyo Seiyaku Co., Ltd.) and 15 parts of PLYSURF A-215E (anion type surfactant, made by Daiichi Kogyo Seiyaku Co., Ltd.) and uniformly dissolved therein with stirring. Then, 130 parts of the urethane acrylate obtained at the above step i, 250 parts of ethylacrylate, 100 parts of butylacrylate, 10 parts of N-methylol acrylamide and 10 parts of acrylic acid are added and fully emulsified in water to obtain a monomer mixture.

iii) Emulsion Polymerization of Acrylic Copolymer Emulsion Containing Blocked Isocyanate Group An inside of a cylindrical flask provided with a stirrer, two dropping funnels, a condenser and a thermometer is completely substituted with nitrogen. Then, 250 parts of an ion-exchanged water is added thereto and 1 part of PLYSURF A-215E is added with stirring and warmed to 70° C., and 20 parts of the monomer mixture obtained at the step ii is added thereto. After 15 minutes, 25 parts of 5% aqueous solution of sodium persulfate is added to start polymerization for 15 minutes.

Subsequently, 630 parts of the remaining monomer mixture and 25 parts of 5% aqueous solution of sodium persulfate are added dropwise over 3 hours and polymerized. After 30 minutes from the completion of the dropping, 50 parts of 5% aqueous solution of sodium persulfate is added dropwise over 1 hour. Thereafter, it is cooled and filtered through a 200 mesh wire net to obtain an emulsion. This emulsion has a solid concentration of 50%.

f) Synthesis Example 6 (A-9) (See: Synthesis Example 1 of JP-A-10-139839)

Into a four-necked flask provided with a reflux condenser, a thermometer and a stirrer are charged 80 parts by weight of polycaprolactone (made by Daicel Chemical Industries Ltd.; molecular weight 2,000), 99.9 parts by weight of isophorone diisocyanate, 30 parts by weight of dimethylol propionic acid, 100 parts by weight of polyester polyol (ERITEL 3320, molecular weight 2,000, made by Unitika Ltd.), 28.1 parts by weight of propylene glycol diglycidyl ether-acrylic acid addition product (made by Kyoeisha Kagaku Co., Ltd.), 30 parts by weight of N-methylpyrolidone and 150 parts by weight of ethyl acetate, which are stirred in a nitrogen atmosphere and heated to 90° C., and then urethane reaction is conducted at this temperature for 1 hour. Thereafter, it is cooled to 40° C. to obtain a prepolymer having a terminal NCO. Then, 20 parts by weight of triethylamine is added to the prepolymer, and 600 parts by weight of an ion-exchanged water is added after the neutralization. Then, 12.0 parts by weight of adipic acid dihydrazide is added to the reaction system and stirred at 50° C. for 1 hour, and thereafter ethyl acetate is distilled off under a reduced pressure and water dilution is conducted so as to obtain 30% of solid content, whereby there is obtained a urethane based copolymer emulsion having terminal hydrazine.

The polystyrene converted weight average molecular weight (Mw) is 35,000 as measured by a GPC (gel permeation chromatography).

(2) Preparation Method of Water-soluble High Polymer (B)

a) Synthesis Example 7 (B-6)

Into a glass reaction vessel provided with a thermometer, a stirrer, a dropping funnel, a nitrogen introduction tube and a reflux condenser are charged 336 parts of methoxy-6-ethylene glycol allyl ether (made by NOF Corporation), 98.0 parts of maleic anhydride, 6.0 parts of benzoyl peroxide and 566.0 parts of toluene. After an inside of the vessel is substituted with nitrogen with stirring, it is heated to 80° C. and this temperature is kept for 4 hours to progress the reaction. After toluene is distilled off at 110° C. under a reduced pressure of 10 mmHg, the inside is turned to a normal temperature and a normal pressure to obtain allyl ether-maleic anhydride copolymer having a weight average molecular weight of 27,000 (polyethylene glycol conversion).

(3) Preparation Method of Compound (C)

a) Synthesis Example 8 (C-5)

Into a reaction vessel provided with a thermometer, a stirrer, a reflux condenser and a dropping funnel are charged 100 parts by weight of resorcin, 16.3 parts by weight of water and 0.16 part by weight of paratoluene sulfonic acid, which are dissolved at room temperature and added dropwise with 97.7 parts by weight of 37% formalin solution over 0.5 hour with stirring at 110° C. After the stirring is continued for 5.0 hours, 6.3 parts by weight of sodium sulfite is added to conduct reaction at 90° C. for 2 hours with stirring to thereby obtain a sulfomethylated phenol based condensate.

(4) Preparation of Aqueous Urethane Compound (I)

a) Synthesis Example 9 (I-1) (see: Example (6) of JP-A-58-49770)

In a flask provided with a stirrer, a reflux condenser, a nitrogen introducting tube, a thermometer and a dropping funnel are reacted 100 parts of polymethylene polyphenyl polyisocyanate (NCO content 31.5%) and 24.4 parts of 2 mole ethylene oxide addition product of bisphenol A (hydroxyl value=35.4) at 85° C. for 30 minutes to obtain a urethane prepolymer having 20.7% of free isocyanate. Then, 62.2 parts of dioxane, 72 parts of p-sec-butylphenol and 0.25 part of triethylamine are added at 50° C. and reacted at a temperature inside system of 75° C. for 120 minutes to obtain a partially blocked prepolymer having 4.2% of free isocyanate per the sum of polymethylene polyphenyl polyisocyanate and 2 mole ethylene oxide addition product of bisphenol A. Next, 55 parts of an aqueous solution of taurine soda having a concentration of 30% is added at a temperature inside system of 40° C. and reacted at 40–45° C. for 30 minutes. Thereafter, water dilution and dioxane removal are conducted so as to obtain a solid content of 30%, whereby there is obtained a heat-reaction type aqueous urethane resin.

b) Synthesis Example 10 (I-3) (see: Example of JP-A-9-111050)

In a flask provided with a stirrer, a reflux condenser, a nitrogen introduction tube, a thermometer and a dropping funnel are reacted 100 parts of polymethylene polyphenyl polyisocyanate (NCO content 31.5%) and 46 parts of polypropylene glycol having an average molecular weight of 500 at 85° C. for 30 minutes to obtain a urethane prepolymer having 15.4% of free isocyanate. Then, 70 parts of dioxane, 43 parts of ε-caprolactam and 0.2 part of triethylamine are added and reacted at a temperature inside system of 75° C. for 120 minutes to obtain a partially blocked prepolymer having 4.8% of free isocyanate per the sum of polymethylene polyphenyl polyisocyanate and polypropylene glycol. Next, 80 parts of an aqueous solution of taurine soda having a concentration of 30% is added at a temperature inside system of 40° C. and reacted at 40–45° C. for 30 minutes. Thereafter, water dilution and dioxane removal are conducted so as to obtain a solid content of 30%, whereby there is obtained a heat-reaction type aqueous urethane resin.

(5) Preparation of Rubber Latex (G)

a) Synthesis Example 11 (G-2) (see: Example 1 of WO 97/13818, nVp Latex Produced Through a Multi-stage Feed Polymerization)

Into a nitrogen-purged autoclave of 5 liter capacity provided with a stirrer are charged dissolved 130 parts by weight of deionized water and 4.0 parts by weight of potassium rosinate. Into the resulting solution are charged a monomer mixture (a) comprising 7.5 parts by weight of 2-vinylpyridine, 36 parts by weight of styrene and 16.5 parts by weight of 1,3-butadiene and 0.2 part by weight of t-dodecylmercaptan as a chain transfer agent, and emulsified. Thereafter, the temperature is raised to 50° C. and 0.5 part by weight of potassium persulfate is added to start polymerization. After the conversion of the monomer mixture (a) reaches 80~90%, a monomer mixture (b) comprising 6 parts by weight of 2-vinylpyridine, 6 parts by weight of styrene and 28 parts by weight of 1,3-butadiene and 0.2 parts by weight of t-dodecylmercaptan are added to continue polymerization. After the conversion reaches 95%, 0.1 part by weight of hydroquinone is added to stop polymerization. Then, unreacted monomers are removed under a reduced pressure and then the concentration is adjusted to obtain a copolymer rubber latex having a solid concentration of 40%.

(6) Preparation of Adhesive Liquid (S)

(6-1) Preparation of Aqueous Solutions having a Solid Concentration of 10%

(i) Aqueous Solutions B-1–B-6

In a flask provided with a stirrer, the water-soluble high polymer (B) is added to water or a mixed solution of water and 25% alcohol in a compounding amount shown in Table 1, dissolved at a temperature of about 90° C. and cooled to room temperature. Moreover, the water-soluble high polymer (B) reaches not lower than 90° C. through heat of hydration, it is gradually added so as not to cause bumping. In each aqueous solution obtained by dissolving at the part by weight in Table 1, the concentration is made slightly higher than solid content of 10% due to water evaporation at the time of adding the water-soluble high polymer, so that the solid concentration is measured and adjusted to 10% by diluting with water.

(ii) Aqueous Solutions A-1–A-9, C-1, C-2, C-4–C-6, G-1, G-2, I-1–I-4

As regard A-1–A-9, C-1, C-2, C-4–C-6, G-1, G-2 and I-1–I-4, each of which being already an aqueous solution or aqueous dispersion, the solid concentration is adjusted to 10% by diluting with water.

(iii) Aqueous Solution C-3

Although C-3 is already an aqueous solution, when it is diluted with water, solid is precipitated, so that water dilution is conducted so as to render the solid concentration at dry into 10% by mixing 20 parts by weight of C-3 with a mixed solution comprising 74 parts by weight of water and 6 parts by weight of 25% ammonia water and sufficiently stirring them.

(iv) Aqueous Solutions D-1, D-2

Each of D-1 and D-2 being water-soluble aliphatic epoxide compounds is dissolved so as to obtain a solid concentration of 10% by adding 10 parts by weight of the aliphatic epoxide compound to 90 parts by weight of water and sufficiently stirring them.

(6-2) Preparation of Adhesive Solutions S-1–S-114

(i) Adhesive Solutions S-1–S-45, S-48, S-50–S-75, S-79, S-80, S-82–S-101, S-105, S-106, S-108, S-109, S-112–S-114

Aqueous solutions of kinds and weight % as shown in Tables 2–10 having an adjusted solid concentration of 10% are compounded in an order of C-aqueous solution, I-aqueous solution, A-aqueous solution, G-aqueous solution, B-aqueous solution, and D-aqueous solution and sufficiently mixed with stirring.

(ii) Adhesive Solutions S-46, S-47, S-49, S-76–S-78, S-81, S-102–S-104, S-107, S-110, S-111

Firstly, metal salt (E), metal oxide (F) or benzene derivative (H) as a solid component having a concentration of 100% is mixed into B-aqueous solution of kind and weight % as shown in Tables 2–10 and well stirred to form a water dispersion. In this way, the aqueous dispersion containing the water-soluble high polymer (B) as a protective colloid and having a more stabilized dispersion stability is previously prepared. Then, 9% by weight of water, and C-aqueous solution, I-aqueous solution and A-aqueous solution of kinds and weight % as shown in Tables 2–10 are compounded in this order and thereafter the above aqueous dispersion is compounded and further D-aqueous solution of kind and weight % as shown in Tables 2–10 is compounded and fully mixed with stirring.

(7) Preparation of Resin Material Surface-coated with Adhesive Solution (S)

As a resin material to be surface-treated with the adhesive solution (S), there are used three kinds of tire cords having denier and twisting structure (twist number, twisting coefficient) as shown in Table 11. That is, polyethylene terephthalate tire cord and polyethylene naphthalate tire cord (Trademark: Pentex, made by Allied Signal Corporation) as a polyester resin material, and an aramid tire cord (Trademark: Kevlar, made by DuPon Ltd.) as an aromatic resin material are used.

These resin materials are immersed in the adhesive solution (S), and subjected to a treatment drying water solvent in the adhesive solution (S) and further to an adhesion treatment under heating. In this case, the dry treating conditions (drying temperature and drying time) and adhesion treating conditions under heating (hot temperature and hot time) are shown in Table 11.

And also, the dry weight of the adhesive composition covering the cord is adjusted by vacuum suctioning or the like. The dry weight (Solid pick up; which is abbreviated to SPU hereinafter) of the adhesive composition per the cord weight is measured from a weight difference of the adhesive composition before and after the treatment of the cord, and the results are shown in Tables 2–10 as an adhesion rate (S).

(8) RFL Adhesive Composition Used in Two-bath System

This is an adhesive composition containing a rubber latex to be coated onto a surface of a layer of the adhesive composition (S) according to the invention applied onto the surface of the resin in the above step (7).

(8-1) Preparation of Adhesive Solution (T)

Firstly, there is prepared a mixture by compounding water, resorcin, formalin and 10% aqueous solution of sodium hydroxide at the kinds and weight % as shown in Table 12 in this order with sufficient stirring. These mixtures are matured at a temperature and a time as shown in Table 12, if necessary, to obtain resorcin-formaldehyde mixed solutions.

Then, vinylpyridine-styrene-butadiene copolymer latex (JSR0655, made by JSR Corporation, solid concentration 41%, actually measured pH value=10.7) and styrene-butadiene copolymer latex (JSR2108, made by JSR Corporation, solid concentration 40%, actually measured pH value=10.6) having parts by weight as shown in Table 12 are added to the resorcin-formaldehyde mixed solution and matured at a temperature and a time as shown in Table 12 to obtain a matured RFL solution.

Moreover, the adhesive solution T-2 is used in Example 76, and the adhesive solution T-3 is used in Example 77, and the adhesive solution T-1 is used in the other comparative examples and examples.

(8-2) Preparation of Resin Material Further Surface-coated with Adhesive Solution (T)

The tire cord coated on the surface of the resin material with the adhesive composition according to the invention at the above step (7) is immersed into the adhesive solution (T) and subjected to a treatment drying water solvent in the adhesive solution (T) and further to an adhesion treatment under heating. In this case, the dry treating condition (dry temperature and dry time) and the adhesion treating condition under heating (hot temperature and hot time) for the adhesive composition (T) are shown in Table 11. And also, the dry weight of the adhesive composition covering the cord is not particularly limited. However, for the comparison of the examples and the comparative examples in the invention, the adhering amount is adjusted by vacuum suctioning or the like so as to become about 1.5–2.5% by weight per the cord weight.

(9) Initial Adhesion Property (Adhesion Force and Rubber Adhered Rate)

The cord treated with the adhesive composition in the step (8) is embedded in a rubber composition of an uncured state having a compounding recipe as shown in Table 13 to prepare a test specimen, which is cured under a pressure of 20 Kg/cm$^2$ at 160° C.×20 minutes.

The cured product is cooled to room temperature and the cord is dug up therefrom and then the strength in the peeling of the cord from the cured product at a rate of 30 cm/min is measured at an indoor atmosphere temperature of 25±1° C. to obtain results as an initial adhesion force as shown in Tables 2–10.

Further, the rubber adhered state after the peeling is observed to obtain results as a rubber adhered rate (rubber adhesion) ranked by Table 14 as shown in Tables 2–10.

(10) Adhesion Property at High Temperature (Adhesion Force and Rubber Adhesion)

The peeling strength is measured in the same manner as mentioned above except that the cord is peeled off from the cured product in an oven kept at an atmospheric temperature of 200±1° C. and represented by a high-temperature adhesion force, and also the rubber adhered rate (rubber adhesion) is measured in the similar manner. The results are shown in Tables 2–10.

(11) Adhesion Property After Heat Deterioration (Adhesion Force and Rubber Adhesion)

The peeling strength is measured in the same manner as in the above step (9) except that the vulcanizing temperature and time are 200° C.×30 minutes and represented by an adhesion property after heat deterioration, and also the rubber adhered rate (rubber adhesion) is measured in the same manner. The results are shown in Tables 2–10.

Moreover, the heat deterioration of 200° C. in this test method is conducted by applying a curing pressure higher than the atmospheric pressure, which is a condition largely promoted than the heat deterioration under the atmospheric pressure.

(12) Overall Heat-resistant Adhesion Property (Total Performances of Physical Heat Resistance and Chemical Heat Resistance) (Adhesion Force and Rubber Adhesion The cord treated with the adhesive composition in the step (8) is embedded in an uncured rubber composition having a compounding recipe as shown in Table 13 and cured under a pressure of 20 Kg/cm$^2$ at 160° C.×20 minutes.

The cured product is cooled to room temperature and the cord is dug up therefrom to prepare an adhesion test specimen, which is left to stand in an oven of 200±1° C. for 30 minutes and the strength in the peeling of the cord from the cured product at a rate of 30 cm/min is measured at the same atmospheric temperature of 200±1° C. as an overall heat-resistant adhesion force. And also, the rubber adhered state after the peeling is observed as a rubber adhered rate (rubber adhesion) ranked by Table 14. These results are shown in Tables 2–10.

(13) Tube Fatigue Test

The tube fatigue time is measured according to 3.2.2.1 method-A of JIS L1017-1983 to obtain results as shown in Tables 2–10. The curing conditions of the sample are 160° C.×20 minutes, and 20 kg/cm$^2$.

(14) Integrated Reaction Calorie of Adhesive Composition

The integrated reaction calorie of the adhesive composition is measured as follows.

Firstly, each of the adhesive solutions (S) at a state of water mixture is air-dried on a Teflon petri dish and left to stand at 40° C. under a reduced pressure of not more than 1 Torr for 1 day to prepare a dry film. This dry film is subjected to a heat treatment in an oven at 140° C. for 80 seconds, 200° C. for 60 seconds, 140° C. for 80 seconds and 240° C. for 60 seconds.

Then, the heat treated film is pulverized by the following method. Firstly, the heat treated film is placed into a mortar vessel (or a metallic bowl) and a liquid nitrogen is poured thereinto up to 80% of the vessel. After the sample and vessel are cooled down and evaporation of the liquid nitrogen is relatively settled, the film in the liquid nitrogen is pulverized by a pestle. This pulverized film is filtered through a 80 mesh wire net together with the liquid nitrogen and then the liquid nitrogen is evaporated to obtain an adhesive powder classified into not more than 80 mesh. Moreover, the pulverization can be carried out by using a small-size grinder (a blender made by Woring or the like, use by attaching a lid onto a small-size grinder made of a metallic vessel) instead of the mortar. And also, the reason of using the liquid nitrogen is due to the fact that the pulverization becomes easy as the film to be pulverized becomes hard.

About 10 mg of the obtained adhesive powder is sampled in a pressure-resistant stainless pan and weighed. To the pressure-resistant stainless pan is further added insoluble sulfur having a particle size of not more than 80 mesh in an amount of 10% by weight (±0.5%) per the weight of the adhesive powder, which is then weighed. Next, the sulfur and adhesive powder in the pressure-resistant stainless pan are uniformly mixed with sharp tipped tweezers and then kneaded sufficiently. After the kneading, it is confirmed that the change of weight is within ±1% before the kneading and the pan is closely sealed.

Thereafter, the reaction calorie at the curing temperature is measured by a differential scanning calorimetry meter capable of controlling temperature setting for the measurement as follows.

Firstly, the pressure-resistant stainless pan including the sample is set on the differential scanning calorimetry meter and held at 90° C. not starting the vulcanization for 5 minutes and then raised up to 160(±1)° C. in one minute and held at this temperature. The calories measured from 3 minutes after the start of the temperature rise over 90 minutes are integrated (RUN 1).

Thereafter, the pan is treated at 180° C. for 10 minutes and again held at 90° C. for 5 minutes and then raised up to 160(±1)° C. in one minute, and then the calories measured from 3 minutes after the start of temperature rise over 90 minutes are integrated (RUN 2).

The integrated reaction calorie when 100 parts by dry weight of the adhesive composition and 10 parts by weight of sulfur are reacted at 160° C. for 90 minutes is obtained by subtracting the value of RUN 2 (heat capacity of vessel and sample) from the value of RUN 1 (reaction calorie+heat capacity of the vessel and sample) and converting the difference into the above unit weight. The thus measured integrated reaction calorie (J/g) of the adhesive composition (S) is shown as follows.

| | |
|---|---|
| Example 27 | 34 J/g |
| Example 34 | 68 J/g |
| Example 38 | 113 J/g |
| Example 40 | 66 J/g |
| Example 41 | 72 J/g |

Since hydrogen sulfide gas is generated during vulcanization, the vessel used in the differential scanning calorimetry is a pressure-resistant pan causing no change of weight during the measurement, and the material therefor is favorable to be a stainless product (SUS 15) having a low reactivity with sulfur. And also, the state of insufficiently mixing and kneading sulfur and adhesive powder can be judged from a fact that the pan is placed in the liquid nitrogen at the time of 2 minutes after the temperature rise at 160° C. to conduct quenching and the sample is cut to observe sulfur particles on the cut surface (by a scanning electron microscope and an X-ray material analysis).

(15) Storage Modulus G' of Adhesive Composition

The storage modulus G' of the adhesive composition is measured as follows.

Firstly, each of the adhesive solutions (S) at a state of water mixture is dried on a petri dish under a reduced pressure of 120–30 Torr and then dried under a reduced pressure of not more than 1 Torr for one day to prepare a dry film having a thickness of 1.00±0.05 mm. This dry film is set on a parallel plate-type measuring portion of 8 mm in diameter in a dynamic viscoelasticity measuring device (made by Perphysica, UDS200). While applying a constant force (automatically corrected at 2N) to the plate so as to lightly push the sample of the dry film by the plate for preventing the shifting beneath the plate or peeling from the plate due to heat shrinkage, the viscoelasticity measuring device is firstly heated at a temperature raising speed of 60° C./min and upon reaching 240° C., it is subjected to a heat treatment at 240° C. for 1 minute and then cooled up to 0° C. at a cooling rate of 20° C./min using a cooling device such as a gas chiller or the like. In this way, the storage modulus G' (dyn/cm) of the thus dried and heat-treated sample at a frequency of 10 Hz, a strain of 0.05% and a temperature raising rate of 10° C./min is measured at 60° C. and 200° C. by the above dynamic viscoelasticity measuring device, respectively. The results are as follows.

| | | |
|---|---|---|
| Comparative Example 12 | $8.83 \times 10^8$ (60° C.) | $2.73 \times 10^5$ (200° C.) |
| Comparative Example 28 | $1.39 \times 10^9$ (60° C.) | $9.20 \times 10^8$ (200° C.) |
| Comparative Example 31 | $1.78 \times 10^9$ (60° C.) | $1.04 \times 10^9$ (200° C.) |
| Example 2 | $8.20 \times 10^8$ (60° C.) | $3.82 \times 10^7$ (200° C.) |
| Example 7 | $8.71 \times 10^8$ (60° C.) | $6.94 \times 10^7$ (200° C.) |
| Comparative Example 33 | $2.26 \times 10^9$ (60° C.) | $8.95 \times 10^8$ (200° C.) |
| Comparative Example 36 | $2.70 \times 10^9$ (60° C.) | $1.11 \times 10^9$ (200° C.) |
| Example 21 | $8.43 \times 10^8$ (60° C.) | $2.63 \times 10^7$ (200° C.) |
| Example 43 | $1.48 \times 10^9$ (60° C.) | $8.75 \times 10^8$ (200° C.) |
| Example 58 | $7.73 \times 10^8$ (60° C.) | $2.47 \times 10^7$ (200° C.) |
| Example 69 | $5.63 \times 10^8$ (60° C.) | $2.47 \times 10^7$ (200° C.) |

(16) Cord Stiffness

The Galley stiffness value as a bending rigidity of the cord treated with the adhesive composition in the steps (7) and (8) is measured according to a cord stiffness testing method described in JP-A-5-29304. That is, the treated cord is fixed to a frame and thermally set at a temperature of 130° C. for 30 minutes to keep the cord at a straight state. This is cut into a given sample length to measure the stiffness thereof by a Galley stiffness tester (made by Toyo Seiki Co., Ltd.).

Figure 2:
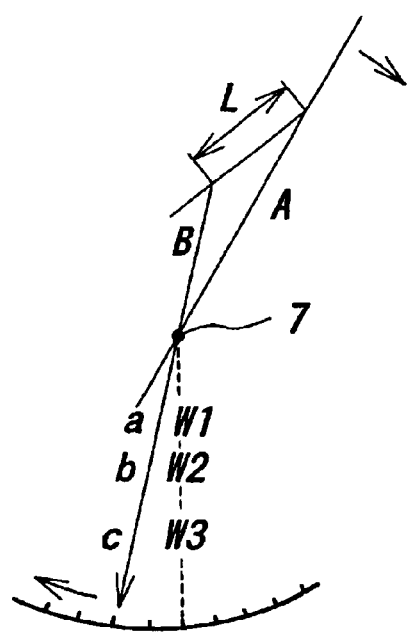
FIG. 2 is an enlarged view of a main part of FIG. 1.

In FIG. 1 is shown a perspective view of the Galley type testing machine, and FIG. 2 shows a main part thereof. Numeral 1 is a movable arm (A), numeral 2 a pendulum (B), numeral 3 a level, numeral 4 a level screw, numeral 5 a chuck, numeral 6 a test piece, numeral 7 a bearing (fulcrum), numeral 8 a scale plate, numeral 9 a weight, and numeral 10 a driving switch button.

The mounting and measuring procedures of the test specimen are as follows.

(a) The chuck attached to the movable arm is adjusted and fixed to a marking position "1 inch" of the movable arm. The test piece (sample cord) is attached to the chuck vertically (90±1°).

(b) The weight is attached to the lower portion of the movable arm (lower than the bearing). Since the attaching holes for the weight are at positions of 1 inch (w1 in FIG. 1), 2 inch (w2 in FIG. 1) and 4 inch (w3 in FIG. 1) from the bearing, the weight is attached in accordance with loading weight and hole position corresponding to the flexibility of the test piece (sample). Moreover, the concrete "manner to select the weight load and hole position" lies in that the weight load and the hole position are selected so that the "weight load" and "hole position" are variously changed and "scale plate measured value" of the test piece is actually measured by the following operation (c) and the read value is within a range of 2.0–4.0.

(c) Upon completion of setting "weight load and hole position" suitable for the flexibility of the test piece, the driving switch button is pushed to move the pendulum in left and right directions. In this case, an indicator at a lower end of the movable arm pushed by the pendulum is swung at an amplitude corresponding to the stiffness of the test piece. The "maximum swinging value" at this time is read by the scale plate of FIG. 1 to a value precision of 0.1 unit to provide a "scale plate measured value".

(d) An average value of one sample is determined by measuring one leftward value and rightward value for one test piece and total 20 values for 10 test pieces.

The calculation procedure is as follows. The stiffness is calculated from the average of the measured values according to the following equation.

$$\text{Stiffness}(mN) = RG \times \{(W1 \times 1) + (W2 \times 2) + (W3 \times 4)\}/5 \times L^2/W \times 0.1089$$

wherein RG: an average value of "scale plate measured value",

W1: load (unit g) applied to a load position (hole) of 1 inch,

W2: load (unit g) applied to a load position (hole) of 2 inch,

W3: load (unit g) applied to a load position (hole) of 4 inch,

L: sample length—½ inch (inch),

W: width of sample (mm).

In Tables 2–10 are shown a bending rigidity value (stiffness: mN) of the cord obtained in the step (7) as a stiffness (S treatment) and a bending rigidity value (stiffness: mN) of the cord obtained in the step (8) as a stiffness (S+T treatment).

(17) Tire Durability (Rubber Adhered Rate (Rubber Adhesion) at the Time of Tire Failure)

A radial tire for passenger car having a tire size of 225/50ZR15 is prepared by using the treated cords obtained in the step (8) as a carcass ply.

The thus obtained tire is assembled onto an approved rim (standard rim) of JATMA YEAR BOOK-1999 standard, adjusted to an inner pressure of 1.9 kPa in a room of 25° C.±2° C., left to stand for 24 hours, and then the air pressure is readjusted and a 100% load of the JATMA standard (air pressure: 1.9 kPa, speed: 210 km/hr) is applied to the tire, and thereafter the tire is continuously run on a drum having a diameter of about 3 m at a speed of 60 km/hr over 20,000 km. This is a case that the fatigue in the running on a street road is given to the adhesive composition.

With respect to the tire continuously run over 20,000 km, the high-speed durable test applying high temperature and high strain to the tire is carried out by a step speed method (speed is increased every 30 minutes) according to a test method of U.S. FMVSS No. 109 until the occurrence of tire trouble. Moreover, this trouble is a separation failure in the vicinity of the carcass ply ranging from the tire shoulder toward the side portion. Then, the rubber adhered state to the tire cords in such a separation failure is observed and ranked according to Table 14 to obtain results as shown in Tables 2–10.

The consideration for the above results will be described hereinafter.

From Comparative Examples 1–9 and Comparative Example 33, it can be understood that various performances such as adhesion forces and tube fatigue are low when the component of the adhesive composition is only one.

From Comparative Examples 10–13, Comparative Examples 16–18 and Comparative Examples 26–29, it can be understood that the initial adhesion force is low and hence various performances such as adhesion forces and tube fatigue time are low when the compound (C) or the aqueous urethane compound (I) is not included as an adhesion improver.

From Comparative Examples 14 and 15, it can be understood that the thermal deformation is easily caused at a high temperature, and particularly the adhesion force at the high temperature is low and hence the overall adhesion force becomes low when the crosslinking component in the adhesive composition is less.

From Comparative Examples 19–23, it can be understood that the adhesive composition containing no crosslinking agent is fluidized under a high temperature so that the adhesion force at the high temperature is low and hence the overall adhesion force becomes low.

From Comparative Example 24, it can be understood that the overall adhesion force is low in the adhesive composition containing the compound (C), a component of the compound (C) having a crosslinking property, but containing no thermoplastic high molecular weight polymer (A) nor aqueous urethane compound (I).

From Comparative Examples 25–29, it can be understood that the adhesive composition containing no thermoplastic high molecular weight polymer (A) nor aqueous urethane compound (I) is low in the overall adhesion force.

From Comparative Examples 30–32 and Comparative Examples 34–37, it can be understood that when the adhesive composition does not contain either one of the thermoplastic high molecular weight polymer (A) and the water soluble high polymer (B), the adhesion force after the heat deterioration is low and hence the overall adhesion force becomes low because the thermoplastic component absorbing strain accompanied with the reaction under heating is less.

Examples 1–4 and Examples 14–17 are embodiments where the composition of the adhesive composition is within a preferable range.

From Examples 19–36, it can be understood that the adhesion force at a high temperature and hence the overall adhesion force are improved when the adhesive composition comprising the polymer (A) and the urethane compound (I) further contains the aliphatic epoxide compound (D).

Comparative Example 38 is an embodiment wherein the polymer (A) contains more than 10% of carbon-carbon double bond having an addition reactivity with sulfur as a monomer composition ratio, from which it can be understood that the heat of reaction is not less than 85 J, the heat-resistant adhesion force is low and hence the overall adhesion force becomes low.

Comparative Example 39 is an embodiment wherein the polymer (A) does not contain a crosslinkable functional group at its pendant group. This is understood to be an embodiment that the initial adhesion force is low and hence the overall adhesion force becomes low.

Examples 44–62 are embodiments that the adhesion force at a high temperature and hence the overall adhesion force are improved when the adhesive composition comprising the water soluble high polymer (B) and the aqueous urethane compound (I) further contains the aliphatic epoxide compound (D).

Example 47 is an example that the adhered amount of the adhesive composition according to the invention is 4.2%.

Comparative Example 40 is an embodiment including not less than 18% of the rubber latex (G), from which it can be understood that the heat-resistant adhesion force is low and hence the overall adhesion force becomes low.

Example 76 is an embodiment that the heat-resistant adhesion force is enhanced when using T-2 having a compounding amount of sodium hydroxide lower than that of T-1.

Example 77 is an embodiment wherein the adhesive solution (T) contains an RFL liquid and the novolak type resorcin-formaldehyde condensate (C-3). This is a case that the RFL liquid and the compound (C) may be contained in the adhesive solution (T).

Example 34 is an embodiment that the polymer may be a polymer having not more than 10% of an addition-reactive carbon-carbon double bond derived from a conjugated diene monomer as a composition ratio in the main chain monomer.

Examples 5–17, 19–42, 44–67, 69–77 are embodiments wherein the aliphatic epoxide compound (D) is a reaction product of a polyvalent alcohol and epichlorohydrin.

Examples 37, 63, 71 are embodiments wherein the metal salt (E) is heavy calcium carbonate.

From Comparative Examples 47, 49 and 50, it can be understood that the initial adhesion force is low and hence the various adhesion forces become low when the adhesive composition does not contain the compound (C) or the aqueous urethane compound (I) as an adhesion improver.

From Comparative Example 48, it can be understood that when the crosslinking component in the adhesive composition is less, the thermal deformation is easily caused and the adhesion force at a high temperature is low and hence the overall adhesion force becomes low.

From Comparative Example 51, it can be understood that the overall adhesion force is low in the adhesive composition containing the compound (C), a component of the compound (C) having a crosslinking property, but containing no thermoplastic high molecular weight polymer (A) nor aqueous urethane compound (I).

From Comparative Examples 52 and 53, it can be understood that the overall adhesion force is low in the adhesive composition containing no thermoplastic high molecular weight polymer (A) nor the aqueous urethane compound (I).

From Comparative Example 54, it can be understood that when the adhesive composition does not contain either one of the thermoplastic high molecular weight polymer (A) and the water soluble high polymer (B), the adhesion force after the heat deterioration is low and hence the overall adhesion force becomes low because the thermoplastic component absorbing strain accompanied with the reaction under heating is less.

From Comparative Examples 61, 63 and 64, it can be understood that the initial adhesion force is low and hence the various adhesion forces become low when the compound (C) or the aqueous urethane compound (I) is not contained as an adhesion improver.

From Comparative Example 62, it can be understood that when the crosslinking component in the adhesive composition is less, the thermal deformation is easily caused and the adhesion force at a high temperature is low and hence the overall adhesion force becomes low.

From Comparative Examples 65–67, it can be understood that the overall adhesion force is low in the adhesive composition containing no thermoplastic high molecular weight polymer (A) and the urethane compound (I).

From Comparative Example 68, it can be understood that when the adhesive composition does not contain either one of the thermoplastic high molecular weight polymer (A) and the water soluble high polymer (B), the adhesion force after the heat deterioration is low and hence the overall adhesion force becomes low because the thermoplastic component absorbing strain accompanied with the reaction under heating is less.

TABLE 1

| B-aqueous Solution | Water | 25% ammonia water | Water-soluble high polymer (parts by weight of solid content) |
|---|---|---|---|
| Aqueous solution B-1 | 212.5 parts | 12.5 parts | 25.0 parts of B-1 |
| Aqueous solution B-2 | 212.5 parts | 12.5 parts | 25.0 parts of B-2 |
| Aqueous solution B-3 | 225.0 parts | — | 25.0 parts of B-3 |
| Aqueous solution B-4 | 213.0 parts | 12.0 parts | 25.0 parts of B-4 |
| Aqueous solution B-5 | 210.7 parts | 14.3 parts | 25.0 parts of B-5 |
| Aqueous solution B-6 | 210.7 parts | 14.3 parts | 25.0 parts of B-6 |

TABLE 2(a)

| | Adhesive composition | A-aqueous solution | | B-aqueous solution | | C-aqueous solution | | I-aqueous solution | | D-aqueous solution | | E, F, H or G-aqueous solution | | Resin |
|---|---|---|---|---|---|---|---|---|---|---|---|---|---|---|
| | (S) | Kind | % | Kind | % | Kind | % | Kind | % | Kind | % | Kind | % | material |
| Comparative Example 1 | S-1 | A-1 | 100 | — | — | — | — | — | — | — | — | — | — | PET |
| Comparative Example 2 | S-2 | — | — | B-1 | 100 | — | — | — | — | — | — | — | — | PET |
| Comparative Example 3 | S-3 | — | — | — | — | C-1 | 100 | — | — | — | — | — | — | PET |
| Comparative Example 4 | S-4 | — | — | — | — | C-2 | 100 | — | — | — | — | — | — | PET |
| Comparative Example 5 | S-5 | — | — | — | — | C-3 | 100 | — | — | — | — | — | — | PET |
| Comparative Example 6 | S-6 | — | — | — | — | C-4 | 100 | — | — | — | — | — | — | PET |
| Comparative Example 7 | S-7 | — | — | — | — | C-5 | 100 | — | — | — | — | — | — | PET |
| Comparative Example 8 | S-8 | — | — | — | — | C-6 | 100 | — | — | — | — | — | — | PET |
| Comparative Example 9 | S-9 | — | — | — | — | — | — | — | — | D-1 | 100 | — | — | PET |
| Comparative Example 10 | S-10 | A-1 | 20 | B-1 | 80 | — | — | — | — | — | — | — | — | PET |
| Comparative Example 11 | S-11 | A-1 | 40 | B-1 | 60 | — | — | — | — | — | — | — | — | PET |
| Comparative Example 12 | S-12 | A-1 | 60 | B-1 | 40 | — | — | — | — | — | — | — | — | PET |
| Comparative Example 13 | S-13 | A-1 | 80 | B-1 | 20 | — | — | — | — | — | — | — | — | PET |
| Comparative Example 14 | S-14 | A-1 | 80 | — | — | C-1 | 20 | — | — | — | — | — | — | PET |
| Comparative Example 15 | S-15 | A-1 | 30 | — | — | C-3 | 70 | — | — | — | — | — | — | PET |

TABLE 2(a)-continued

| | Composition of adhesive solution (S) | | | | | | | | | | | | |
|---|---|---|---|---|---|---|---|---|---|---|---|---|---|
| | Adhesive composition | A-aqueous solution | | B-aqueous solution | | C-aqueous solution | | I-aqueous solution | | D-aqueous solution | | E, F, H or G-aqueous solution | | Resin |
| | (S) | Kind | % | Kind | % | Kind | % | Kind | % | Kind | % | Kind | % | material |
| Comparative Example 16 | S-16 | A-1 | 70 | — | | — | | — | | D-1 | 30 | — | | PET |
| Comparative Example 17 | S-17 | A-1 | 40 | B-1 | 20 | — | | — | | D-1 | 40 | — | | PET |
| Comparative Example 18 | S-18 | A-9 | 40 | B-1 | 20 | — | | — | | D-1 | 40 | — | | PET |

TABLE 2(b)

| | Performances | | | | | |
|---|---|---|---|---|---|---|
| | | Initial | | At high temperature | | After heat deterioration | |
| | Adhered rate (S) (%) | Adhesion force (N/cord) | Rubber adhesion | Adhesion force (N/cord) | Rubber adhesion | Adhesion force (N/cord) | Rubber adhesion |
| Comparative Example 1 | 2.1 | 2.6 | E | 0.7 | E | 2.2 | E |
| Comparative Example 2 | 2.2 | 2.5 | E | 0.5 | E | 2.2 | E |
| Comparative Example 3 | 2.1 | 2.8 | E | 0.5 | E | 2.7 | E |
| Comparative Example 4 | 2.1 | 2.4 | E | 0.6 | E | 2.3 | E |
| Comparative Example 5 | 2.2 | 2.7 | E | 0.7 | E | 2.2 | E |
| Comparative Example 6 | 2.2 | 2.2 | E | 0.6 | E | 2.1 | E |
| Comparative Example 7 | 2.1 | 2.7 | E | 0.6 | E | 2.6 | E |
| Comparative Example 8 | 2.3 | 3.9 | E | 1.0 | E | 2.8 | E |
| Comparative Example 9 | 2.3 | 3.3 | E | 0.8 | E | 2.5 | E |
| Comparative Example 10 | 2.4 | 3.8 | E | 0.7 | E | 2.7 | E |
| Comparative Example 11 | 2.2 | 6.7 | E | 1.3 | E | 6.6 | E |
| Comparative Example 12 | 2.2 | 9.2 | D | 1.1 | D | 7.9 | D |
| Comparative Example 13 | 2.3 | 5.6 | E | 0.8 | E | 4.2 | E |
| Comparative Example 14 | 2.4 | 2.2 | E | 0.8 | E | 2.0 | E |
| Comparative Example 15 | 2.2 | 15.2 | B | 0.8 | E | 2.7 | E |
| Comparative Example 16 | 2.3 | 9.3 | D | 1.2 | D | 8.2 | D |
| Comparative Example 17 | 2.2 | 9.5 | B | 2.6 | C | 7.1 | C |
| Comparative Example 18 | 2.1 | 7.7 | B | 2.8 | C | 6.8 | C |

| | Performances | | | | | |
|---|---|---|---|---|---|---|
| | Overall heat-resistant | | Tube fatigue time | Stiffness (mN) | | Rubber adhered rank at tire failure |
| | Adhesion force (N/cord) | Rubber adhesion | | (S) treatment | (S + T) treatment | |
| Comparative Example 1 | 0.6 | E | 10 min | 59 | 62 | E |
| Comparative Example 2 | 0.5 | E | 10 min | 129 | 133 | E |

TABLE 2(b)-continued

|  |  |  |  |  |  |  |
|---|---|---|---|---|---|---|
| Comparative Example 3 | 0.4 | E | 20 min | 60 | 65 | E |
| Comparative Example 4 | 0.5 | E | 20 min | 58 | 68 | — |
| Comparative Example 5 | 0.5 | E | 20 min | 57 | 59 | — |
| Comparative Example 6 | 0.6 | E | 20 min | 59 | 63 | — |
| Comparative Example 7 | 0.6 | E | 20 min | 56 | 61 | — |
| Comparative Example 8 | 0.5 | E | 20 min | 151 | 153 | E |
| Comparative Example 9 | 0.7 | E | 20 min | 182 | 184 | E |
| Comparative Example 10 | 0.7 | E | 20 min | 64 | 71 | — |
| Comparative Example 11 | 0.9 | E | 20 min | 63 | 68 | — |
| Comparative Example 12 | 0.9 | E | 10 min | 60 | 68 | E |
| Comparative Example 13 | 0.7 | E | 20 min | 58 | 65 | — |
| Comparative Example 14 | 0.6 | E | 10 min | 59 | 64 | E |
| Comparative Example 15 | 0.7 | E | 40 min | 62 | 66 | — |
| Comparative Example 16 | 1.0 | E | 25 min | 63 | 71 | E |
| Comparative Example 17 | 0.9 | E | 50 min | 65 | 73 | E |
| Comparative Example 18 | 1.1 | E | 1 hr 40 min | 66 | 75 | — |

TABLE 3(a)

| | Adhesive composition (S) | Composition of adhesive solution (S) | | | | | | | | | | | Resin material |
|---|---|---|---|---|---|---|---|---|---|---|---|---|---|
| | | A-aqueous solution | | B-aqueous solution | | C-aqueous solution | | I-aqueous solution | | D-aqueous solution | | E, F, H or G-aqueous solution | |
| | | Kind | % | Kind | % | Kind | % | Kind | % | Kind | % | Kind | % | |
| Comparative Example 19 | S-19 | — | | B-1 | 60 | C-1 | 40 | — | | — | | — | | PET |
| Comparative Example 20 | S-20 | — | | B-1 | 60 | C-2 | 40 | — | | — | | — | | PET |
| Comparative Example 21 | S-21 | — | | B-1 | 60 | C-3 | 40 | — | | — | | — | | PET |
| Comparative Example 22 | S-22 | — | | B-1 | 60 | C-4 | 40 | — | | — | | — | | PET |
| Comparative Example 23 | S-23 | — | | B-1 | 60 | C-5 | 40 | — | | — | | — | | PET |
| Comparative Example 24 | S-24 | — | | B-1 | 60 | C-6 | 40 | — | | — | | — | | PET |
| Comparative Example 25 | S-25 | — | | B-1 | 20 | C-1 | 40 | — | | D-1 | 40 | — | | PET |
| Comparative Example 26 | S-26 | — | | B-1 | 20 | — | | — | | D-1 | 80 | — | | PET |
| Comparative Example 27 | S-27 | — | | B-1 | 40 | — | | — | | D-1 | 60 | — | | PET |
| Comparative Example 28 | S-28 | — | | B-1 | 60 | — | | — | | D-1 | 40 | — | | PET |
| Comparative Example 29 | S-29 | — | | B-1 | 80 | — | | — | | D-1 | 20 | — | | PET |
| Comparative Example 30 | S-30 | — | | B-1 | — | C-1 | 40 | — | | D-1 | 60 | — | | PET |
| Comparative Example 31 | S-31 | — | | B-1 | — | C-3 | 40 | — | | D-1 | 60 | — | | PET |
| Comparative Example 32 | S-32 | — | | B-1 | — | C-6 | 40 | — | | D-1 | 60 | — | | PET |

TABLE 3(b)

| | | Performances | | | | | |
|---|---|---|---|---|---|---|---|
| | | Initial | | At high temperature | | After heat deterioration | |
| | Adhered rate (S) (%) | Adhesion force (N/cord) | Rubber adhesion | Adhesion force (N/cord) | Rubber adhesion | Adhesion force (N/cord) | Rubber adhesion |
| Comparative Example 19 | 2.4 | 4.5 | E | 1.2 | E | 3.3 | E |
| Comparative Example 20 | 2.1 | 5.1 | E | 0.8 | E | 3.5 | E |
| Comparative Example 21 | 2.1 | 6.3 | E | 1.1 | E | 3.4 | E |
| Comparative Example 22 | 2.1 | 5.5 | E | 1.4 | E | 3.7 | E |
| Comparative Example 23 | 2.2 | 4.6 | E | 0.9 | E | 3.6 | E |
| Comparative Example 24 | 2.2 | 19.2 | A | 4.7 | B | 7.8 | D |
| Comparative Example 25 | 2.3 | 20.1 | A | 4.4 | B | 8.2 | D |
| Comparative Example 26 | 2.2 | 3.8 | E | 1.0 | D | 3.1 | E |
| Comparative Example 27 | 2.2 | 4.9 | E | 1.5 | D | 3.3 | E |
| Comparative Example 28 | 2.4 | 4.5 | E | 1.2 | D | 3.2 | E |
| Comparative Example 29 | 2.3 | 2.9 | E | 1.2 | E | 2.8 | E |
| Comparative Example 30 | 2.2 | 20.3 | A | 5.2 | A | 6.4 | D |
| Comparative Example 31 | 2.1 | 19.9 | B | 4.8 | B | 6.1 | D |
| Comparative Example 32 | 2.3 | 20.5 | A | 4.9 | B | 4.9 | E |

| | Performances | | | | | |
|---|---|---|---|---|---|---|
| | Overall heat-resistant | | Tube fatigue time | Stiffness (mN) | | Rubber adhered rank at tire failure |
| | Adhesion force (N/cord) | Rubber adhesion | | (S) treatment | (S + T) treatment | |
| Comparative Example 19 | 0.9 | E | 10 min | 60 | 66 | — |
| Comparative Example 20 | 0.8 | E | 20 min | 63 | 68 | — |
| Comparative Example 21 | 1.0 | E | 20 min | 58 | 62 | — |
| Comparative Example 22 | 1.1 | E | 10 min | 50 | 65 | — |
| Comparative Example 23 | 0.7 | E | 20 min | 57 | 61 | — |
| Comparative Example 24 | 1.8 | D | 50 min | 124 | 127 | E |
| Comparative Example 25 | 1.7 | D | 45 min | 114 | 115 | E |
| Comparative Example 26 | 0.7 | E | 30 min | 167 | 169 | — |
| Comparative Example 27 | 1.3 | E | 45 min | 141 | 144 | E |
| Comparative Example 28 | 1.3 | D | 40 min | 121 | 122 | — |
| Comparative Example 29 | 0.6 | E | 25 min | 111 | 113 | — |
| Comparative Example 30 | 1.6 | D | 20 min | 150 | 151 | E |
| Comparative Example 31 | 1.3 | E | 20 min | 136 | 139 | — |
| Comparative Example 32 | 1.2 | E | 10 min | 180 | 182 | — |

TABLE 4(a)

| | Adhesive composition (S) | Composition of adhesive solution (S) | | | | | | | | | | | Resin material |
|---|---|---|---|---|---|---|---|---|---|---|---|---|---|
| | | A-aqueous solution | | B-aqueous solution | | C-aqueous solution | | I-aqueous solution | | D-aqueous solution | | E, F, H or G-aqueous solution | |
| | | Kind | % | Kind | % | Kind | % | Kind | % | Kind | % | Kind | % | |
| Example 1 | S-33 | A-1 | 70 | B-1 | 15 | C-6 | 15 | — | | — | | — | | PET |
| Example 2 | S-34 | A-1 | 30 | B-1 | 30 | C-6 | 40 | — | | — | | — | | PET |
| Example 3 | S-35 | A-1 | 20 | B-1 | 10 | C-6 | 70 | — | | — | | — | | PET |
| Example 4 | S-36 | A-1 | 5 | B-1 | 70 | C-6 | 25 | — | | — | | — | | PET |
| Example 5 | S-37 | A-1 | 5 | B-1 | 15 | C-1 | 20 | — | | D-1 | 60 | — | | PET |
| Example 6 | S-38 | A-1 | 5 | B-1 | 5 | C-1 | 60 | — | | D-1 | 30 | — | | PET |
| Example 7 | S-39 | A-1 | 30 | B-1 | 20 | C-1 | 30 | — | | D-1 | 20 | — | | PET |
| Example 8 | S-40 | A-1 | 30 | B-1 | 20 | C-2 | 30 | — | | D-1 | 20 | — | | PET |
| Example 9 | S-41 | A-1 | 30 | B-1 | 20 | C-3 | 30 | — | | D-1 | 20 | — | | PET |
| Example 10 | S-42 | A-1 | 30 | B-1 | 20 | C-4 | 30 | — | | D-1 | 20 | — | | PET |
| Example 11 | S-43 | A-1 | 30 | B-1 | 20 | C-5 | 30 | — | | D-1 | 20 | — | | PET |
| Example 12 | S-44 | A-1 | 30 | B-1 | 20 | C-6 | 30 | — | | D-1 | 20 | — | | PET |
| Example 13 | S-45 | A-9 | 30 | B-1 | 20 | C-1 | 30 | — | | D-1 | 20 | — | | PET |
| Example 14 | S-46 | A-1 | 20 | B-1 | 20 | C-1 | 30 | — | | D-1 | 20 | F-1 | 1 | PET |
| Example 15 | S-47 | A-1 | 20 | B-1 | 20 | C-1 | 30 | — | | D-1 | 20 | F-1 | 1 | PET |
| Example 16 | S-48 | A-1 | 20 | B-1 | 20 | C-1 | 30 | — | | D-1 | 20 | G-1 | 10 | PET |
| Example 17 | S-49 | A-1 | 20 | B-1 | 20 | C-1 | 30 | — | | D-1 | 20 | H-1 | 1 | PET |

TABLE 4(b)

| | | Performances | | | | | |
|---|---|---|---|---|---|---|---|
| | | Initial | | At high temperature | | After heat deterioration | |
| | Adhered rate (S) (%) | Adhesion force (N/cord) | Rubber adhesion | Adhesion force (N/cord) | Rubber adhesion | Adhesion force (N/cord) | Rubber adhesion |
| Example 1 | 2.4 | 23.6 | A | 4.0 | B | 15.4 | A |
| Example 2 | 2.3 | 24.4 | A | 5.2 | A | 13.1 | B |
| Example 3 | 2.2 | 25.6 | D | 5.4 | A | 10.2 | D |
| Example 4 | 2.3 | 23.6 | A | 4.7 | B | 12.8 | B |
| Example 5 | 2.4 | 21.9 | A | 4.6 | B | 13.5 | B |
| Example 6 | 2.1 | 24.1 | A | 5.2 | A | 15.3 | A |
| Example 7 | 2.2 | 25.3 | A | 5.5 | A | 13.9 | B |
| Example 8 | 2.2 | 25.3 | A | 5.5 | A | 13.9 | B |
| Example 9 | 2.2 | 25.3 | A | 5.5 | A | 13.9 | B |
| Example 10 | 2.2 | 25.3 | A | 5.5 | A | 13.9 | B |
| Example 11 | 2.1 | 24.5 | A | 5.0 | B | 15.0 | A |
| Example 12 | 2.1 | 23.8 | A | 5.4 | A | 12.6 | B |
| Example 13 | 2.2 | 25.2 | A | 5.3 | A | 14.5 | B |
| Example 14 | 2.3 | 24.6 | A | 5.5 | A | 15.8 | A |
| Example 15 | 2.2 | 23.9 | A | 5.2 | A | 14.9 | A |
| Example 16 | 2.3 | 25.5 | A | 4.5 | B | 12.6 | B |
| Example 17 | 2.2 | 23.6 | A | 4.6 | B | 13.3 | B |

| | Performances | | | | | |
|---|---|---|---|---|---|---|
| | Overall heat-resistant | | | Stiffness (mN) | | Rubber adhered rank at tire failure |
| | Adhesion force (N/cord) | Rubber adhesion | Tube fatigue time | (S) treatment | (S + T) treatment | |
| Example 1 | 3.1 | B | 20 hr 20 min | 78 | 82 | — |
| Example 2 | 3.8 | B | 6 hr 20 min | 101 | 104 | B |
| Example 3 | 2.3 | B | 2 hr 40 min | 131 | 133 | — |
| Example 4 | 2.4 | B | 11 hr 50 min | 93 | 96 | — |
| Example 5 | 2.6 | B | 1 hr 30 min | 138 | 140 | — |
| Example 6 | 3.2 | A | 21 hr 10 min | 124 | 125 | — |

TABLE 4(b)-continued

|  |  |  |  |  |  |  |
|---|---|---|---|---|---|---|
| Example 7 | 3.5 | B | 10 hr 30 min | 106 | 108 | B |
| Example 8 | 3.5 | B | 10 hr 30 min | 110 | 111 | — |
| Example 9 | 3.5 | B | 10 hr 30 min | 97 | 100 | — |
| Example 10 | 3.5 | B | 10 hr 30 min | 103 | 105 | — |
| Example 11 | 3.6 | B | 23 hr 00 min | 111 | 112 | — |
| Example 12 | 2.9 | B | 16 hr 30 min | 119 | 122 | — |
| Example 13 | 4.4 | A | more than 24 hr | 103 | 105 | — |
| Example 14 | 4.7 | A | more than 24 hr | 103 | 105 | — |
| Example 15 | 4.6 | A | more than 24 hr | 104 | 107 | — |
| Example 16 | 2.5 | B | more than 24 hr | 89 | 92 | — |
| Example 17 | 3.7 | B | more than 24 hr | 100 | 102 | — |

TABLE 5(a)

|  | Adhesive composition (S) | Composition of adhesive solution (S) |  |  |  |  |  |  |  |  |  |  | Resin material |
|---|---|---|---|---|---|---|---|---|---|---|---|---|---|
|  |  | A-aqueous solution |  | B-aqueous solution |  | C-aqueous solution |  | I-aqueous solution |  | D-aqueous solution |  | E, F, H or G-aqueous solution |  |
|  |  | Kind | % | Kind | % | Kind | % | Kind | % | Kind | % | Kind | % |  |
| Comparative Example 33 | S-50 | — | — | — | — | — | — | I-1 | 100 | — | — | — | — | PET |
| Comparative Example 34 | S-51 | — | — | — | — | — | — | I-1 | 80 | D-1 | 20 | — | — | PET |
| Comparative Example 35 | S-52 | — | — | — | — | — | — | I-1 | 60 | D-1 | 40 | — | — | PET |
| Comparative Example 36 | S-53 | — | — | — | — | — | — | I-1 | 40 | D-1 | 60 | — | — | PET |
| Comparative Example 37 | S-54 | — | — | — | — | — | — | I-1 | 20 | D-1 | 80 | — | — | PET |
| Example 18 | S-55 | A-1 | 45 | — | — | — | — | I-1 | 55 | — | — | — | — | PET |
| Example 19 | S-56 | A-1 | 75 | — | — | — | — | I-1 | 15 | D-1 | 10 | — | — | PET |
| Example 20 | S-57 | A-1 | 60 | — | — | — | — | I-1 | 30 | D-1 | 10 | — | — | PET |
| Example 21 | S-58 | A-1 | 45 | — | — | — | — | I-1 | 45 | D-1 | 10 | — | — | PET |
| Example 22 | S-59 | A-1 | 15 | — | — | — | — | I-1 | 75 | D-1 | 10 | — | — | PET |
| Example 23 | S-60 | A-1 | 15 | — | — | — | — | I-1 | 20 | D-1 | 65 | — | — | PET |
| Example 24 | S-61 | A-1 | 30 | — | — | — | — | I-1 | 25 | D-1 | 45 | — | — | PET |
| Example 25 | S-62 | A-1 | 35 | — | — | — | — | I-1 | 20 | D-1 | 45 | — | — | PET |
| Example 26 | S-63 | A-1 | 55 | — | — | — | — | I-1 | 20 | D-1 | 25 | — | — | PET |

TABLE 5(b)

|  | Performances |  |  |  |  |  |  |
|---|---|---|---|---|---|---|---|
|  |  | Initial |  | At high temperature |  | After heat deterioration |  |
|  | Adhered rate (S) (%) | Adhesion force (N/cord) | Rubber adhesion | Adhesion force (N/cord) | Rubber adhesion | Adhesion force (N/cord) | Rubber adhesion |
| Comparative Example 33 | 2.0 | 4.5 | E | 0.6 | E | 3.2 | E |
| Comparative Example 34 | 2.1 | 18.4 | B | 1.6 | D | 3.8 | E |
| Comparative Example 35 | 2.2 | 19.8 | B | 2.8 | D | 4.7 | E |

TABLE 5(b)-continued

|  | | | | | | | |
|---|---|---|---|---|---|---|---|
| Comparative Example 36 | 2.4 | 19.6 | B | 5.3 | A | 4.5 | E |
| Comparative Example 37 | 2.3 | 20.2 | A | 4.9 | B | 2.8 | E |
| Example 18 | 2.1 | 17.2 | B | 3.8 | B | 10.8 | B |
| Example 19 | 2.2 | 20.7 | A | 3.8 | B | 15.7 | B |
| Example 20 | 2.2 | 22.9 | A | 4.5 | B | 18.2 | A |
| Example 21 | 2.1 | 23.4 | A | 5.6 | A | 15.7 | A |
| Example 22 | 2.1 | 22.2 | A | 4.0 | B | 14.8 | A |
| Example 23 | 2.3 | 22.6 | A | 5.3 | A | 13.1 | B |
| Example 24 | 2.1 | 22.1 | A | 4.9 | A | 12.0 | A |
| Example 25 | 2.3 | 25.5 | A | 5.8 | A | 14.3 | A |
| Example 26 | 2.1 | 24.3 | A | 4.2 | A | 15.8 | A |

| | Performances | | | | | |
|---|---|---|---|---|---|---|
| | Overall heat-resistant | | | Stiffness (mN) | | Rubber adhered |
| | Adhesion force (N/cord) | Rubber adhesion | Tube fatigue time | (S) treatment | (S + T) treatment | rank at tire failure |
| Comparative Example 33 | 0.6 | E | 20 min | 153 | 154 | E |
| Comparative Example 34 | 1.3 | E | 20 min | 106 | 109 | — |
| Comparative Example 35 | 1.9 | D | 40 min | 117 | 118 | — |
| Comparative Example 36 | 1.8 | D | 20 min | 142 | 142 | — |
| Comparative Example 37 | 1.1 | E | 10 min | 188 | 191 | — |
| Example 18 | 2.3 | B | 2 hr 10 min | 130 | 132 | — |
| Example 19 | 2.5 | B | more than 24 hr | 84 | 88 | — |
| Example 20 | 3.6 | B | more than 24 hr | 92 | 96 | — |
| Example 21 | 4.4 | A | more than 24 hr | 101 | 102 | A |
| Example 22 | 3.9 | B | 22 hr 20 min | 142 | 145 | — |
| Example 23 | 3.9 | B | 20 hr 00 min | 147 | 148 | — |
| Example 24 | 5.5 | A | more than 24 hr | 120 | 122 | — |
| Example 25 | 5.5 | A | more than 24 hr | 116 | 119 | — |
| Example 26 | 7.3 | A | more than 24 hr | 105 | 106 | — |

TABLE 6(a)

| | Adhesive composition (S) | Composition of adhesive solution (S) | | | | | | | | | | | Resin material |
|---|---|---|---|---|---|---|---|---|---|---|---|---|---|
| | | A-aqueous solution | | B-aqueous solution | | C-aqueous solution | | I-aqueous solution | | D-aqueous solution | | E, F, H or G-aqueous solution | |
| | | Kind | % | Kind | % | Kind | % | Kind | % | Kind | % | Kind | % | |
| Example 27 | S-64 | A-1 | 45 | — | | — | | I-1 | 30 | D-1 | 25 | — | | PET |
| Example 28 | S-65 | A-1 | 45 | — | | — | | I-2 | 30 | D-1 | 25 | — | | PET |
| Example 29 | S-66 | A-1 | 45 | — | | — | | I-3 | 30 | D-1 | 25 | — | | PET |
| Example 30 | S-67 | A-1 | 45 | — | | — | | I-4 | 30 | D-1 | 25 | — | | PET |
| Example 31 | S-68 | A-2 | 45 | — | | — | | I-1 | 30 | D-2 | 25 | — | | PET |
| Example 32 | S-69 | A-3 | 45 | — | | — | | I-1 | 30 | D-2 | 25 | — | | PET |
| Example 33 | S-70 | A-4 | 45 | — | | — | | I-1 | 30 | D-2 | 25 | — | | PET |

TABLE 6(a)-continued

| | Adhesive composition (S) | Composition of adhesive solution (S) | | | | | | | | | | | Resin material |
|---|---|---|---|---|---|---|---|---|---|---|---|---|---|
| | | A-aqueous solution | | B-aqueous solution | | C-aqueous solution | | I-aqueous solution | | D-aqueous solution | | E, F, H or G-aqueous solution | | |
| | | Kind | % | Kind | % | Kind | % | Kind | % | Kind | % | Kind | % | |
| Example 34 | S-71 | A-5 | 45 | — | | — | | I-1 | 30 | D-2 | 25 | | — | PET |
| Comparative Example 38 | S-72 | A-6 | 45 | — | | — | | I-1 | 30 | D-2 | 25 | | — | PET |
| Comparative Example 39 | S-73 | A-7 | 45 | — | | — | | I-1 | 30 | D-2 | 25 | | — | PET |
| Example 35 | S-74 | A-8 | 45 | — | | — | | I-1 | 30 | D-2 | 25 | | — | PET |
| Example 36 | S-75 | A-9 | 45 | — | | — | | I-1 | 30 | D-2 | 25 | | — | PET |
| Example 37 | S-76 | A-1 | 35 | — | | — | | I-1 | 30 | D-1 | 25 | E-1 | 1 | PET |
| Example 38 | S-77 | A-1 | 35 | — | | — | | I-1 | 30 | D-1 | 25 | E-2 | 1 | PET |
| Example 39 | S-78 | A-1 | 35 | — | | — | | I-1 | 30 | D-1 | 25 | F-1 | 1 | PET |
| Example 40 | S-79 | A-1 | 41 | — | | — | | I-1 | 30 | D-1 | 25 | G-1 | 4 | PET |
| Example 41 | S-80 | A-1 | 35 | — | | — | | I-1 | 30 | D-1 | 25 | G-2 | 10 | PET |
| Example 42 | S-81 | A-1 | 35 | — | | — | | I-1 | 30 | D-1 | 25 | H-1 | 1 | PET |

TABLE 6(b)

| | | Performances | | | | | |
|---|---|---|---|---|---|---|---|
| | | Initial | | At high temperature | | After heat deterioration | |
| | Adhered rate (S) (%) | Adhesion force (N/cord) | Rubber adhesion | Adhesion force (N/cord) | Rubber adhesion | Adhesion force (N/cord) | Rubber adhesion |
| Example 27 | 2.2 | 23.5 | A | 5.8 | A | 14.7 | A |
| Example 28 | 2.0 | 24.4 | A | 5.2 | A | 15.0 | A |
| Example 29 | 2.1 | 21.2 | A | 4.1 | A | 12.8 | B |
| Example 30 | 2.4 | 26.0 | A+ | 6.2 | A | 17.7 | A |
| Example 31 | 2.1 | 24.2 | A | 5.8 | A | 15.5 | A |
| Example 32 | 2.3 | 25.1 | A | 6.1 | A | 12.9 | B |
| Example 33 | 2.3 | 24.5 | A | 6.3 | A | 15.1 | A |
| Example 34 | 2.2 | 25.3 | A | 4.6 | A | 13.1 | B |
| Comparative Example 38 | 2.2 | 24.4 | A | 5.1 | A | 10.8 | C |
| Comparative Example 39 | 2.2 | 11.7 | C | 2.2 | D | 6.4 | D |
| Example 35 | 2.1 | 22.7 | A | 3.8 | B | 14.0 | B |
| Example 36 | 2.2 | 26.1 | A+ | 6.3 | A | 15.3 | A |
| Example 37 | 2.3 | 25.0 | A | 6.2 | A | 15.4 | A |
| Example 38 | 2.2 | 24.3 | A | 5.9 | A | 15.8 | A |
| Example 39 | 2.2 | 24.4 | A | 6.0 | A | 16.3 | A |
| Example 40 | 2.1 | 25.1 | A | 4.7 | A | 14.5 | A |
| Example 41 | 2.2 | 25.3 | A+ | 4.6 | A | 14.9 | A |
| Example 42 | 2.1 | 23.6 | A | 3.9 | B | 13.6 | A |

| | Performances | | | | | |
|---|---|---|---|---|---|---|
| | Overall heat-resistant | | Tube fatigue time | Stiffness (mN) | | Rubber adhered rank at tire failure |
| | Adhesion force (N/cord) | Rubber adhesion | | (S) treatment | (S + T) treatment | |
| Example 27 | 4.3 | A | more than 24 hr | 106 | 108 | — |
| Example 28 | 4.7 | A | more than 24 hr | 107 | 110 | — |
| Example 29 | 3.8 | B | more than 24 hr | 104 | 105 | — |
| Example 30 | 5.1 | A | more than 24 hr | 113 | 114 | A |

TABLE 6(b)-continued

|  |  |  |  |  |  |  |
|---|---|---|---|---|---|---|
| Example 31 | 4.4 | A | more than 24 hr | 112 | 115 | — |
| Example 32 | 4.0 | B | more than 24 hr | 110 | 114 | — |
| Example 33 | 4.7 | A | more than 24 hr | 108 | 113 | — |
| Example 34 | 3.8 | B | more than 24 hr | 105 | 107 | — |
| Comparative Example 38 | 1.8 | C | 17 hr 00 min | 102 | 103 | — |
| Comparative Example 39 | 1.4 | D | 15 hr 30 min | 114 | 116 | — |
| Example 35 | 3.6 | B | more than 24 hr | 119 | 122 | — |
| Example 36 | 5.5 | A | more than 24 hr | 104 | 115 | A |
| Example 37 | 4.7 | A | more than 24 hr | 102 | 103 | — |
| Example 38 | 4.6 | A | more than 24 hr | 103 | 108 | — |
| Example 39 | 5.0 | A | more than 24 hr | 104 | 105 | — |
| Example 40 | 4.5 | A | more than 24 hr | 94 | 98 | — |
| Example 41 | 4.1 | A | more than 24 hr | 92 | 97 | — |
| Example 42 | 3.2 | B | more than 24 hr | 101 | 104 | — |

TABLE 7(a)

| | Adhesive composition | Composition of adhesive solution (S) | | | | | | | | | | | Resin material |
|---|---|---|---|---|---|---|---|---|---|---|---|---|---|
| | | A-aqueous solution | | B-aqueous solution | | C-aqueous solution | | I-aqueous solution | | D-aqueous solution | | E, F, H or G-aqueous solution | |
| | (S) | Kind | % | Kind | % | Kind | % | Kind | % | Kind | % | Kind | % | |
| Example 43 | S-82 | — | | B-1 | 45 | — | | I-1 | 55 | D-1 | — | | — | PET |
| Example 44 | S-83 | — | | B-1 | 75 | — | | I-1 | 15 | D-1 | 10 | | — | PET |
| Example 45 | S-84 | — | | B-1 | 60 | — | | I-1 | 30 | D-1 | 10 | | — | PET |
| Example 46 | S-85 | — | | B-1 | 45 | — | | I-1 | 45 | D-1 | 10 | | — | PET |
| Example 47 | S-86 | — | | B-1 | 45 | — | | I-1 | 45 | D-1 | 10 | | — | PET |
| Example 48 | S-87 | — | | B-1 | 25 | — | | I-1 | 65 | D-1 | 10 | | — | PET |
| Example 49 | S-88 | — | | B-1 | 20 | — | | I-1 | 20 | D-1 | 60 | | — | PET |
| Example 50 | S-89 | — | | B-1 | 40 | — | | I-1 | 20 | D-1 | 40 | | — | PET |
| Example 51 | S-90 | — | | B-1 | 60 | — | | I-1 | 20 | D-1 | 20 | | — | PET |
| Example 52 | S-91 | — | | B-1 | 45 | — | | I-1 | 30 | D-1 | 25 | | — | PET |
| Example 53 | S-92 | — | | B-1 | 45 | — | | I-2 | 30 | D-1 | 25 | | — | PET |
| Example 54 | S-93 | — | | B-1 | 45 | — | | I-3 | 30 | D-1 | 25 | | — | PET |
| Example 55 | S-94 | — | | B-1 | 45 | — | | I-4 | 30 | D-1 | 25 | | — | PET |
| Example 56 | S-95 | — | | B-2 | 45 | — | | I-1 | 30 | D-1 | 25 | | — | PET |
| Example 57 | S-96 | — | | B-3 | 45 | — | | I-1 | 30 | D-1 | 25 | | — | PET |
| Example 58 | S-97 | — | | B-4 | 45 | — | | I-1 | 30 | D-1 | 25 | | — | PET |
| Example 59 | S-98 | — | | B-5 | 45 | — | | I-1 | 30 | D-1 | 25 | | — | PET |
| Example 60 | S-99 | — | | B-6 | 45 | — | | I-1 | 30 | D-1 | 25 | | — | PET |
| Example 61 | S-100 | — | | B-1 | 45 | — | | I-1 | 30 | D-2 | 25 | | — | PET |
| Example 62 | S-101 | — | | B-1 | 30 | — | | I-1 | 30 | D-2 | 40 | | — | PET |
| Example 63 | S-102 | — | | B-1 | 35 | — | | I-1 | 30 | D-1 | 25 | E-1 | 1 | PET |
| Example 64 | S-103 | — | | B-1 | 35 | — | | I-1 | 30 | D-1 | 25 | E-2 | 1 | PET |
| Example 65 | S-104 | — | | B-1 | 35 | — | | I-1 | 30 | D-1 | 25 | F-1 | 1 | PET |

TABLE 7(a)-continued

| | Adhesive composition (S) | Composition of adhesive solution (S) | | | | | | | | | | | Resin material |
|---|---|---|---|---|---|---|---|---|---|---|---|---|---|
| | | A-aqueous solution | | B-aqueous solution | | C-aqueous solution | | I-aqueous solution | | D-aqueous solution | | E, F, H or G-aqueous solution | |
| | | Kind | % | Kind | % | Kind | % | Kind | % | Kind | % | Kind | % | |
| Comparative Example 40 | S-105 | — | | — | | — | | I-1 | 30 | D-1 | 25 | G-1 | 45 | PET |
| Example 66 | S-106 | — | | B-1 | 41 | — | | I-1 | 30 | D-1 | 25 | G-1 | 4 | PET |
| Example 67 | S-107 | — | | B-1 | 35 | — | | I-1 | 30 | D-1 | 25 | H-1 | 1 | PET |

TABLE 7(b)

| | Performances | | | | | | |
|---|---|---|---|---|---|---|---|
| | | Initial | | At high temperature | | After heat deterioration | |
| | Adhered rate (S) (%) | Adhesion force (N/cord) | Rubber adhesion | Adhesion force (N/cord) | Rubber adhesion | Adhesion force (N/cord) | Rubber adhesion |
| Example 43 | 2.1 | 17.2 | B | 3.8 | B | 10.8 | B |
| Example 44 | 2.2 | 20.3 | A | 5.3 | A | 12.8 | B |
| Example 45 | 2.2 | 22.4 | A | 5.4 | A | 13.6 | B |
| Example 46 | 2.1 | 24.4 | A | 5.9 | A | 14.1 | A |
| Example 47 | 4.2 | 25.4 | A | 6.4 | A | 15.3 | A |
| Example 48 | 2.1 | 21.1 | A | 5.0 | A | 11.6 | B |
| Example 49 | 2.3 | 21.0 | A | 5.8 | A | 10.6 | B |
| Example 50 | 2.1 | 22.2 | A | 5.9 | A | 11.7 | B |
| Example 51 | 2.1 | 21.2 | A | 5.6 | A | 13.0 | B |
| Example 52 | 2.2 | 21.5 | A | 6.1 | A | 14.2 | A |
| Example 53 | 2.3 | 22.4 | A | 5.6 | A | 14.4 | A |
| Example 54 | 2.4 | 19.6 | B | 4.7 | A | 12.4 | B |
| Example 55 | 2.4 | 24.0 | A | 4.9 | A | 15.5 | A |
| Example 56 | 2.1 | 20.9 | A | 5.3 | A | 13.5 | B |
| Example 57 | 2.2 | 22.5 | A | 6.2 | A | 14.5 | A |
| Example 58 | 2.0 | 23.0 | A | 4.6 | B | 13.0 | B |
| Example 59 | 2.5 | 20.5 | A | 4.2 | B | 12.4 | B |
| Example 60 | 2.1 | 23.2 | A | 5.1 | A | 14.2 | A |
| Example 61 | 2.4 | 22.6 | A | 5.0 | A | 13.8 | A |
| Example 62 | 2.2 | 21.6 | A | 4.8 | A | 11.0 | B |
| Example 63 | 2.4 | 23.6 | A | 5.8 | A | 15.6 | A |
| Example 64 | 2.4 | 22.9 | A | 5.9 | A | 15.9 | A |
| Example 65 | 2.2 | 23.8 | B | 6.1 | A | 14.8 | A |
| Comparative Example 40 | 2.2 | 22.5 | A | 3.7 | B | 6.1 | D |
| Example 66 | 2.1 | 22.8 | A | 4.3 | A | 13.6 | B |
| Example 67 | 2.3 | 23.8 | A | 5.3 | A | 13.7 | B |

| | Performances | | | | | |
|---|---|---|---|---|---|---|
| | Overall heat-resistant | | | Stiffness (mN) | | Rubber adhered rank at tire failure |
| | Adhesion force (N/cord) | Rubber adhesion | Tube fatigue time | (S) treatment | (S + T) treatment | |
| Example 43 | 2.3 | B | 2 hr 10 min | 131 | 132 | — |
| Example 44 | 2.4 | B | more than 24 hr | 107 | 110 | — |
| Example 45 | 3.2 | B | more than 24 hr | 118 | 119 | — |
| Example 46 | 4.1 | B | more than 24 hr | 124 | 126 | — |
| Example 47 | 4.3 | A | 17 hr 30 min | 140 | 141 | A |
| Example 48 | 2.4 | B | 19 hr 10 min | 139 | 139 | — |

TABLE 7(b)-continued

|  |  |  |  |  |  |  |
|---|---|---|---|---|---|---|
| Example 49 | 2.5 | B | 19 hr 30 min | 140 | 142 | — |
| Example 50 | 4.3 | A | 22 hr 50 min | 135 | 136 | — |
| Example 51 | 4.1 | A | more than 24 hr | 127 | 132 | — |
| Example 52 | 4.0 | B | more than 24 hr | 133 | 135 | — |
| Example 53 | 4.6 | A | more than 24 hr | 127 | 128 | — |
| Example 54 | 3.6 | B | more than 24 hr | 130 | 132 | — |
| Example 55 | 4.6 | A | more than 24 hr | 132 | 134 | A |
| Example 56 | 3.8 | B | more than 24 hr | 123 | 125 | — |
| Example 57 | 4.2 | A | more than 24 hr | 131 | 132 | — |
| Example 58 | 3.6 | B | 21 hr 00 min | 145 | 145 | — |
| Example 59 | 3.2 | B | 23 hr 40 min | 140 | 143 | — |
| Example 60 | 4.0 | A | more than 24 hr | 122 | 126 | — |
| Example 61 | 4.2 | A | more than 24 hr | 121 | 122 | — |
| Example 62 | 3.3 | B | 20 hr 20 min | 144 | 147 | — |
| Example 63 | 4.9 | A | more than 24 hr | 117 | 119 | — |
| Example 64 | 5.2 | A | more than 24 hr | 114 | 116 | — |
| Example 65 | 5.1 | A | more than 24 hr | 108 | 111 | — |
| Comparative Example 40 | 1.8 | C | more than 24 hr | 80 | 85 | — |
| Example 66 | 3.1 | B | more than 24 hr | 92 | 97 | — |
| Example 67 | 4.4 | A | 20 hr 10 min | 126 | 127 | — |

TABLE 8(a)

| | Adhesive composition | Composition of adhesive solution (S) | | | | | | | | | | | Resin material |
|---|---|---|---|---|---|---|---|---|---|---|---|---|---|
| | | A-aqueous solution | | B-aqueous solution | | C-aqueous solution | | I-aqueous solution | | D-aqueous solution | | E, F, H or G-aqueous solution | | |
| | (S) | Kind | % | Kind | % | Kind | % | Kind | % | Kind | % | Kind | % | material |
| Example 68 | S-108 | A-1 | 25 | B-1 | 25 | — | | I-1 | 50 | — | | | — | PET |
| Example 69 | S-109 | A-1 | 30 | B-1 | 20 | — | | I-1 | 30 | D-1 | 20 | | — | PET |
| Example 70 | S-109 | A-1 | 30 | B-1 | 20 | — | | I-1 | 30 | D-1 | 20 | | — | PET |
| Example 71 | S-110 | A-1 | 25 | B-1 | 15 | — | | I-1 | 30 | D-1 | 20 | E-1 | 1 | PET |
| Example 72 | S-111 | A-1 | 25 | B-1 | 15 | — | | I-1 | 30 | D-1 | 20 | F-1 | 1 | PET |
| Example 73 | S-112 | A-1 | 25 | B-1 | 15 | — | | I-1 | 30 | D-1 | 20 | G-1 | 10 | PET |
| Example 74 | S-113 | A-9 | 30 | B-1 | 20 | — | | I-1 | 30 | D-1 | 20 | | — | PET |
| Example 75 | S-114 | A-9 | 30 | B-1 | 20 | C-1 | 5 | I-1 | 25 | D-1 | 20 | | — | PET |
| Example 76 | S-109 | A-1 | 30 | B-1 | 20 | — | | I-1 | 30 | D-1 | 20 | | — | PET |
| Example 77 | S-109 | A-1 | 30 | B-1 | 20 | — | | I-1 | 30 | D-1 | 20 | | — | PET |

TABLE 8(b)

| | | Performances | | | | | |
|---|---|---|---|---|---|---|---|
| | | Initial | | At high temperature | | After heat deterioration | |
| | Adhered rate (S) (%) | Adhesion force (N/cord) | Rubber adhesion | Adhesion force (N/cord) | Rubber adhesion | Adhesion force (N/cord) | Rubber adhesion |
| Example 68 | 2.2 | 17.9 | B | 3.9 | B | 13.5 | B |
| Example 69 | 2.2 | 25.3 | A | 5.8 | A | 16.2 | A |
| Example 70 | 4.9 | 26.6 | A+ | 6.3 | A | 16.3 | A |
| Example 71 | 2.3 | 25.4 | A | 5.7 | A | 16.0 | A |
| Example 72 | 2.4 | 25.2 | A | 5.3 | A | 15.5 | A |
| Example 73 | 2.1 | 24.8 | A | 4.8 | A | 12.8 | B |
| Example 74 | 2.3 | 25.3 | A | 4.9 | A | 15.7 | A |
| Example 75 | 2.2 | 25.6 | A | 5.1 | A | 15.9 | A |
| Example 76 | 2.2 | 24.8 | A | 5.3 | A | 15.4 | A |
| Example 77 | 2.2 | 24.6 | A | 6.2 | A | 15.3 | A |

| | Performances | | | | | Rubber adhered |
|---|---|---|---|---|---|---|
| | Overall heat-resistant | | Tube | Stiffness (mN) | | rank at |
| | Adhesion force (N/cord) | Rubber adhesion | fatigue time | (S) treatment | (S + T) treatment | tire failure |
| Example 68 | 2.5 | B | 6 hr 40 min | 106 | 108 | — |
| Example 69 | 5.3 | A | more than 24 hr | 89 | 95 | A |
| Example 70 | 5.4 | A | more than 24 hr | 94 | 97 | — |
| Example 71 | 5.0 | A | more than 24 hr | 87 | 94 | — |
| Example 72 | 4.8 | A | more than 24 hr | 90 | 95 | — |
| Example 73 | 3.9 | A | more than 24 hr | 77 | 83 | — |
| Example 74 | 4.2 | A | more than 24 hr | 89 | 94 | — |
| Example 75 | 4.2 | A | more than 24 hr | 87 | 92 | — |
| Example 76 | 4.8 | A | more than 24 hr | 93 | 97 | — |
| Example 77 | 5.9 | A | more than 24 hr | 92 | 94 | — |

TABLE 9(a)

| | Composition of adhesive solution (S) | | | | | | | | | | | | |
|---|---|---|---|---|---|---|---|---|---|---|---|---|---|
| | Adhesive composition (S) | A-aqueous solution | | B-aqueous solution | | C-aqueous solution | | I-aqueous solution | | D-aqueous solution | | E, F, H or G-aqueous solution | Resin |
| | | Kind | % | Kind | % | Kind | % | Kind | % | Kind | % | Kind | % | material |
| Comparative Example 41 | S-1 | A-1 | 100 | — | | — | | — | | — | | — | | PEN |
| Comparative Example 42 | S-2 | — | | B-1 | 100 | — | | — | | — | | — | | PEN |
| Comparative Example 43 | S-3 | — | | — | | C-1 | 100 | — | | — | | — | | PEN |

TABLE 9(a)-continued

| | Composition of adhesive solution (S) | | | | | | | | | | | | |
|---|---|---|---|---|---|---|---|---|---|---|---|---|---|
| | Adhesive composition | A-aqueous solution | | B-aqueous solution | | C-aqueous solution | | I-aqueous solution | | D-aqueous solution | | E, F, H or G-aqueous solution | Resin |
| | (S) | Kind | % | Kind | % | Kind | % | Kind | % | Kind | % | Kind | % | material |
| Comparative Example 44 | S-8 | — | — | — | — | C-6 | 100 | — | — | — | — | — | — | PEN |
| Comparative Example 45 | S-54 | — | — | — | — | — | — | I-1 | 100 | — | — | — | — | PEN |
| Comparative Example 46 | S-9 | — | — | — | — | — | — | — | — | D-1 | 100 | — | — | PEN |
| Comparative Example 47 | S-12 | A-1 | 60 | B-1 | 40 | — | — | — | — | — | — | — | — | PEN |
| Comparative Example 48 | S-14 | A-1 | 80 | — | — | C-1 | 20 | — | — | — | — | — | — | PEN |
| Comparative Example 49 | S-16 | A-1 | 70 | — | — | — | — | — | — | D-1 | 30 | — | — | PEN |
| Comparative Example 50 | S-17 | A-1 | 40 | B-1 | 20 | — | — | — | — | D-1 | 40 | — | — | PEN |
| Comparative Example 51 | S-24 | — | — | B-1 | 60 | C-6 | 40 | — | — | — | — | — | — | PEN |
| Comparative Example 52 | S-25 | — | — | B-1 | 20 | C-1 | 40 | — | — | D-1 | 40 | — | — | PEN |
| Comparative Example 53 | S-27 | — | — | B-1 | 40 | — | — | — | — | D-1 | 60 | — | — | PEN |
| Comparative Example 54 | S-30 | — | — | — | — | C-1 | 40 | — | — | D-1 | 60 | — | — | PEN |
| Example 78 | S-34 | A-1 | 30 | B-1 | 30 | C-6 | 40 | — | — | — | — | — | — | PEN |
| Example 79 | S-39 | A-1 | 30 | B-1 | 20 | C-1 | 30 | — | — | D-1 | 20 | — | — | PEN |
| Example 80 | S-58 | A-1 | 45 | — | — | — | — | I-1 | 45 | D-1 | 10 | — | — | PEN |
| Example 81 | S-75 | A-9 | 45 | — | — | — | — | I-1 | 30 | D-2 | 25 | — | — | PEN |
| Example 82 | S-85 | — | — | B-1 | 45 | — | — | I-1 | 45 | D-1 | 10 | — | — | PEN |
| Example 83 | S-109 | A-1 | 30 | B-1 | 20 | — | — | I-1 | 30 | D-1 | 20 | — | — | PEN |

TABLE 9(b)

| | Performances | | | | | |
|---|---|---|---|---|---|---|
| | | Initial | | At high temperature | | After heat deterioration | |
| | Adhered rate (S) (%) | Adhesion force (N/cord) | Rubber adhesion | Adhesion force (N/cord) | Rubber adhesion | Adhesion force (N/cord) | Rubber adhesion |
| Comparative Example 41 | 2.4 | 3.1 | E | 0.6 | E | 2.4 | E |
| Comparative Example 42 | 2.4 | 2.8 | E | 0.7 | E | 2.4 | E |
| Comparative Example 43 | 2.2 | 2.6 | E | 0.6 | E | 2.6 | E |
| Comparative Example 44 | 2.4 | 3.4 | E | 0.9 | E | 2.9 | E |
| Comparative Example 45 | 2.3 | 4.0 | E | 1.1 | E | 3.0 | E |
| Comparative Example 46 | 2.4 | 3.5 | E | 0.8 | E | 2.7 | E |
| Comparative Example 47 | 2.3 | 8.9 | D | 1.3 | D | 7.7 | D |
| Comparative Example 48 | 2.2 | 2.6 | E | 1.0 | E | 2.2 | E |
| Comparative Example 49 | 2.3 | 9.1 | D | 1.5 | D | 8.0 | D |
| Comparative Example 50 | 2.2 | 8.9 | B | 2.4 | C | 6.7 | C |
| Comparative Example 51 | 2.3 | 19.6 | A | 4.6 | B | 8.5 | D |
| Comparative Example 52 | 2.1 | 21.5 | A | 4.0 | B | 8.5 | D |
| Comparative Example 53 | 2.4 | 5.2 | E | 1.7 | D | 3.6 | E |
| Comparative Example 54 | 2.3 | 22.4 | A | 5.5 | A | 7.3 | D |

TABLE 9(b)-continued

| | | | | | | | |
|---|---|---|---|---|---|---|---|
| Example 78 | 2.3 | 25.6 | A | 5.2 | A | 13.1 | B |
| Example 79 | 2.2 | 25.3 | A | 5.7 | A | 14.6 | B |
| Example 80 | 2.2 | 25.5 | A | 5.8 | A | 15.9 | A |
| Example 81 | 2.3 | 27.4 | A | 6.6 | A | 16.4 | A |
| Example 82 | 4.7 | 26.3 | A | 6.8 | A | 15.7 | A |
| Example 83 | 2.1 | 25.9 | A | 5.7 | A | 16.0 | A |

| | Performances | | | | | |
|---|---|---|---|---|---|---|
| | Overall heat-resistant Adhesion | | Tube | Stiffness (mN) | | Rubber adhered rank at |
| | force (N/cord) | Rubber adhesion | fatigue time | (S) treatment | (S + T) treatment | tire failure |
| Comparative Example 41 | 0.5 | E | — | — | — | E |
| Comparative Example 42 | 0.7 | E | — | — | — | E |
| Comparative Example 43 | 0.5 | E | — | — | — | E |
| Comparative Example 44 | 0.6 | E | — | — | — | E |
| Comparative Example 45 | 0.7 | E | — | — | — | E |
| Comparative Example 46 | 0.6 | E | — | — | — | E |
| Comparative Example 47 | 0.9 | E | — | — | — | E |
| Comparative Example 48 | 0.7 | E | — | — | — | E |
| Comparative Example 49 | 1.1 | E | — | — | — | E |
| Comparative Example 50 | 0.9 | E | — | — | — | E |
| Comparative Example 51 | 1.6 | D | — | — | — | E |
| Comparative Example 52 | 1.8 | D | — | — | — | E |
| Comparative Example 53 | 1.3 | E | — | — | — | E |
| Comparative Example 54 | 1.6 | D | — | — | — | E |
| Example 78 | 3.7 | B | — | — | — | B |
| Example 79 | 3.8 | B | — | — | — | B |
| Example 80 | 5.2 | A | — | — | — | A |
| Example 81 | 5.9 | A | — | — | — | A |
| Example 82 | 5.4 | A | — | — | — | A |
| Example 83 | 5.2 | A | — | — | — | A |

TABLE 10(a)

| | Composition of adhesive solution (S) | | | | | | | | | | | | |
|---|---|---|---|---|---|---|---|---|---|---|---|---|---|
| | Adhesive composition | A-aqueous solution | | B-aqueous solution | | C-aqueous solution | | I-aqueous solution | | D-aqueous solution | | E, F, H or G-aqueous solution | | Resin |
| | (S) | Kind | % | Kind | % | Kind | % | Kind | % | Kind | % | Kind | % | material |
| Comparative Example 55 | S-1 | A-1 | 100 | — | | — | | — | | | | — | | KEV |
| Comparative Example 56 | S-2 | — | | B-1 | 100 | — | | — | | | | — | | KEV |
| Comparative Example 57 | S-3 | — | | — | | C-1 | 100 | — | | | | — | | KEV |
| Comparative Example 58 | S-8 | — | | — | | C-6 | 100 | — | | | | — | | KEV |
| Comparative Example 59 | S-50 | — | | — | | — | | I-1 | 100 | | | — | | KEV |
| Comparative Example 60 | S-9 | — | | — | | — | | — | | D-1 | 100 | — | | KEV |
| Comparative Example 61 | S-12 | A-1 | 60 | B-1 | 40 | — | | — | | | | — | | KEV |

TABLE 10(a)-continued

| | Adhesive composition (S) | Composition of adhesive solution (S) | | | | | | | | | | | | Resin material |
|---|---|---|---|---|---|---|---|---|---|---|---|---|---|---|
| | | A-aqueous solution | | B-aqueous solution | | C-aqueous solution | | I-aqueous solution | | D-aqueous solution | | E, F, H or G-aqueous solution | | |
| | | Kind | % | Kind | % | Kind | % | Kind | % | Kind | % | Kind | % | |
| Comparative Example 62 | S-14 | A-1 | 80 | — | | C-1 | 20 | | | — | | | — | KEV |
| Comparative Example 63 | S-16 | A-1 | 70 | — | | — | | | | D-1 | 30 | | — | KEV |
| Comparative Example 64 | S-17 | A-1 | 40 | B-1 | 20 | — | | | | D-1 | 40 | | — | KEV |
| Comparative Example 65 | S-24 | | | B-1 | 60 | C-6 | 40 | | | — | | | — | KEV |
| Comparative Example 66 | S-25 | | | B-1 | 20 | C-1 | 40 | | | D-1 | 40 | | — | KEV |
| Comparative Example 67 | S-27 | | | B-1 | 40 | — | | | | D-1 | 60 | | — | KEV |
| Comparative Example 68 | S-30 | | — | | — | C-1 | 40 | | | D-1 | 60 | | — | KEV |
| Example 84 | S-34 | A-1 | 30 | B-1 | 30 | C-6 | 40 | | — | | | | | KEV |
| Example 85 | S-34 | A-1 | 30 | B-1 | 20 | C-1 | 30 | | — | D-1 | 20 | | — | KEV |
| Example 86 | S-58 | A-1 | 45 | — | | — | | I-1 | 45 | D-1 | 10 | | — | KEV |
| Example 87 | S-75 | A-9 | 45 | — | | — | | I-1 | 30 | D-2 | 25 | | — | KEV |
| Example 88 | S-85 | — | | B-1 | 45 | — | | I-1 | 45 | D-1 | 10 | | — | KEV |
| Example 89 | S-109 | A-1 | 30 | B-1 | 20 | — | | I-1 | 30 | D-1 | 20 | | — | KEV |

TABLE 10(b)

| | | Performances | | | | | |
|---|---|---|---|---|---|---|---|
| | | Initial | | At high temperature | | After heat deterioration | |
| | Adhered rate (S) (%) | Adhesion force (N/cord) | Rubber adhesion | Adhesion force (N/cord) | Rubber adhesion | Adhesion force (N/cord) | Rubber adhesion |
| Comparative Example 55 | 2.2 | 2.9 | E | 0.7 | E | 2.4 | E |
| Comparative Example 56 | 2.2 | 2.7 | E | 0.7 | E | 2.1 | E |
| Comparative Example 57 | 2.2 | 3.0 | E | 0.7 | E | 2.8 | E |
| Comparative Example 58 | 2.3 | 3.3 | E | 1.0 | E | 2.6 | E |
| Comparative Example 59 | 2.1 | 4.5 | E | 0.8 | E | 3.2 | E |
| Comparative Example 60 | 2.4 | 3.2 | E | 0.9 | E | 2.3 | E |
| Comparative Example 61 | 2.2 | 8.8 | D | 1.2 | D | 7.6 | D |
| Comparative Example 62 | 2.2 | 2.5 | E | 0.9 | E | 2.1 | E |
| Comparative Example 63 | 2.2 | 10.0 | D | 1.7 | D | 8.6 | D |
| Comparative Example 64 | 2.2 | 9.2 | B | 2.5 | C | 6.8 | C |
| Comparative Example 65 | 2.4 | 20.3 | A | 4.6 | B | 8.2 | D |
| Comparative Example 66 | 2.4 | 22.5 | A | 4.5 | B | 8.8 | D |
| Comparative Example 67 | 2.3 | 6.3 | E | 1.9 | D | 2.8 | E |
| Comparative Example 68 | 2.2 | 21.5 | A | 6.2 | A | 5.4 | D |
| Example 84 | 2.1 | 23.8 | A | 5.4 | A | 14.4 | B |
| Example 85 | 2.2 | 24.9 | A | 5.7 | A | 14.4 | B |
| Example 86 | 2.1 | 24.7 | A | 5.4 | A | 15.5 | A |
| Example 87 | 2.3 | 26.6 | A | 6.2 | A | 15.9 | A |
| Example 88 | 4.1 | 25.8 | A | 6.6 | A | 15.6 | A |
| Example 89 | 2.3 | 25.5 | A | 5.9 | A | 16.0 | A |

TABLE 10(b)-continued

| | | Performances | | | | |
|---|---|---|---|---|---|---|
| | | Overall heat-resistant | | | | Rubber adhered |
| | | Adhesion | | Tube | Stiffness (mN) | rank at |
| | | force (N/cord) | Rubber adhesion | fatigue time | (S) treatment | (S + T) treatment | tire failure |
| Comparative Example 55 | 0.5 | E | — | — | — | E |
| Comparative Example 56 | 0.6 | E | — | — | — | E |
| Comparative Example 57 | 0.6 | E | — | — | — | E |
| Comparative Example 58 | 0.5 | E | — | — | — | E |
| Comparative Example 59 | 0.6 | E | — | — | — | E |
| Comparative Example 60 | 0.6 | E | — | — | — | E |
| Comparative Example 61 | 0.8 | E | — | — | — | E |
| Comparative Example 62 | 0.7 | E | — | — | — | E |
| Comparative Example 63 | 1.2 | E | — | — | — | E |
| Comparative Example 64 | 0.8 | E | — | — | — | E |
| Comparative Example 65 | 1.6 | D | — | — | — | E |
| Comparative Example 66 | 1.6 | D | — | — | — | E |
| Comparative Example 67 | 1.0 | E | — | — | — | E |
| Comparative Example 68 | 1.4 | D | — | — | — | E |
| Example 84 | 3.6 | B | — | — | — | B |
| Example 85 | 3.4 | B | — | — | — | B |
| Example 86 | 4.2 | A | — | — | — | A |
| Example 87 | 5.6 | A | — | — | — | A |
| Example 88 | 4.9 | A | — | — | — | A |
| Example 89 | 5.0 | A | — | — | — | A |

TABLE 11

| | | Resin material | Polyethylene terephthalate (PET) | Polyethylene terephthalate (PEN) | Aramid (Kevlar) (KEV) |
|---|---|---|---|---|---|
| Cord | | Denier | 1670dtex/2 | 1670dtex/2 | 1670dtex/2 |
| | | Twist number | 40 × 40 | 39 × 39 | 32 × 32 |
| | | Cable twist coefficient | 0.70 | 0.68 | 0.54 |
| | | Ply twist coefficient | 0.49 | 0.45 | 0.39 |
| Treating conditions of adhesive solution (S) | Dry | Temperature | 140° C. | 150° C. | 120° C. |
| | | Time | 80 seconds | 60 seconds | 120 seconds |
| | Hot | Temperature | 200° C. | 180° C. | 240° C. |
| | | Time | 60 seconds | 60 seconds | 60 seconds |
| Treating conditions of adhesive solution (T) | Dry | Temperature | 140° C. | 160° C. | 120° C. |
| | | Time | 80 seconds | 60 seconds | 120 seconds |
| | Hot | Temperature | 240° C. | 240° C. | 220° C. |
| | | Time | 60 seconds | 60 seconds | 60 seconds |

TABLE 12

| | (Compounding unit: parts by weight) Adhesive solution (T) | | |
|---|---|---|---|
| | T-1 | T-2 | T-3 |
| Water | 524.01 | 467.70 | 269.50 |
| Resorcin | 15.12 | 24.43 | 10.61 |
| Formalin (37%) | 16.72 | 28.81 | 9.39 |
| Sodium hydroxide (10% aqueous solution) | 4.00 | — | 1.40 |
| Maturing temperature | Room temperature | — | — |
| Maturing time | 8 hours | — | — |
| Vinylpyridine-styrene-butadiene copolymer latex | 233.15 | 328.00 | 184.06 |
| Styrene-butadiene copolymer latex | 207.00 | 151.0 | 125.77 |
| Maturing temperature | Room temperature | Room temperature | Room temperature |
| Maturing time | 12 hours | 36 hours | 24 hours |
| Aqueous solution C-3 | — | — | 400.00 |

TABLE 13

| | (Compounding unit: parts by weight) |
|---|---|
| Natural rubber | 80 |
| Styrene-butadiene copolymer rubber | 20 |
| Carbon black | 40 |
| Stearic acid | 2 |
| Petroleum softening agent | 10 |
| Pipe tar | 4 |
| zinc white | 5 |
| N-phenyl-β-naphthylamine | 1.5 |
| 2-benzothiazyldisulfide | 0.75 |
| Diphenyl quanidine | 0.75 |
| Sulfur | 2.5 |

TABLE 14

| Rank of rubber adhered rate (Rubber adhesion) | Area ratio of adhered rubber to surface area of cord | State of code filament |
|---|---|---|
| A+ | — | Filament is broken |
| A | 100–80% | Filament is not broken |
| B | 80–60% | Filament is not broken |
| C | 60–40% | Filament is not broken |
| D | 40–20% | Filament iS not broken |
| E | 20–0% | Filament is not broken |

Note) The state of breaking the cord filament usually shows that the breakage in the peeling test is caused in the cord filament rather than in the adhesive layer and the adhesion is good.

INDUSTRIAL APPLICABILITY

As mentioned above, when using the adhesive composition according to the invention, the initial adhesion force is excellent and also there can be obtained effects of controlling the lowering of the adhesion force under a high temperature of about 200° C., the lowering of the adhesion force after the heat deterioration and the lowering of the cord fatigue resistance under a high strain.

Therefore, the resin materials treated with the adhesive composition according to the invention, the rubber parts reinforced therewith, and various pneumatic tires using such a rubber article as a rubber member such as general-purpose tire, high-speed running tire, run flat tire and so on have high performances and durability even under high temperature and high strain, so that they are very useful in industry.

What is claimed is:

1. A cord for a rubber article characterized by having a surface coated with a layer of an adhesive composition comprising a thermoplastic and water dispersible high molecular weight polymer (A) containing a crosslinkable functional group as a pendant group, wherein the crosslinkable functional group is self-crosslinkable, and substantially free of carbon-carbon double bonds with a hydrogen radical at its allyl position in the main chain, a water-soluble high polymer (B) and a compound (C) having a structure with methylene linked aromatics having a polar functional group.

2. A cord for a rubber article characterized by having a surface coated with a layer of an adhesive composition comprising a thermoplastic and water dispersible high molecular weight polymer (A) containing a crosslinkable functional group as a pendant group, wherein the crosslinkable functional group is self-crosslinkable, and substantially free of carbon-carbon double bonds with a hydrogen radical at its allyl position in the main chain, a water-soluble high polymer (B) and a compound (C) having a structure with methylene linked aromatics having a polar functional group, and further containing at least one component selected from the group consisting of an aliphatic epoxide compound (D), a metal salt (E), a metal oxide (F), a rubber latex (G) and a benzene derivative (H) having two or more (blocked) isocyanate groups.

3. A cord for a rubber article characterized by having a surface coated with a layer of an adhesive composition comprising a thermoplastic and water dispersible high molecular weight polymer (A) containing a crosslinkable functional group as a pendant group, wherein the crosslinkable functional group is self-crosslinkable, and substantially free of carbon-carbon double bonds with a hydrogen radical at its allyl position in the main chain and an aqueous urethane compound (I) obtained by reacting an organic polyisocyanate (α) having a structure with methylene linked aromatics, a compound (β) having plural active hydrogens, and a thermally dissociatable blocking agent (γ) for an isocyanate group.

4. A cord for a rubber article characterized by having a surface coated with a layer of an adhesive composition comprising a thermoplastic and water dispersible high molecular weight polymer (A) containing a crosslinkable functional group as a pendant group, wherein the crosslinkable functional group is self-crosslinkable, and substantially free of carbon-carbon double bonds with a hydrogen radical at its allyl position in the main chain and an aqueous urethane compound (I) obtained by reacting an organic polyisocyanate (α) having a structure with methylene linked aromatics, a compound (β) having plural active hydrogens, and a thermally dissociatable blocking agent (γ) for an isocyanate group, and further containing at least one component selected from the group consisting of an aliphatic epoxide compound (D), a metal salt (E), a metal oxide (F), a rubber latex (G) and a benzene derivative (H) having two or more (blocked) isocyanate groups.

5. A cord for a rubber article characterized by having a surface coated with a layer of an adhesive composition comprising a water-soluble high polymer (B) and an aqueous urethane compound (I) obtained by reacting an organic polyisocyanate (α) having a structure with methylene linked aromatics, a compound (β) having plural active hydrogens and a thermally dissociatable blocking agent (γ) for an isocyanate group.

6. A cord for a rubber article characterized by having a surface coated with a layer of an adhesive composition comprising a water-soluble high polymer (B) and an aqueous urethane compound (I) obtained by reacting an organic polyisocyanate (α) having a structure with methylene linked aromatics, a compound (β) having plural active hydrogens and a thermally dissociatable blocking agent (γ) for an isocyanate group and further containing at least one component selected from the group consisting of an aliphatic epoxide compound (D), a metal salt (E), a metal oxide (F), a rubber latex (G) and a benzene derivative (H) having two or more (blocked) isocyanate groups.

7. A cord for a rubber article according to any one of claims 1 to 4, wherein the thermoplastic and water dispersible high molecular weight polymer (A) is a water dispersible polymer.

8. A cord for a rubber article according to any one of claims 1 to 4, wherein the thermoplastic and water dispersible high molecular weight polymer (A) has a weight average molecular weight of not less than 10,000.

9. A cord for a rubber article according to any one of claims 1 to 4, wherein the crosslinkable functional group in the pendant group of the thermoplastic and water dispersible high molecular weight polymer (A) is at least one selected from the group consisting of oxazoline group, bismaleimide group, (blocked) isocyanate group, epoxy group, aziridine group, carbodiimide group, hydrazino group and epithio group.

10. A cord for a rubber article according to any one of claims 1 to 4, wherein the thermoplastic and water dispersible high molecular weight polymer (A) is an ethylenically addition polymer containing 2-oxazoline group as a pendant group.

11. A cord for a rubber article according to any one of claims 1 to 4, wherein the main chain of the thermoplastic and water dispersible high molecular weight polymer (A) comprises an ethylenically addition polymer of units derived from a monomer containing substantially one carbon-carbon double bond, and an addition-reactive carbon-carbon double bond derived from conjugated diene monomer is not more than 10% as a composition ratio in the main chain monomer.

12. A cord for a rubber article according to any one of claims 1 to 4, wherein the thermoplastic and water dispersible high molecular weight polymer (A) is a urethane based high molecular weight polymer containing a hydrazino group as a pendant group.

13. A cord for a rubber article according to any one of claims 1, 2, 5 and 6, wherein the water-soluble high polymer (B) is a water-soluble high polymer containing a carboxyl group.

14. A cord for a rubber article according to any one of claims 1, 2, 5 and 6, wherein the water-soluble high polymer (B) contains substantially free of carbon-carbon double bond with a hydrogen radical at its allyl position and has a weight average molecular weight of not less than 3,000.

15. A cord for a rubber article according to any one of claims 1, 2, 5, and 6, wherein the water-soluble high polymer (B) is a (co)polymer containing an ethylenic unit inclusive of a monomer containing a carboxyl group.

16. A cord for a rubber article according to any one of claims 1, 2, 5 and 6, wherein the water-soluble high polymer (B) is a copolymer containing a maleic anhydride unit and an isobutylene unit, or a derivative thereof.

17. A cord for a rubber article according to claim 1, wherein the polar functional group of the compound (C) is at least one functional group selected from the group consisting of (blocked) isocyanate group, epoxy group, hydroxyl group, amino group and carboxyl group.

18. A cord for a rubber article according to claim 17, wherein the compound (C) is a reaction product of diphenylmethane diisocyanate or polyethylene polyphenyl polyisocyanate and a thermally dissociatable blocking agent for an isocyanate group.

19. A cord for a rubber article according to claim 17, wherein the compound (C) is a condensate of phenol and formaldehyde, or a modified product thereof.

20. A cord for a rubber article according to claim 19, wherein the condensate of phenol and formaldehyde is a condensate of resorcine and formaldehyde through novolak reaction, a condensate of chlorophenol and resorcin and formaldehyde, or an epoxy cresol novolak resin.

21. A cord for a rubber article according to claim 17, wherein the compound (C) is an aqueous urethane compound (I) obtained by reacting an organic polyisocyanate (α) having a structure with methylene linked aromatics, a compound (β) having plural active hydrogens and a thermally dissociatable blocking agent (γ) for an isocyanate group.

22. A cord for a rubber article according to claim 21, wherein the aqueous urethane compound (I) is an aqueous urethane compound having at least a thermally dissociatable blocked isocyanate group and a hydrophilic group, and the aqueous urethane compound is a reaction product obtained by (i) reacting an organic polyisocyanate compound (α) having a structure with methylene linked aromatics with a compound (β) having plural active hydrogens to obtain a urethane prepolymer having a free isocyanate group and (ii) treating the urethane prepolymer with a thermally dissociatable blocking agent (γ) for an isocyanate group and a compound (δ) having at least one active hydrogen and at least one hydrophilic group of anionic and/or nonionic hydrophilic groups.

23. A cord for a rubber article according to claim 22, wherein the aqueous urethane compound (I) is a reaction product comprising 40–85% by weight of the organic polyisocyanate compound (α) having 3–5 isocyanate groups and a molecular weight of not more than 2,000, 5–35% by weight of the compound (β) having 2–4 active hydrogens and a molecular weight of not more than 5,000, 5–35% by weight of the thermally dissociatable blocking agent (γ) and 5–35% by weight of the compound (δ), and the thermally dissociatable blocked isocyanate group in the molecular weight of the reaction product is 0.5–11% by weight (converted as NCO=42).

24. A cord for a rubber article according to claim 22, wherein the aqueous urethane compound (I) is represented by the following general formula:

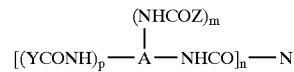

[wherein A is a residue of the organic polyisocyanate compound (α), Y is a residue of the thermally dissociatable blocking agent (γ), Z is a residue of the compound (δ), X is a residue of the compound (β), n is an integer of 2–4 and p+m is an integer of 2–4 (m≧0.25)].

25. A cord for a rubber article according to any one of claims 2, 4 and 6, wherein the aliphatic epoxide compound (D) is a compound having two or more epoxy groups in one molecule.

26. A cord for a rubber article according to any one of claims 2, 4 and 6, wherein the aliphatic epoxide compound (D) is a reaction product of polyvalent alcohol and epichlorohydrin.

27. A cord for a rubber article according to any one of claims 2, 4 and 6, wherein the metal salt (E) is a salt of polyvalent metal.

28. A cord for a rubber article according to any one of claims 2, 4 and 6, wherein the metal oxide (F) is an oxide of polyvalent metal.

29. A cord for a rubber article according to claim 1, wherein the adhesive composition contains 2–75% of the thermoplastic and water dispersible high molecular weight polymer (A), 5–75% of the water soluble high polymer (B) and 15–77% of the compound (C) on dry weight.

30. A cord for a rubber article according to claim 2, wherein when the adhesive composition contains 2–75% of the thermoplastic and water dispersible high molecular weight polymer (A), 5–75% of the water soluble high polymer (B) and 15–77% of the compound (C) on dry weight, it further contains not more than 70% of the aliphatic epoxide compound (D), not more than 50% of the metal salt (E), not more than 50% of the metal oxide (F), not more than 18% of the rubber latex (G) and not more than 50% of the benzene derivative (H).

31. A cord for a rubber article according to claim 3, wherein the adhesive composition contains 2–75% of the thermoplastic and water dispersible high molecular weight polymer (A) and 15–87% of the aqueous urethane compound (I) on dry weight.

32. A cord for a rubber article according to claim 4, wherein when the adhesive composition contains 2–75% of the thermoplastic and water dispersible high molecular weight polymer (A) and 15–87% of the aqueous urethane compound (I) on dry weight, it further contains not more than 70% of the aliphatic epoxide compound (D), not more than 50% of the metal salt (E), not more than 50% of the metal oxide (F), not more than 18% of the rubber latex (G) and not more than 50% of the benzene derivative (H).

33. A cord for a rubber article according to claim 5, wherein the adhesive composition contains 5–75% of the thermoplastic and water dispersible high molecular weight polymer (A) and 15–77% of the aqueous urethane compound (I) on dry weight.

34. A cord for a rubber article according to claim 6, wherein when the adhesive composition contains 5–75% of the thermoplastic and water dispersible high molecular weight polymer (A) and 15–77% of the aqueous urethane compound (I) on dry weight, it further contains not more than 70% of the aliphatic epoxide compound (D), not more than 50% of the metal salt (E), not more than 50% of the metal oxide (F), not more than 18% of the rubber latex (G) and not more than 50% of the benzene derivative (H).

35. A cord for a rubber article according to any one of claims 1 to 6, wherein an alkali metal is not more than 2% on dry weight even when it is contained in the adhesive composition.

36. A cord for a rubber article according to any one of claims 1 to 6, wherein the adhesive composition has storage moduli G' of not more than $10^9$ at 60° C. and a frequency of 10 Hz and not less than $10^6$ at 200° C. and a frequency of 10 Hz when a dynamic viscoelasticity is measured.

37. A cord for a rubber article according to any one of claims 1 to 6, wherein an integrated reaction calorie per 1 g on dry weight of the adhesive composition is not more than 85 J(joule) when the adhesive composition is heat-treated at 240° C. for 30 minutes, cooled to room temperature and 100 parts by dry weight of the adhesive composition is reacted with 10 parts by weight of sulfur at 160° C. for 90 minutes.

38. A cord for a rubber article according to any one of claims 1 to 6, wherein the cord is made of a polyester resin, an aromatic polyamide resin or an acrylic resin, wherein the polyester resin is polyethylene terephthalate or polyethylene naphthalate.

39. A cord for a rubber article according to any one of claims 1 to 6, wherein the cord is obtained by twisting plural filaments, and comprises cable twist and ply twist of the synthetic fiber, in which a twisting coefficient N1 of the ply twist is 0–0.70 and a twisting coefficient N2 of the cable twist is 0.12–0.90 as defined by the following equations (1) and (2):

$$N1 = n1 \times (0.125 \times D1/\rho)1/2 \times 10^{-3} \quad (1)$$

$$N2 = n2 \times (0.125 \times D2/\rho)1/2 \times 10^{-3} \quad (2)$$

(wherein D1 is an indicated decitex number of the ply twist bundle, D2 is a total indicated decitex number, n1 is the number of ply twist (turns/10 cm), n2 is the number of cable twist (turns/10 cm) and ρ is a specific gravity of an organic fiber).

40. A cord for a rubber article according to any one of claims 1 to 6, wherein the cord comprises cable twist and ply twist of the synthetic fiber, in which the twisting coefficient of the ply twist is 1300–2500 and the twisting coefficient of the cable twist is 900–1800.

41. A cord for a rubber article according to any one of claims 1 to 6, wherein the adhesive composition coating the cord is 0.5–6.0% by weight per the cord weight on dry weight.

42. A rubber article characterized by reinforcing with a cord as claimed in any one of claims 1 to 6.

43. A pneumatic tire characterized by applying a rubber article characterized by reinforcing with a cord as claimed in any one of claims 1 to 6 as a rubber member.

* * * * *